United States Patent
Marrin et al.

(10) Patent No.: US 6,856,322 B1
(45) Date of Patent: Feb. 15, 2005

(54) UNIFIED SURFACE MODEL FOR IMAGE BASED AND GEOMETRIC SCENE COMPOSITION

(75) Inventors: Christopher F. Marrin, Menlo Park, CA (US); James R. Kent, Gahanna, OH (US); Robert K. Myers, Santa Cruz, CA (US); Peter G. Broadwell, Palo Alto, CA (US)

(73) Assignees: Sony Corporation, Tokyo (JP); Sony Electronics Inc., San Diego, CA (US)

(*) Notice: Subject to any disclaimer, the term of this patent is extended or adjusted under 35 U.S.C. 154(b) by 0 days.

(21) Appl. No.: 09/632,350

(22) Filed: Aug. 3, 2000

Related U.S. Application Data

(60) Provisional application No. 60/147,092, filed on Aug. 3, 1999.

(51) Int. Cl.[7] ................................................. G09G 5/00
(52) U.S. Cl. ........................ 345/629; 345/473; 345/760
(58) Field of Search ................................ 345/629, 760, 345/473

(56) References Cited

U.S. PATENT DOCUMENTS

| | | | |
|---|---|---|---|
| 4,538,188 A | | 8/1985 | Barker et al. |
| 4,845,651 A | * | 7/1989 | Aizawa et al. ............... 345/581 |
| 4,982,343 A | * | 1/1991 | Hourvitz et al. ............ 345/592 |
| 5,151,998 A | | 9/1992 | Capps |
| 5,204,969 A | | 4/1993 | Capps et al. |
| 5,434,959 A | | 7/1995 | Von Ehr, II et al. |
| 5,467,443 A | | 11/1995 | Johnson et al. |
| 5,469,274 A | * | 11/1995 | Iwasaki et al. ............. 358/450 |
| 5,477,337 A | | 12/1995 | Schuler |
| 5,500,927 A | | 3/1996 | Sander-Cederlof et al. |
| 5,517,320 A | | 5/1996 | Schuler |
| 5,532,830 A | | 7/1996 | Schuler |
| 5,592,602 A | | 1/1997 | Edmunds et al. |
| 5,594,855 A | | 1/1997 | Von Ehr, II et al. |
| 5,623,593 A | | 4/1997 | Spells, III |
| 5,680,639 A | | 10/1997 | Milne et al. |
| 5,751,281 A | | 5/1998 | Hoddie et al. |
| 5,764,241 A | * | 6/1998 | Elliott et al. ................. 345/473 |
| 5,808,610 A | | 9/1998 | Benson et al. |
| 5,940,080 A | | 8/1999 | Ruehle et al. |
| 6,076,104 A | * | 6/2000 | McCue ........................ 709/219 |
| 6,083,162 A | * | 7/2000 | Vining ........................ 600/407 |
| 6,084,590 A | | 7/2000 | Robotham et al. |
| 6,088,027 A | | 7/2000 | Konar et al. |
| 6,088,035 A | | 7/2000 | Sudarsky et al. |
| 6,124,864 A | | 9/2000 | Madden et al. |
| 6,128,712 A | | 10/2000 | Hunt et al. |
| 6,147,695 A | * | 11/2000 | Bowen et al. ............... 345/503 |
| 6,160,907 A | | 12/2000 | Robotham et al. |
| 6,192,156 B1 | | 2/2001 | Moorby |
| 6,249,285 B1 | | 6/2001 | Madden et al. |
| 6,266,053 B1 | | 7/2001 | French et al. |
| 6,297,825 B1 | | 10/2001 | Madden et al. |
| 6,337,703 B1 | | 1/2002 | Konar et al. |
| 6,373,490 B1 | | 4/2002 | Bendiksen et al. |
| 6,442,658 B1 | | 8/2002 | Hunt et al. |
| 6,459,439 B1 | | 10/2002 | Ahlquist, Jr. et al. |

OTHER PUBLICATIONS

Woo, "OpenGL programming guide, ver 1.2", 1999, pp. 20–25, 220–253, 367–379, 404, 422–427, AWL.

\* cited by examiner

*Primary Examiner*—Mark Zimmerman
*Assistant Examiner*—Adam Arnold
(74) *Attorney, Agent, or Firm*—Valley Oak Law

(57) ABSTRACT

A system and method for the real-time composition and presentation of a complex, dynamic, and interactive experience by means of an efficient declarative markup language. Using the Surface construct, authors can embed images or full-motion video data anywhere they would use a traditional texture map within their 3D scene. Authors can also use the results of rendering one scene description as an image to be texture mapped into another scene. In particular, the Surface allows the results of any rendering application to be used as a texture within the author's scene. This allows declarative rendering of nested scenes and rendering of scenes having component Surfaces with decoupled rendering rates.

27 Claims, 6 Drawing Sheets

UNIFIED SURFACE MODEL FOR IMAGE BASED AND GEOMETRIC SCENE COMPOSITION

RELATED APPLICATION

The present application claims priority from provisional patent application Ser. No. 60/147,092, filed on Aug. 3, 1999, now pending.

FIELD OF THE INVENTION

This invention relates generally to a modeling language for 3D graphics and, more particularly, to embedding images in a scene.

BACKGROUND OF THE INVENTION

In computer graphics, traditional real-time 3D scene rendering is based on the evaluation of a description of the scene's 3D geometry, resulting in the production of an image presentation on a computer display. Virtual Reality Modeling Language (VRML hereafter) is a conventional modeling language that defines most of the commonly used semantics found in conventional 3D applications such as hierarchical transformations, light sources, view points, geometry, animation, fog, material properties, and texture mapping. Texture mapping processes are commonly used to apply externally supplied image data to a given geometry within the scene. For example VRML allows one to apply externally supplied image data, externally supplied video data or externally supplied pixel data to a surface. However, VRML does not allow the use of rendered scene as an image to be texture mapped declaratively into another scene. In a declarative markup language, the semantics required to attain the desired outcome are implicit, and therefore a description of the outcome is sufficient to get the desired outcome. Thus, it is not necessary to provide a procedure (i.e., write a script) to get the desired outcome. As a result, it is desirable to be able to compose a scene using declarations. One example of a declarative language is the Hypertext Markup Language (HTML).

Further, it is desirable to declaratively combine any two surfaces on which image data was applied to produce a third surface. It is also desirable to declaratively re-render the image data applied to a surface to reflect the current state of the image.

Traditionally, 3D scenes are rendered monolithically, producing a final frame rate to the viewer that is governed by the worst-case performance determined by scene complexity or texture swapping. However, if different rendering rates were used for different elements on the same screen, the quality would improve and viewing experience would be more television-like and not a web-page-like viewing experience.

SUMMARY OF THE INVENTION

A system and method for the real-time composition and presentation of a complex, dynamic, and interactive experience by means of an efficient declarative markup language. Using the Surface construct, authors can embed images or full-motion video data anywhere they would use a traditional texture map within their 3D scene. Authors can also use the results of rendering one scene description as an image to be texture mapped into another scene. In particular, the Surface allows the results of any rendering application to be used as a texture within the author's scene. This allows declarative rendering of nested scenes and rendering of scenes having component Surfaces with decoupled rendering rates

DETAILED DESCRIPTION

Figure 1A:
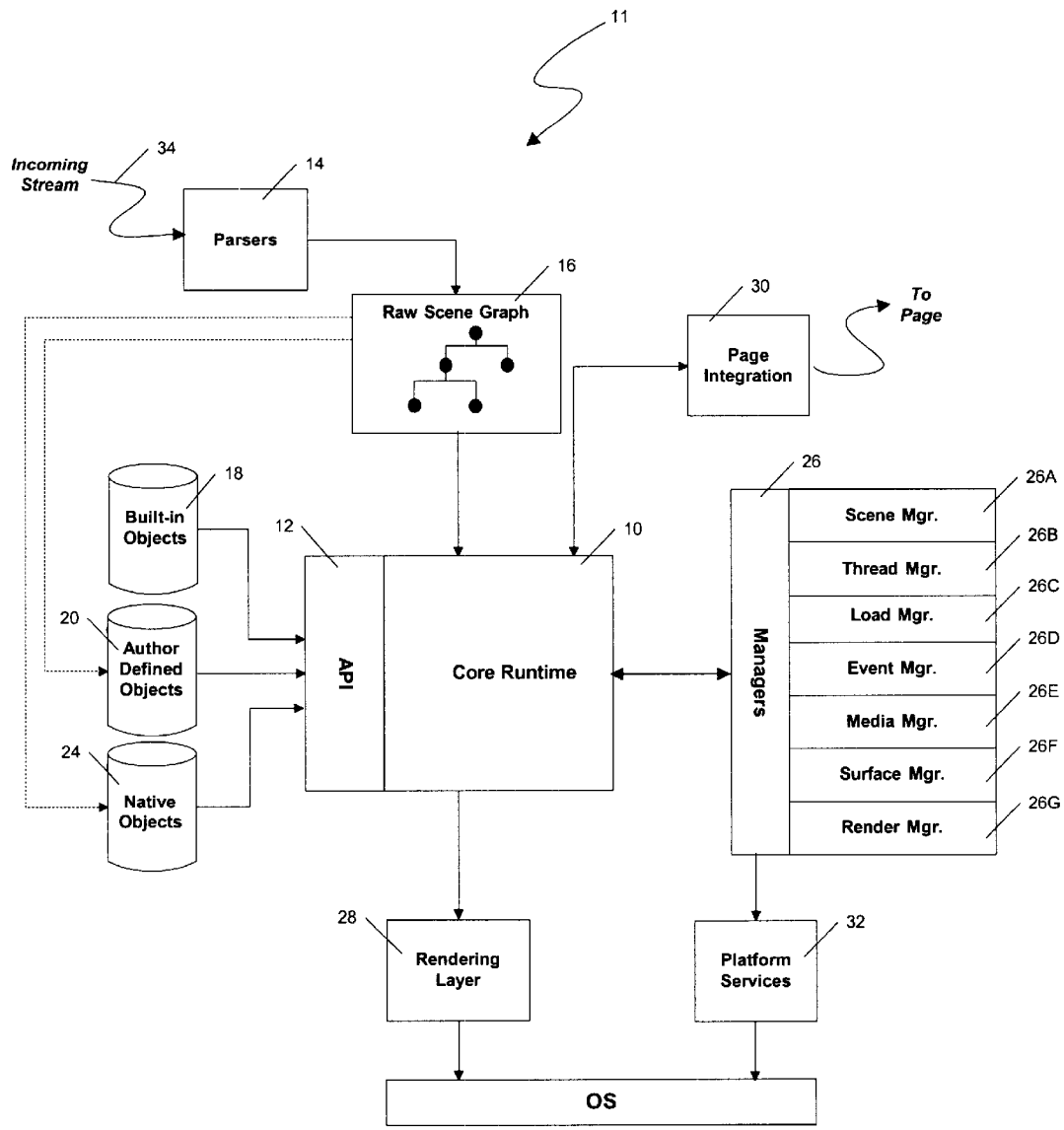
FIG. 1A shows the basic architecture of Blendo.

Blendo is an exemplary embodiment of the present invention that allows temporal manipulation of media assets including control of animation and visible imagery, and cueing of audio media, video media, animation and event data to a media asset that is being played. FIG. 1A shows basic Blendo architecture. A comprehensive description of Blendo can be found in Appendix A. At the core of the Blendo architecture is a Core Runtime module 10 (Core hereafter) which presents various Application Programmer Interface (API hereafter) elements and the object model to a set of objects present in system 11. During normal operation, a file is parsed by parser 14 into a raw scene graph 16 and passed on to Core 10, where its objects are instantiated and a runtime scene graph is built. The objects can be built-in objects 18, author defined objects 20, native objects 24, or the like. The objects use a set of available managers 26 to obtain platform services 32. These platform services 32 include event handling, loading of assets, playing of media, and the like. The objects use rendering layer 28 to compose intermediate or final images for display. A page integration component 30 is used to interface Blendo to an external environment, such as an HTML or XML page.

Blendo contains a system object with references to the set of managers 26. Each manager 26 provides the set of APIs to control some aspect of system 11. An event manager 26D provides access to incoming system events originated by user input or environmental events. A load manager 26C facilitates the loading of Blendo files and native node implementations. A media manager 26E provides the ability to load, control and play audio, image and video media assets. A render manager 26G allows the creation and management of objects used to render scenes. A scene manager 26A controls the scene graph. A surface manager 26F allows the creation and management of surfaces onto which scene elements and other assets may be composited. A thread manager 26B gives authors the ability to spawn and control threads and to communicate between them.

Figure 1B:
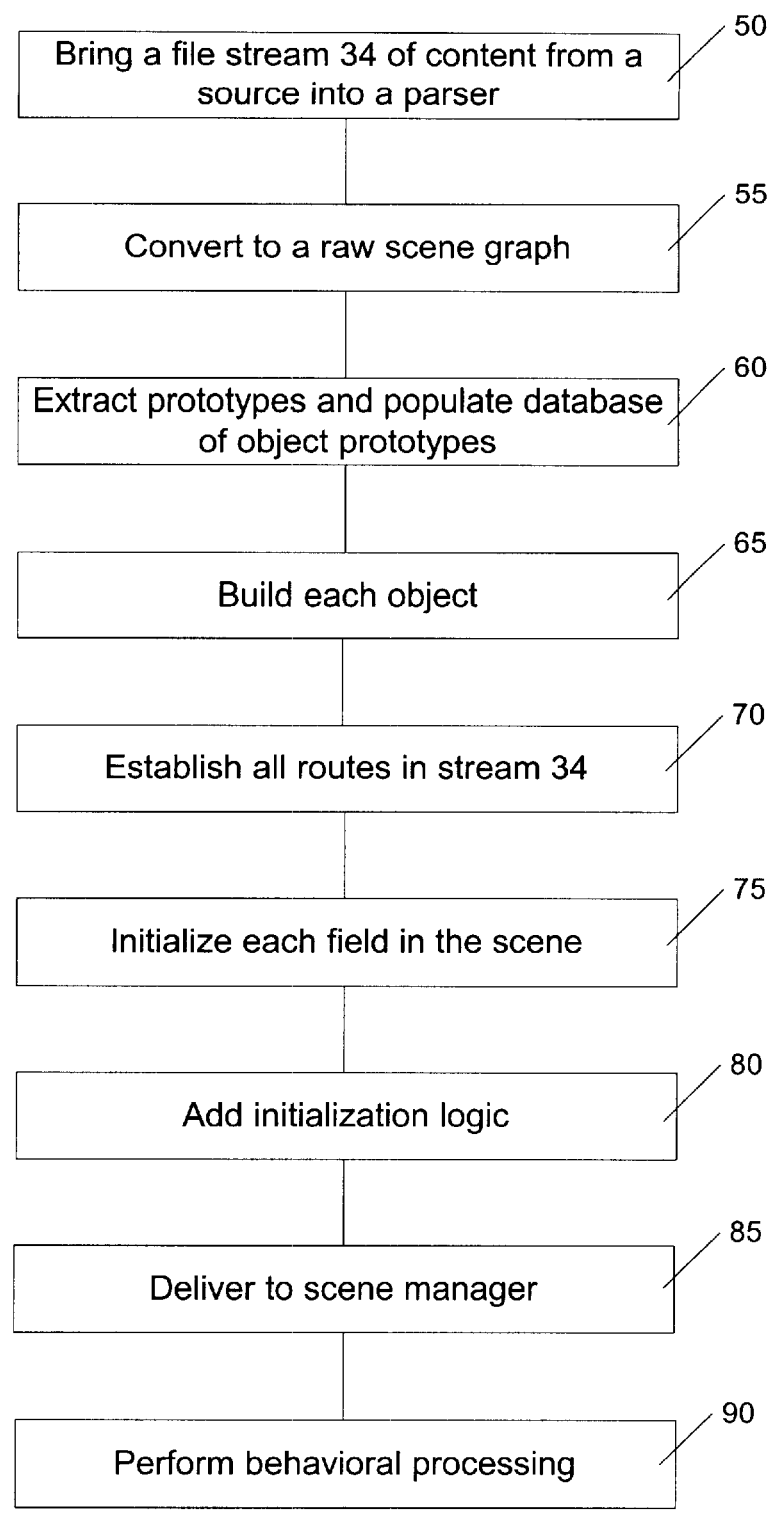
FIG. 1B is a flow diagram illustrating flow of content through Blendo engine.

FIG. 1B illustrates in a flow diagram, a conceptual description of the flow of content through a Blendo engine. In block 50, a presentation begins with a source which includes a file or stream 34 (FIG. 1A) of content being brought into parser 14 (FIG. 1A). The source could be in a native VRML-like textual format, a native binary format, an XML based format, or the like. Regardless of the format of the source, in block 55, the source is converted into raw scene graph 16 (FIG. 1A). The raw scene graph 16 can represent the nodes, fields and other objects in the content, as well as field initialization values. It also can contain a description of object prototypes, external prototype references in the stream 34, and route statements.

The top level of raw scene graph 16 include nodes, top level fields and functions, prototypes and routes contained in the file. Blendo allows fields and functions at the top level in addition to traditional elements. These are used to provide an interface to an external environment, such as an HTML page. They also provide the object interface when a stream 34 is used as the contents of an external prototype.

Each raw node includes a list of the fields initialized within its context. Each raw field entry includes the name, type (if given) and data value(s) for that field. Each data value includes a number, a string, a raw node, and/or a raw field that can represent an explicitly typed field value.

In block 60, the prototypes are extracted from the top level of raw scene graph 16 (FIG. 1A) and used to populate the database of object prototypes accessible by this scene.

The raw scene graph 16 is then sent through a build traversal. During this traversal, each object is built (block 65), using the database of object prototypes.

In block 70, the routes in stream 34 are established. Subsequently, in block 75, each field in the scene is initialized. This is done by sending initial events to non-default fields of Objects. Since the scene graph structure is achieved through the use of node fields, block 75 also constructs the scene hierarchy as well. Events are fired using in order traversal. The first node encountered enumerates fields in the node. If a field is a node, that node is traversed first.

As a result the nodes in that particular branch of the tree are initialized. Then, an event is sent to that node field with the initial value for the node field.

After a given node has had its fields initialized, the author is allowed to add initialization logic (block 80) to prototyped objects to ensure that the node is fully initialized at call time. The blocks described above produce a root scene. In block 85 the scene is delivered to the scene manager 26A (FIG. 1A) created for the scene. In block 90, the scene manager 26A is used to render and perform behavioral processing either implicitly or under author control.

A scene rendered by the scene manager 26A can be constructed using objects from the Blendo object hierarchy. Appendix B shows the object hierarchy and provides a detailed description of the objects in Blendo. Objects may derive some of their functionality from their parent objects, and subsequently extend or modify their functionality. At the base of the hierarchy is the Object. The two main classes of objects derived from the Object are a Node and a Field. Nodes contain, among other things, a render method, which gets called as part of the render traversal. The data properties of nodes are called fields. Among the Blendo object hierarchy is a class of objects called Timing Objects, which are described in detail below. The following code portions are for exemplary purposes. It should be noted that the line numbers in each code portion merely represent the line numbers for that particular code portion and do not represent the line numbers in the original source code.

Surface Objects

A Surface Object is a node of type SurfaceNode. A SurfaceNode class is the base class for all objects that describe a 2D image as an array of color, depth and opacity (alpha) values. SurfaceNodes are used primarily to provide an image to be used as a texture map. Derived from the SurfaceNode Class are MovieSurface, ImageSurface, MatteSurface, PixelSurface and SceneSurface. It should be noted the the line numbers in each code portion merely represent the line numbers for that code portion and do not represent the line numbers in the original source code.

MovieSurface

The following code portion illustrates the MovieSurface node. A description of each field in the node follows thereafter.

```
1) MovieSurface : SurfaceNode TimedNode AudioSourceNode {
2)    field MF String   url        []
3)    field TimeBaseNode timeBase   NULL
4)    field Time    duration   0
5)    field Time    loadTime   0
6)    field String  loadStatus "NONE"
   }
```

A MovieSurface node renders a movie on a surface by providing access to the sequence of images defining the movie. The MovieSurface's TimedNode parent class determines which frame is rendered onto the surface at any one time. Movies can also be used as sources of audio.

In line 2 of the code portion, ("Multiple Value Field) the URL field provides a list of potential locations of the movie data for the surface. The list is ordered such that element 0 describes the preferred source of the data. If for any reason element 0 is unavailable, or in an unsupported format, the next element may be used.

In line 3, the timeBase field, if specified, specifies the node that is to provide the timing information for the movie. In particular, the timeBase will provide the movie with the information needed to determine which frame of the movie to display on the surface at any given instant. If no timeBase is specified, the surface will display the first frame of the movie.

In line 4, the duration field is set by the MovieSurface node to the length of the movie in seconds once the movie data has been fetched.

In line 5 and 6, the loadTime and the loadStatus fields provide information from the MovieSurface node concerning the availability of the movie data. LoadStatus has five possible values, "NONE", "REQUESTED", "FAILED", "ABORTED", and "LOADED".

"NONE" is the initial state. A "NONE" event is also sent if the node's url is cleared by either setting the number of values to 0 or setting the first URL string to the empty string. When this occurs, the pixels of the surface are set to black and opaque (i.e. color is 0,0,0 and transparency is 0).

A "REQUESTED" event is sent whenever a non-empty url value is set. The pixels of the surface remain unchanged after a "REQUESTED" event.

"FAILED" is sent after a "REQUESTED" event if the movie loading did not succeed. This can happen, for example, if the URL refers to a non-existent file or if the file does not contain valid data. The pixels of the surface remain unchanged after a "FAILED" event.

An "ABORTED" event is sent if the current state is "REQUESTED" and then the URL changes again. If the URL is changed to a non-empty value, "ABORTED" is followed by a "REQUESTED" event. If the URL is changed to an empty value, "ABORTED" is followed by a "NONE" value. The pixels of the surface remain unchanged after an "ABORTED" event.

A "LOADED" event is sent when the movie is ready to be displayed. It is followed by a loadTime event whose value matches the current time. The frame of the movie indicated by the timeBase field is rendered onto the surface. If timeBase is NULL, the first frame of the movie is rendered onto the surface.

ImageSurface

The following code portion illustrates the ImageSurface node. A description of each field in the node follows thereafter.

```
1) ImageSurface : SurfaceNode {
2)   field MF String  url        []
3)   field Time       loadTime   0
4)   field String     loadStatus "NONE"
   }
```

An ImageSurface node renders an image file onto a surface. In line 2 of the code portion, the URL field provides a list of potential locations of the image data for the surface. The list is ordered such that element 0 describes the most preferred source of the data. If for any reason element 0 is unavailable, or in an unsupported format, the next element may be used.

In line 3 and 4, the loadTime and the loadStatus fields provide information from the ImageSurface node concerning the availability of the image data. LoadStatus has five possible values, "NONE", "REQUESTED", "FAILED", "ABORTED", and "LOADED".

"NONE" is the initial state. A "NONE" event is also sent if the node's URL is cleared by either setting the number of values to 0 or setting the first URL string to the empty string. When this occurs, the pixels of the surface are set to black and opaque (i.e. color is 0,0,0 and transparency is 0).

A "REQUESTED" event is sent whenever a non-empty URL value is set. The pixels of the surface remain unchanged after a "REQUESTED" event.

"FAILED" is sent after a "REQUESTED" event if the image loading did not succeed. This can happen, for example, if the URL refers to a non-existent file or if the file does not contain valid data. The pixels of the surface remain unchanged after a "FAILED" event.

An "ABORTED" event is sent if the current state is "REQUESTED" and then the URL changes again. If the URL is changed to a non-empty value, "ABORTED" will be followed by a "REQUESTED" event. If the URL is changed to an empty value, "ABORTED" will be followed by a "NONE" value. The pixels of the surface remain unchanged after an "ABORTED" event.

A "LOADED" event is sent when the image has been rendered onto the surface. It is followed by a loadTime event whose value matches the current time.

MatteSurface

The following code portion illustrates the MatteSurface node. A description of each field in the node follows thereafter.

```
1) MatteSurface : SurfaceNode {
2)   field SurfaceNode  surface1         NULL
3)   field SurfaceNode  surface2         NULL
4)   field String       operation        ""
5)   field MF Float     parameter        0
6)   field Bool         overwriteSurface2 FALSE
   }
```

The MatteSurface node uses image compositing operations to combine the image data from surface1 and surface2 onto a third surface. The result of the compositing operation is computed at the resolution of surface2. If the size of surface1 differs from that of surface2, the image data on surface1 is zoomed up or down before performing the operation to make the size of surface1 equal to the size of surface2.

In lines 2 and 3 of the code portion, the surface1 and surface2 fields specify the two surfaces that provide the input image data for the compositing operation. In line 4, the operation field specifies the compositing function to perform on the two input surfaces. Possible operations are described below.

"REPLACE_ALPHA" overwrites the alpha channel A of surface2 with data from surface1. If surfacer has 1 component (grayscale intensity only), that component is used as the alpha (opacity) values. If surface1 has 2 or 4 components (grayscale intensity+alpha or RGBA), the alpha channel A is used to provide the alpha values. If surface1 has 3 components (RGB), the operation is undefined. This operation can be used to provide static or dynamic alpha masks for static or dynamic images. For example, a SceneSurface could render an animated James Bond character against a transparent background. The alpha component of this image could then be used as a mask shape for a video clip.

"MULTIPLY_ALPHA" is similar to REPLACE_ALPHA, except the alpha values from surface1 are multiplied with the alpha values from surface2.

"CROSS_FADE" fades between two surfaces using a parameter value to control the percentage of each surface that is visible. This operation can dynamically fade between two static or dynamic images. By animating the parameter value (line 5) from 0 to 1, the image on surface1 fades into that of surface2.

"BLEND" combines the image data from surfacer and surface2 using the alpha channel from surface2 to control the blending percentage. This operation allows the alpha channel of surface2 to control the blending of the two images. By animating the alpha channel of surface2 by rendering a SceneSurface or playing a MovieSurface, you can produce a complex travelling matte effect. If R1, G1, B1, and A1 represent the red, green, blue, and alpha values of a pixel of surface1 and R2, G2, B2, and A2 represent the red, green, blue, and alpha values of the corresponding pixel of surface2, then the resulting values of the red, green, blue, and alpha components of that pixel are:

$$\text{red} = R1*(1-A2) + R2*A2 \tag{1}$$

$$\text{green} = G1*(1-A2) + G2*A2 \tag{2}$$

$$\text{blue} = B1*(1-A2) + B2*A2 \tag{3}$$

$$\text{alpha} = 1 \tag{4}$$

"ADD", and "SUBTRACT" add or subtract the color channels of surface1 and surface2. The alpha of the result equals the alpha of surface2.

In line 5, the parameter field provides one or more floating point parameters that can alter the effect of the compositing function. The specific interpretation of the parameter values depends upon which operation is specified In line 6, the overwriteSurface2 field indicates whether the MatteSurface node should allocate a new surface for storing the result of the compositing operation (overwriteSurface2=FALSE) or whether the data stored on surface2 should be overwritten by the compositing operation (overwriteSurface2=TRUE).

PixelSurface

The following code portion illustrates the SceneSurface node. A description of the field in the node follows thereafter.

```
1) PixelSurface : SurfaceNode {
2)   field Image  image   0 0 0
   }
```

A PixelSurface node renders an array of user-specified pixels onto a surface. In line 2, the image field describes the pixel data that is rendered onto the surface.

SceneSurface

The following code portion illustrates the use of SceneSurface node. A description of each field in the node follows thereafter.

```
1) SceneSurface : SurfaceNode {
2)    field MF ChildNode  children  []
3)    field UInt32  width   1
4)    field UInt32  height  1
   }
```

A SceneSurface node renders the specified children on a surface of the specified size. The SceneSurface automatically re-renders itself to reflect the current state of its children.

In line 2 of the code portion, the children field describes the ChildNodes to be rendered. Conceptually, the children field describes an entire scene graph that is rendered independently of the scene graph that contains the SceneSurface node.

In lines 3 and 4, the width and height fields specify the size of the surface in pixels. For example, if width is 256 and height is 512, the surface contains a 256×512 array of pixel values.

The MovieSurface, ImageSurface, MatteSurface, PixelSurface & SceneSurface nodes are utilized in rendering a scene.

At the top level of the scene description, the output is mapped onto the display, the "top level Surface." Instead of rendering its results to the display, the 3D rendered scene can generate its output onto a Surface using one of the above mentioned SurfaceNodes, where the output is available to be incorporated into a richer scene composition as desired by the author. The contents of the Surface, generated by rendering the surface's embedded scene description, can include color information, transparency (alpha channel) and depth, as part of the Surface's structured image organization. An image, in this context is defined to include a video image, a still image, an animation or a scene.

A Surface is also defined to support the specialized requirements of various texture-mapping systems internally, behind a common image management interface. As a result, any Surface producer in the system can be consumed as a texture by the 3D rendering process. Examples of such Surface producers include an Image Surface, a MovieSurface, a MatteSurface, a SceneSurface, and an ApplicationSurface.

An ApplicationSurface maintains image data as rendered by its embedded application process, such as a spreadsheet or word processor, a manner analogous to the application window in a traditional windowing system.

The integration of surface model with rendering production and texture consumption allows declarative authoring of decoupled rendering rates. Traditionally, 3D scenes have been rendered monolithically, producing a final frame rate to the viewer that is governed by the worst-case performance due to scene complexity and texture swapping. In a real-time, continuous composition framework, the Surface abstraction provides a mechanism for decoupling rendering rates for different elements on the same screen. For example, it may be acceptable to portray a web browser that renders slowly, at perhaps 1 frame per second, but only as long as the video frame rate produced by another application and displayed alongside the output of the browser can be sustained at a full 30 frames per second. If the web browsing application draws into its own Surface, then the screen compositor can render unimpeded at full motion video frame rates, consuming the last fully drawn image from the web browser's Surface as part of its fast screen updates.

Figure 2A:
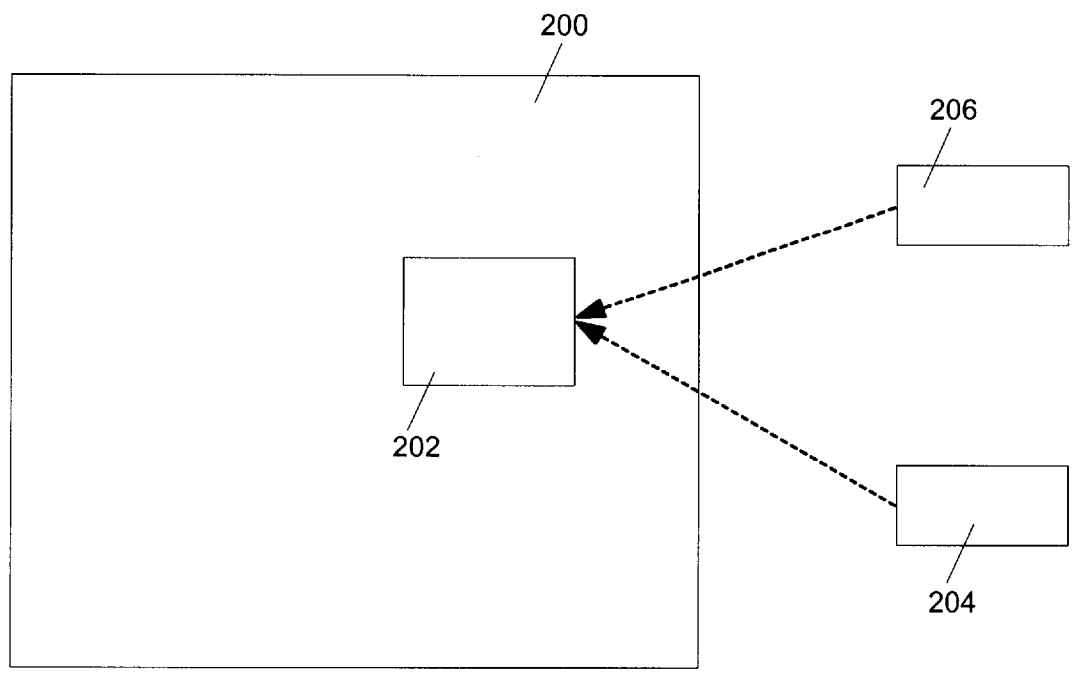
FIG. 2A illustrates how two surfaces in a scene are rendered at different rendering rates.
Figure 2B:
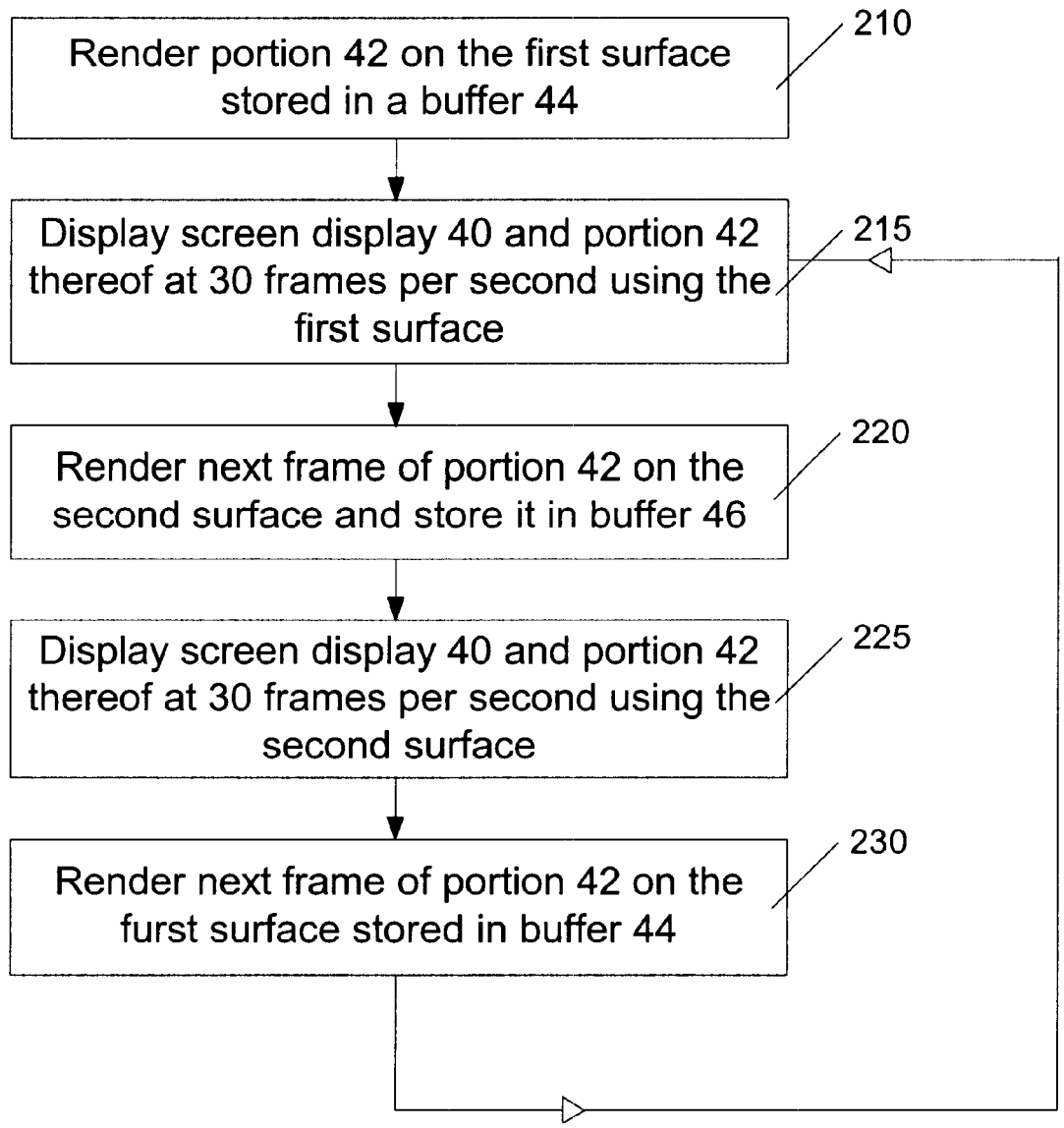
FIG. 2B is a flow chart illustrating acts involved in rendering the two surfaces shown in FIG. 2A at different rendering rates.

FIG. 2A illustrates a scheme for rendering a complex portion 202 of screen display 200 at full motion video frame rate. FIG. 2B is a flow diagram illustrating various acts included in rendering screen display 200 including complex portion 202 at full motion video rate. It may be desirable for a screen display 200 to be displayed at 30 frames per second, but a portion 202 of screen display 200 may be too complex to display at 30 frames per second. In this case, portion 202 is rendered on a first surface and stored in a buffer 204 as shown in block 210 (FIG. 2B). In block 215, screen display 200 including portion 202 is displayed at 30 frames per second by using the first surface stored in buffer 204. While screen display 200, including portion 200, is being displayed, the next frame of portion 202 is rendered on a second surface and stored in buffer 206 as shown in block220. Once this next frame of portion 202 is available, the next update of screen display 200 uses the second surface (block 225) and continues to do so till a further updated version of portion 202 is available in buffer 204. While the screen display 200 is being displayed using the second surface, the next frame of portion 202 is being rendered on first surface as shown in block 230. When the rendering of the next frame on the first surface is complete, the updated first surface will be used to display screen display 200 including complex portion 202 at 30 frames per second.

The integration of surface model with rendering production and texture consumption allows nested scenes to be rendered declaratively. Recomposition of subscenes rendered as images enables open-ended authoring. In particular, the use of animated sub-scenes, which are then image-blended into a larger video context, enables a more relevant aesthetic for entertainment computer graphics. For example, the image blending approach provides visual artists with alternatives to the crude hard-edged clipping of previous generations of windowing systems.

Figure 3A:
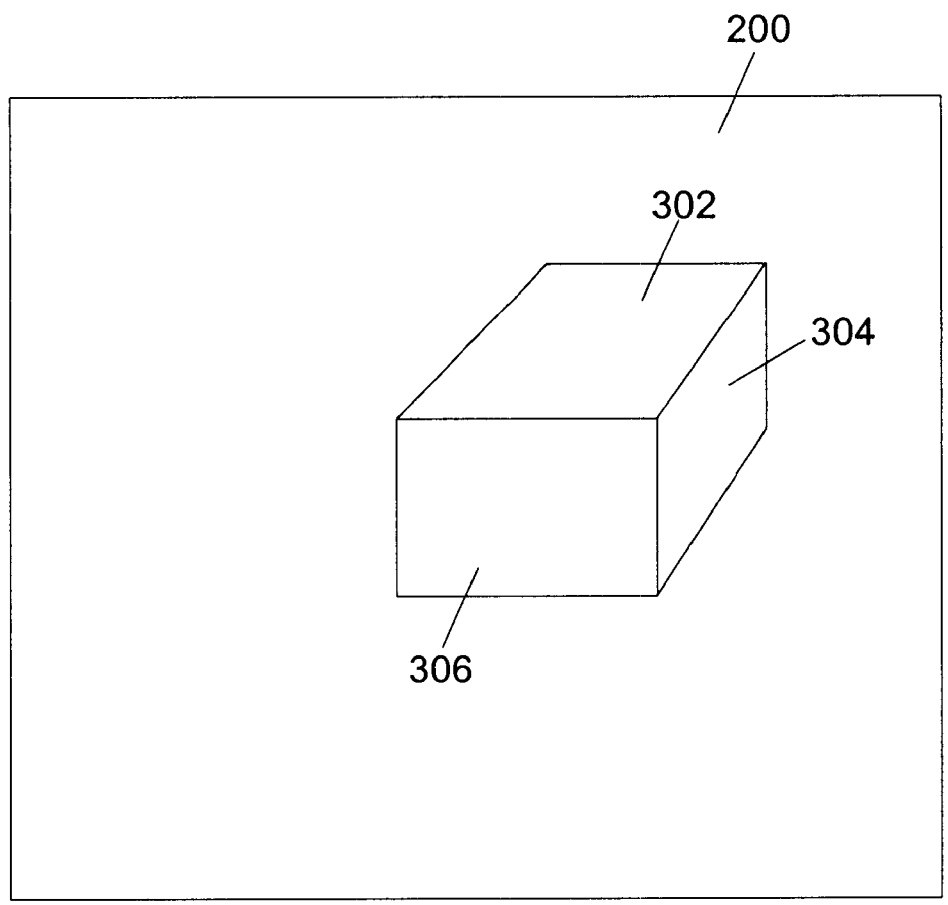
FIG. 3A illustrates a nested scene.
Figure 3B:
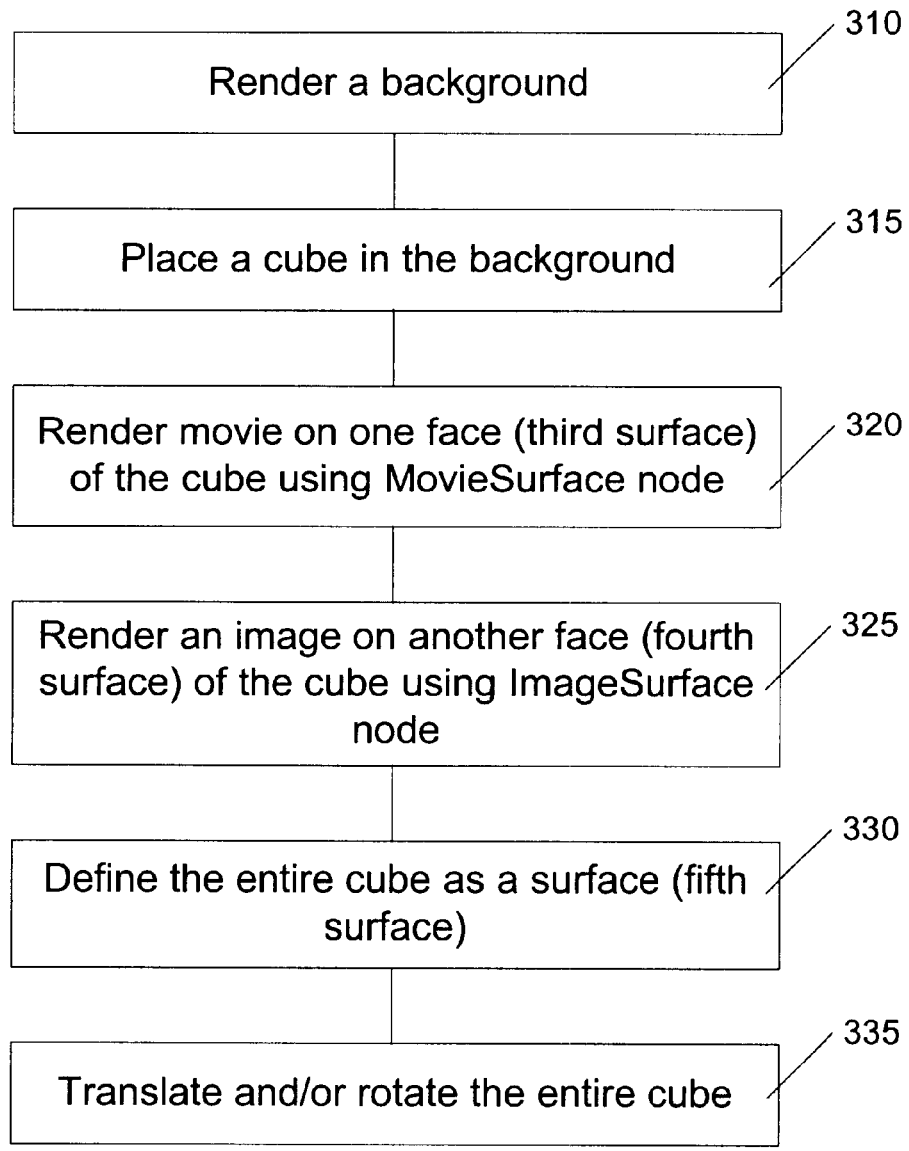
FIG. 3B is a flow chart showing acts performed to render the nested scene of FIG. 3A.

FIG. 3A depicts a nested scene including an animated sub-scene. FIG. 3B is a flow diagram showing acts performed to render the nested scene of FIG. 3A. Block 310 renders a background image displayed on screen display 200, and block 315 places a cube 302 within the background image displayed on screen display 200. The area outside of cube 302 is part of a surface that forms the background for cube 302 on display 200. A face 304 of cube 302 is defined as a third surface. Block 320 renders a movie on the third surface using a MovieSurface node. Thus, face 304 of the cube displays a movie that is rendered on the third surface. Face 306 of cube 302 is defined as a fourth surface. Block 325 renders an image on the fourth surface using an ImageSurface node. Thus, face 306 of the cube displays an image that is rendered on the fourth surface. In block 330, the entire cube 302 is defined as a fifth surface and in block 335 this fifth surface is translated and/or rotated thereby creating a moving cube 52 with a movie playing on face 304 and a static image displayed on face 306. A different rendering can be displayed on each face of cube 302 by following the procedure described above. It should be noted that blocks 310 to 335 can be done in any sequence including starting all the blocks 310 to 335 at the same time.

It is to be understood that the present invention is independent of Blendo, and it can be part of an embodiment separate from Blendo. It is also to be understood that while the description of the invention describes 3D scene rendering, the invention is equally applicable to 2D scene rendering. The surface model enables authors to freely intermix image and video effects with 2D and 3D geometric mapping and animation.

While particular embodiments of the present invention have been shown and described it will be apparent to those skilled in the art that changes and modifications may be made without departing from this invention in its broader aspect and, therefore, the appended claims are to encompass within their scope all such changes and modifications as fall within the true sprit and scope of this invention.

APPENDIX A

Blendo

An Extensible Media Modeling Architecture

Motivation

• Introduction

In late 1998, the Sony Distributed Systems Lab initiated a research project to investigate the concept of *Steerable Media*: giving users control of a rich, declaratively authored, multimedia experience. The engine created to execute this content was named *Blendo*, for its ability to seamlessly blend many media types, such as 2D and 3D graphics, still and moving imagery, video and audio streams into a cohesive experience. Targetted at a range of consumer appliances, from PCs to internet terminals to set-top boxes, the design goals of the engine make it appropriate for a wide spectrum of multimedia applications. Furthermore, its VRML heritage makes it an appropriate candidate architecture for the next generation of that technology.

Blendo is a declarative system for describing interactive objects using a variety of media types. In spite of its declarative nature, Blendo includes a powerful built-in scripting capability as well as accessibility to external procedural engines such as Java. Blendo also provides a mechanism for integration with page description languages such as HTML or XML. This makes it appropriate for a wide variety of multimedia applications, from consumer appliances to large simulations and multi-user games.

• The Design of Blendo

The Blendo architecture was designed to satisfy a number of requirements. Some of these have been derived from the design goals of VRML 97. Others are a result of a VRML community survey about perceived requirements for the next generation of that technology. Still others have been derived from one of the foundation concepts of the Steerable Media Project itself.

> "Our development process will consist of three interleaved phases. We will develop content scenarios that we feel are compelling in this space. Then we will design a platform on which to run these content scenarios. We will implement this design and the content scenario. We will use what we learn from this experience to modify the scenario and then the design." - *Steerable Media project summary*

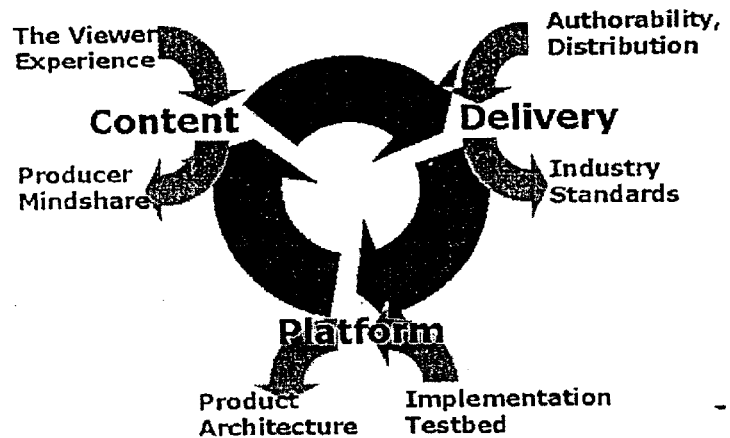

Steerable Media: the development process

The design goals presented here are broken into categories which represent the major capabilities needed for a powerful multimedia authoring solution.

Compatibility

Compatibility VRML97 is of primary importance. In addition to leveraging existing content, it also leverages knowledge gained by authors. But due to the fact that VRML97 contains a small number of underspecified features, full compatibility is not possible. These requirements attempt to balance the two:

- Common syntax - Where possible, the VRML97 textual format shall be maintained.
- Migration - Where VRML 97 syntax leads to poorly defined constructs, syntax changes are allowed. To allow easy migration, tools shall be provided to convert as large a portion of existing content as possible.
- Transparency of conversion - In some profiles, migration tools will be transparent, providing VRML 97 compatibility for as much content as possible.
- Support for JSAI and EAI - At some profiles and levels it shall be possible to run EAI and JSAI based VRML applications unmodified.

Core Runtime

Some applications of VRML require a browser with a relatively small footprint. Others require a large amount of functionality. It is important to meet both of these seemingly contradictory goals with the core runtime engine. The core provides the underlying functionality for the entire system. At the lowest profile levels, the core is very small and grows as profiles are added and levels increase.

- Small Core - The core runtime engine must be small at the simplest profiles and lowest levels.
- Extensible Core - It shall be possible to add functionality to the core to increase its capability without breaking the existing runtime features.
- Profiles and levels - The author must have a mechanism to indicate the capabilities of an incoming file or stream, to allow browsers to adaptively load capabilities or to reject a file containing unsupported functionality. This must allow the indication of a set of features (profiles) as well as the functional level (levels) of each feature set.
- Basic types - A set of basic types shall be available at all levels and profiles. These include a base object from which all nodes and fields may be extended, integral and floating point numbers including a double-precision floating point number, strings and boolean values.

Scalability

VRML 97 strives to be a scalable technology. But this is a goal that has never been fully realized. Blendo attempts to solve the technical problems involved and give authors the tools necessary to create very complex and/or very media rich environments:

- Load control - There shall be mechanisms available to the author to control when a given asset is loaded. There shall also be a mechanism to allow the explicit unloading of a given asset.
- Load notification - There shall be a mechanism for informing the author of the load status of a given asset, including an indication of when loading is complete or has failed.
- Preloading - Mechanisms shall be provided to allow an author to indicate that the use of some asset is imminent. This gives assets with a finite startup latency time to become ready when needed.

Authorability

One of the most important successes of VRML has been its ease of authoring. A VRML text file is easy to author using a simple text editor and the composition capabilities allows a world to be made up of many separate files. The ability to write programmatic behaviors in an easy to use scripting language has also been a great benefit. Blendo will extend this capability to make authoring even easier and giving authors even more powerful tools.

- Composability - A mechanism shall be made available to authors to compose a final scene from elements located in many separate files and streams.
- Consistent representation - A file shall be usable as a root scene or included as an element of a larger scene. The mechanism for inclusion shall be the same whether the element is included directly or as a file.
- Element interfacing - The mechanism for composing elements into a larger scene shall have the ability to provide a field interface to each element.
- Textual editing - At some profiles and levels an easy to author, VRML 97 like Appendix A - Page 4 text format shall be made available to authors.
- Built-in programming - A built-in scripting language, tightly integrated with the file syntax, shall be provided at some levels and profiles.
- Consistency - There shall be a high level of consistency exhibited in content run across multiple platforms and multiple runtimes. This includes high fidelity of the rendering appearance as well as consistent behavior execution.
- Metadata - A mechanism for adding author supplied data to a given object type shall be provided. It shall furthermore be possible to perform a variety of search operations on this data.

Object Model

VRML 97 suffered from an incomplete object model. This made extending the functionality of existing nodes difficult and prevented the implementation of a strong typing system. For instance, the SFNode class did not have encoded into it any notion of allowable node types. Blendo will correct this shortcoming to provide a more authorable declarative environment.

- True object model - It shall be possible to create a new object with characteristics derived from a given object or objects. This new object shall present the appropriate interface of the derived objects to its clients. The implementation of these interfaces can be obtained from the derived objects or directly from the new object.
- Common objects - The system shall allow the creation of new field types in addition to new node types.
- Typed node fields - A node field shall require the specification of the object types allowed in that field. Allowable objects are the specified object as well as any object derived from it.
- Common type querying - Whether an object has inherited the implementation of a given object or just its interface, there shall be a common mechanism for querying a supported interface.
- Object hierarchy - A profile and level comprising a given set of objects shall fully specify the hierarchy of those objects. New objects must be able to inherit from any object in this hierarchy.
- Namespaces - A notion of namespaces shall be used to allow access to named objects in various elements of the scene. A mechanism for disambiguating namespaces in both the file formats and at runtime shall be provided.

Event Model

The VRML event model is problematic for authors because the order of event propagation is undefined and several steps of the event sequence are deferred until later in the event cycle. This makes it difficult to create predictable behavior in complex event networks. Blendo makes the event propagation mechanism simple and predictable with both syntactic and semantic modifications.

- Determinism - For a given set of inputs, the path through the event graph and the order of event execution shall be deterministic across all implementations.

Appendix A - Page 5

- Simplicity - The event model shall be simple. It shall be possible to handle events with minimum runtime overhead. The event model must also adhere to the *rule of least surprise* (an action resulting from an event should be easy for an author to understand).
- Author control - The author shall be able to exert control over the event model to change its behavior. The author shall be able to intercept the processing of an event in order to defer or reorder it.

Extensibility

In addition to the notion of profiles and levels, used to tune the size of a runtime engine for a given application, the author must have the ability to add custom programmatic functionality to a specific content piece. This allows the author to provide features not present in the runtime or to provide enhanced performance for a specific function. Throughout this document this feature is referred to as *native extensibility*, regardless of the language used:

- Common extensibility mechanism - Regardless of the language used, a given extension shall appear the same inside the runtime. A natively implemented object shall present the same interface to the system as an object created directly in Blendo.
- Common subclassing - It shall be possible to create a new object by deriving existing built-in or authored objects, regardless of the language used to implement either. For instance, if the system supports both ECMAScript and Java, an authored object written in Java can be derived by an object written in ECMAScript.
- Language optimizations - A given implementation may provide optimized mechanisms for creating an extension using a given language. For instance, an implementation might provide a Java hierarchy of classes to make implementing extensions in that language especially efficient.

Programming API

VRML has a very limited set of programmable API's. Authors need a more powerful set to allow the implementation of custom functionality and to exert more control over the system. Blendo attempts to solve this with a richer set of procedural interfaces and a more efficient and more tightly integrated built-in scripting mechanism.

- Built-in language - The core, at some profile level, shall provide a built-in and fully integrated language. This language shall be lightweight but must provide full access to the underlying API.
- Common API - Whether the built-in language or a supported native language is used, the same API functionality shall be provided.
- Implementation dependence - Some supported native languages (such as Java) shall have a well specified API as part of this specification. Others (such as C++) may have an implementation dependent API.
- Introspection - The API shall allow access to components of a given node. This Appendix A - Page 6 includes access to the type, name and value of fields, the DEF name and bounding box of a node (if appropriate). For certain object types access to the dictionary of exported DEF names and prototype names shall also be made available.
- Completeness - For a given profile and level, it must be possible to implement every object contained therein with the corresponding API. For instance, a profile containing an IndexedFaceSet node would contain an API to provide programmatic access to an underlying renderer for this shape. This would allow the author to, for instance, prototype new nodes with similar functionality to that of the IndexedFaceSet.
- Object specification - The implementation of each object of a given profile and level, using the built-in language and the API of that profile and level, shall be provided as part of its specification. Given a runtime engine supporting the API of a given profile and level but without any of its objects, it shall be possible to execute any appropriate content using the object implementations contained in the specification. As a compliance verification, it shall be possible to configure the runtime to perform this test.

Media Integration

VRML 97 had a very simple media model which had difficulty dealing with the streaming aspects of some media types. Blendo strives to solve these problems by providing a rich and common base for audio, video, animation timing and still images. Additionally Blendo will provide complete integration of all media types, including 2D and 3D graphics, audio, video, still images and application generated elements:

- Synchronization - It shall be possible to specify a common time base for a set of media to allow for very high quality synchronization of audio, video and animation.
- Streaming formats - Each profile and level shall have a well defined set of supported formats. The format of the resource descriptor for a given stream type shall also be well defined.
- Media tracking - Each timed media element shall provide a mechanism for tracking its current temporal position.
- Surface rendering - It shall be possible to render a subset of scene elements to a separate 2D surface for further composition as a texture or other 2D element.
- Application rendering - At some levels and profiles it shall be possible for the main rendering loop to use surfaces rendered by other applications, possibly in other threads or process spaces. There shall be well defined mechanisms for synchronization between these renderings.

Page Integration

A large body of work has been done since the creation of VRML in the area of integration of various media types in a document. Blendo uses these concepts to allow both the direct integration of Blendo elements in a XML document as well as interaction between the page and the Blendo scene using DOM. Blendo also attempts to improve the integration of 2D geometric elements into the 3D scene.

- Common support - There shall be some level of page integration at every level of the runtime intended for use in a HTML or XML environment. This shall include passing events and values to and from the page and may include integrated rendering of HTML or XML content inside a Blendo scene.
- Runtime integration - The page integration feature shall handle value changes at runtime intended for the scene. Also, events sent from the scene intended for the page at runtime shall properly affect the rendered page. For instance, if an interface is provided to change the color of a body of text, an event sent from the scene at any time shall signal the page to appropriately affect the text.
- DOM integration - The W3C Document Object Model shall be used to affect the interface between the page and the scene.
- Encapsulation - At some profiles and levels it shall be possible to represent rendered page elements inside a Blendo scene. DOM interfacing shall be used for communication between the two.

Sensory Apparatus

VRML 97 provides a rich set of sensors. Blendo will improve on this set and provide more capability to existing sensors:

- API access - To give the author the ability to more finely control the operation of a given sensor, its underlying API shall be exposed. For instance, a PlaneSensor shall provide a scene picking API, as well as transformations to convert between a 2D and 3D coordinate system.
- Collision - As mentioned above, a profile providing some declarative collision sensing capability shall also provide an API to this functionality.
- Full set of sensors - Sensors and/or API's shall be provided at a given profile and level to provide full access to the set of user input devices provided on a given platform. This means access to keyboard events as well as alternate mouse button presses and other user valuator devices (e.g., joysticks).

Advanced Rendering

In recent years many advanced rendering techniques have become available to cost effective hardware. Blendo will allow these capabilities to be used when available:

- Rendering support - At some profiles and levels, advanced rendering capabilities will be made available to authors, in both declarative and programmatic forms.
- Graceful degradation - There shall be a well defined behavior on every platform for a rendering feature not available on that platform.

Blendo

An Extensible Media Modeling Architecture

Highlights

● Major Innovations

Blendo makes several innovations over previous efforts. Some of these enhance an author's ability to easily create rich media conent. Others make Blendo appropriate for a wide range of applications. Still others give authors tools to produce effects not available in previous systems. Blendo innovates in the following areas:

Surfaces

A surface is a 2 dimensional pixel array upon which one or more assets are rendered. A rendered surface can be used for subsequent compositing with other surfaces and multiple surfaces can be combined using image processing operations. A surface can also be used as the source pixels for simple texturing operations, or as one of a number of assets in a more complex multitexturing operation. All these various operations can be combined to produce richly composed, dynamic imagery in real time.

At the base of the surface hierarchy is the SurfaceNode. From this is derived the ImageSurface, containing a static, file based image, the MovieSurface, containing a stream based movie, and a SceneSurface, containing a child scene graph. These provide the basic building blocks for most simple surface operations. A Texture node has a surface field which can contain any of the above surface types. This allows, for instance, a static image to be rendered on the face of a spinning piece of geometry while a movie is rendered on another. The resulting scene graph can be placed in a SceneSurface, which can be used as the texture of a third geometric object. The result is an arbitrary piece of geometry textured with an animated scene.

For more complex operations there is a MatteSurface. This combines two source surfaces into a third surface, using a specified combination operation. This allows the blending of two images using a constant blend operation or the alpha channel from one or both surfaces. By combining MatteSurface nodes, an animated monochrome image sequence can be used to perform a complex wipe between two surface. These DVE effects are very useful for professional quality presentations and can be done easily and efficiently with MatteSurface.

By using surfaces as the sources for a multitexturing operation, a complex combination of blended images and layered textures can be applied to objects for rich, photorealistic effects.

Another use for surfaces is in the ApplicationSurface node. This node takes an arbitrary URL as its field, referencing any one of a number of file or stream formats. If supported, the data contained in reference is rendered into the surface. This can be done using a built-in renderer, or by spawning an external application, setting its rendering destination to the given surface. This presents the possibility of rendering any conceivable data inside the Blendo scene.

Routing

Blendo maintains the notion of routing from VRML97, but adds a new, more compact syntax to the Blendo text format. This new syntax adds the ability to place routes directly in the source or destination node. For instance:

```
DEF SENSOR IntervalSensor { ... }
DEF PI PositionInterpolator {
    key ...
    keyValue ...
    fraction FROM SENSOR.fraction
    value TO T.translation
}
DEF T Transform { ... }
```

In the PositionInterpolator above, the lines:

```
fraction FROM SENSOR.fraction
value TO T.translation
``` are equivalent to the VRML97 constructs:

```
ROUTE SENSOR.fraction TO PI.fraction
ROUTE PI.value TO T.translation
```

The compact routing syntax aids the author by being easier to type, easier to see the routing relationship, and allows for fewer DEF names.

Timing model

Blendo has a strong timed media capability. Rather than supporting a set of nodes with related timing semantics (AudioClip, MovieTexture, TimeSensor), Blendo introduces a single TimeBase node. This is included as a field of any timed node and supplies a common set of timing semantics to all media. In fact, through the familiar node instancing mechanism of VRML, the same TimeBase can be used for a number of related media nodes, ensuring perfect synchronization.

In addition to the common timed nodes for audio, video and animation, Blendo also has a set of nodes used for sequencing media events. The Score is a timed node and therefore derives it timing from a TimeBase. The Score has list of Cue nodes which emit events at the time specified. For instance, the following example emits a string to preload an image asset, then performs an animation using that image, then runs a movie:

```
Score {
    timeBase DEF TB TimeBase { }
    cue [
        FieldCue {
            cueValue String "image1.png"
            cueOut TO ISURF.url
        }
        IntervalCue {
            delay    0.5
            period   2.5      # 2.5 second animation
            fraction TO PI.fraction
        }
        DEF MC MediaCue {
            offset 2
        }
    ]
}
# Slide out image
DEF T Transform {
    children Shape {
        appearance Appearance {
            texture Texture {
                surface DEF ISURF ImageSurface { }
            }
        }
        geometry IndexedFaceSet { ... }
    }
}
DEF PI PositionInterpolator {
    key ...
    keyValue ...
    value TO T.translation
}
# Movie
Shape {
    appearance Appearance {
        texture Texture {
            surface MovieSurface {
                url "myMovie.mpg"
                timeBase USE MC
            }
        }
    }
    geometry IndexedFaceSet { ... }
}
```

All Cue nodes in a Score fire relative to the media time of the TimeBase. In the above example, the FieldCue fires as soon as the TimeBase starts because it has default offset and delay fields. The IntervalCue then start 0.5 seconds later and runs for the next 2.5 seconds, increasing its fraction output from 0 to 1. The MediaCue starts 2 seconds after the TimeBase starts, or when the IntervalCue is 1.5 seconds into its animation. This example shows the ability of the Cues to be offset from each other or from the TimeBase and shows that a subsequent Cue can start before the last one has finished.

The MediaCue gives a powerful synchronization tool to the author. MediaCue is a

Appendix A - Page 11 form of Cue which behaves exactly like a TimeBase. In fact, a MediaCue can be used anywhere a TimeBase can, as shown in the above example. But since a MediaCue is embedded in a timed sequence of events, an implementation has enough information to request preloading on an asset. For instance, in the above example, if the implementation knows that a movie takes 0.5 seconds to preload and play instantly, it can send a "get ready" signal to the MovieSurface 1.5 seconds after the start of the TimeBase. This would give it the required 0.5 seconds to preload. When the request came in to start playing, the movie would start instantly.

The combination of the TimeBase and media sequencing capabilities make Blendo a powerful tool for creating presentations with complex timing.

Event model

There has been a large body of work on the VRML event model from a number of groups. In its own research, the Blendo team has found that a simple event model is sufficient for the large majority of tasks. Therefore Blendo has very simple built-in event semantics. First of all, Blendo replaces the notion of field, exposedField, eventIn and eventOut with a single concept of field. Any field can be initialized, read or written and routed to or from.

The model used for event propagation in Blendo is that of event listeners on output fields. When a field value is changed, its listeners are notified in the order in which they were added. This causes events to follow a depth-first order. In cases where multiple events into a node need to be delivered before any processing, an eventsProcessed( ) method as in VRML 97 is used. A node containing an eventsProcessed( ) method is added to an event list upon receipt of the first event to that node in a given cascade. A cascade is ended when the last event resulting from the initiating stimulus is processed. The accumulated eventsProcessed( ) methods are then called in the order in which they were added to the list. These occur in subsequent cascades and therefore each has a unique timestamp. In VRML 97 there are a number of other *post-cascade* events. For instance, a newly added or newly stimulated ProximitySensor produces one of these events. In Blendo, all these events are added to the event list along with eventsProcessed( ) and are executed, each with a unique timestamp, in the order they appear in the list.

The above event model description allows for deterministic behavior across platforms and runtime engines. But there are a small number of cases where the author needs to exert more control over the event propagation. This could be as simple as handling the events going into a single node specially, to producing a breadth first, prioritized event ordering for every node. Blendo provides authoring tools to handle this situation by allowing the default behavior handler to be subclassed. This new handler can then replace the default to obtain the event behavior desired.

Object model

Blendo introduces the concept of a true object model to the system architecture. At the core of the system is the *Object*, from which all other objects are derived. Unlike VRML both fields and nodes exist in the same object hierarchy. Since all objects are created using the prototyping mechanism (see below), it is possible to create prototypes of fields as well as nodes. This unifying principle allows fields to be fully typed, whether holding node values or more primitive field values. For instance, the Shape node would be described as follows (using the abstract VRML node syntax):

```
Shape {
    field Appearance    appearance NULL
    field GeometryNode  geometry   NULL
}
```

In VRML, the above fields would have both had the type SFNode, and there would have been no semantic way to distinguish the actual node types. In Blendo the above makes it clear that the *appearance* field must be of type Appearance or one of its derived types. The *geometry* field would be of type GeometryNode, which is an abstract type. Blendo uses the convention of adding the suffix *Node* to abstract types to distinguish them from concrete types. An IndexedFaceSet node is derived from GeometryNode, so it would be legal in the geometry field. But the Group node is not derived from GeometryNode, so it would not be allowed.

A Blendo object can be derived from multiple objects using a prototype aggegation mechanism. This allows a single object to present the interface of several objects. This capability is important in several situations. For example, the MovieSurface node is derived from both the SurfaceNode and the AudioSourceNode. This allows it to be used in the *surface* field of a Texture node (allowing the movie to be textured onto the surface of a shape), and in the *source* field of an AmbientSound node (allowing the sound of the movie to be heard).

The Blendo Node Reference section shows a complete hierarchy of each node in the system.

Prototyping

The ability to create new objects is provided by the prototyping facility. Prototyped objects can be implemented in Blendo directly, or in one of the supported external languages. For instance, the following example shows how to add a new field type, node type and how to use them:

```
PROTO PosShape : Field [
    field Vec3f position 0 0 0
    field Shape shape     NULL
]
PROTO ShapeArray : ChildNode [
    field MF PosShape array [ ] {
        G.children.setNum(0); // clear children list
        for (var i = 0; i < array.length(); ++i) {
            var t = new Transform();
            t.translation = array[i].position;
            t.children[0] = array[i].shape;
            G.children[i] = t;
        }
    }
    DEF G Group { }
}
```

Appendix A - Page 13

```
ShapeArray {
    array [
        1 2 3 DEF S1 Shape { ... }
        4 5 6 USE S1
        7 8 9 USE S1
        6 5 4 DEF S2 Shape { ... }
        3 2 1 USE S2
    ]
}
```

In the example above, PosShape is a new field type containing a Vec3f and a Shape node (or node derived from Shape). This is used as a field type in ShapeArray, which is a node containing an array of shapes positioned by the *position* field of PosShape. ShapeArray is derived from ChildNode because this is the base class for all nodes allowed at the top level or as children of grouping nodes. Note how Blendo omits the SF prefix from single value field names. For multiple value fields, the prefix MF is used. This allows any built-in or authored object type to be used as a single or multiple value field and resembles the familiar VRML 97 style.

This ability to aggregate the capabilities of fields as well as nodes gives Blendo both a symmetry which is easy to understand and a powerful tool to construct clear application specific data structures.

Built-in scripting

In the example in the previous section, the ShapeArray node specifies an implementation for the *array* field, using the built-in scripting language. This language is a simplified version of ECMAScript. Features of ECMAScript missing include the ability to create arbitrary objects and arrays. Also missing are the complex scoping rules of ECMAScript and the with statement. All these omissions allow the language interpreter to be much smaller while allowing the author to make use of existing ECMAScript experience.

In Blendo, object instances with initialized fields receive initial events with the given values on those fields. In the example above, when the node is initialized, the array field receives an event with 5 PosShape values. It uses these to construct Transform nodes, to hold the position and shape. These are then made children of the Group node. This demonstrates the simplicity and power afforded by the built-in scripting language.

Extensibility

In addition to built-in scripting, a Blendo prototype can be expressed in any supported external language. For instance, a Java implementation would appear as follows:

```
EXTERNPROTO MyNode "mynode.class"

MyNode {
    aField 1 2 3
    bField "Hello, world"
}
```

Appendix A - Page 14

This would instantiate MyNode, which has a pure Java implementation. Note that the EXTERNPROTO syntax does not include a specification for the field types. This makes authoring much simpler and since Blendo performs node initialization in a separate pass from parsing, the syntax is legal. In this case, before MyNode is instantiated the Java class is loaded and initialized. This initialization defines the fields of the node type by creating a prototype for the MyNode object type. An instance of MyNode is then created, the prototype is used to look up the field names, and the fields are initialized. Any errors, such as misspelled or mistyped fields, are detected at this point.

The implementation of the Java class would be quite simple. The Object class is subclassed and the getProto( ) method is implemented. This method instantiates a Proto object and then initializes it with the appropriate field names, types and initial values. It also adds types from which this object is derived. This is necessary even though Java has its own class hierarchy because the derivation tree must be available throughout the Blendo runtime system, and this is done through the Proto objects. When an event is sent to a field of MyNode, a notify( ) method in the Java class is called, the appropriate processing is performed and events are potentially emitted.

This simple mechanism is used for nodes implemented in C++ or any other supported external language.

Blendo also supports an *anonymous prototype* syntax. If the prototype name is omitted from either a PROTO or EXTERNPROTO statement, then it must be followed by a node instance body (field initializations enclosed within braces). For instance, the above example could be rewritten:

```
EXTERNPROTO "mynode.class" {
    aField 1 2 3
    bField "Hello, world"
}
```

This form is more compact and easily readable when an object is included or defined which will be used only once. It makes the creation of simple scripts very simple. For instance, to add 1 to the y component of a Vec3f as it goes from a PositionInterpolator to a Transform is simple:

```
DEF PI PositionInterpolator {
    key ...
    keyValue ...
    value TO S.in
}
DEF S PROTO [
    field SFVec3f out
    field SFVec3f in {
        out = new Vec3f(in.x, in.y+1, in.z);
    }
] { }
DEF T Transform {
    translation FROM S.out
}
```

Note the use of the FROM keyword in the Transform node. The Blendo compact route syntax allows the spefication of routes in both directions for convenience. The anonymous prototyping syntax allow prototypes to be used in place of Script nodes (which have been removed from Blendo), with the same compactness and clarity.

For complete consistency, the EXTERNPROTO statement is also used to include Blendo files. In that case, the top level interface of the Blendo file being included becomes the field interface of the prototype. This makes the field storage and access mechanisms very consistent across prototypes contained directly inline, in separate Blendo files, or implemented with an external language. This makes the implementation more compact and consistent in its behavior.

Compatibility

Even though Blendo makes significant architectural changes, it has a high degree of compatibility with VRML 97. The redesigned prototype semantics, removal of the Script node and simplified event model were done with compatibility in mind. Incompatibilities will most likely arise from some poorly defined areas of the VRML specification, especially in the areas of event handling and IS mapping. But it is expected that these will be rare and will be easily fixable. The result will be improved content that will behave consistently across platforms.

For syntactic differences, converters will be supplied. In some profiles and levels, these will be invoked automatically to provide transparent VRML 97 compatibility. The biggest syntactic issues arise in the areas of prototypes and Script nodes. As an example of the conversion of these, here is a side-by-side comparison:

```
#VRML V2.0 utf8                                  #X3D V1.0 utf8

PROTO NodeA [                                    PROTO NodeA [
    eventIn      SFFloat   in1                       field Float   in1     ;
    field        SFVec3f   field1 0 0 0              field Vec3f   field1 0 0 0
    exposedField MFNode    efield1 [ ]               field MF Node efield1 [ ]
    eventOut     SFVec3f   out1                      field Vec3f   out1    ;

DEF T Transform {                                DEF T Transform {
        translation IS field1                            translation FROM field1
        children IS efield1                              children    FROM efield1
    }                                                }
    DEF S Script {                                   DEF S PROTO [
        field     SFFloat last 0                         field Float last 0
        eventOut SFVec3f out  IS out1                    field Vec3f out  TO out1
        eventIn  SFFloat in   IS in1                     field Float in   FROM in1
        url "vrmlscript:
            function in(val,ts) {                        {
                v = (val-last);                              v = (in-last);
                out = new SFVec3f(1,v,1);                    out = new Vec3f(1,v,1);
                last = val;                                  last = val;
            }                                            }
        "                                            ] { }
    }
    ROUTE S.out TO T.scale                           ROUTE S.out TO T.scale
}                                                }

NodeA { field1 1 2 3 }                           NodeA { field1 1 2 3 }
```

Appendix A - Page 16

It is clear from the above example that the syntactic differences are minor in most cases. Since Blendo uses a single field notion rather than separate eventIns and eventOuts, a syntactic element, the semicolon has been introduced into the Blendo text format to allow the initial value of fields to be omitted. This can be placed after a field name to indicate that an initializer is not present.

Note that Blendo replaces IS mapping with routing statements. This makes the semantics much more clear, but causes one minor compatibility issue. In VRML 97 it is possible to change the value of an exposedField internally. Since VRML 97 was not very flexible in how exposedFields could be used in a prototype, their use is rare. But in the above example, if the children field of the Transform were changed, an event to efield1 would be generated in some implementations. In the conversion to Blendo, this event would not be sent, since there is only a route from efield1 to children. This conversion was chosen because it is much more common (and more well specified) for an event to efield1 to change children.

It is these sorts of "edge conditions" where compatibility problems will appear. But these are also where the compatibility problems between existing VRML 97 browsers occur. Converters can be written to maximize the compatibility of migrated content. The small amount of remaining worlds can be converted by hand.

Blendo

An Extensible Media Modeling Architecture

Concepts

●Conventions Used

The following conventions are used throughout this part of the Blendo proposal:

*Italics* are used for field names, and are also used when new terms are introduced and equation variables are referenced.

`A fixed-space font` is used for URL addresses and source code examples.

While Blendo supports a variety of textual and binary formats, this section shows examples in the native UTF-8 encoding. Nodes are shown as a capitalized name followed by an open brace, followed by field initializations, ending with a closing brace. A named node is preceeded by the keyword DEF and an identifier.

Blendo uses an object hierarchy, with every object in the system derived from one or more parent nodes. Some nodes are intended to be instantiated while others are *abstract*, intended to be derived by other objects. Abstract nodes append *Node* to the name, while instantiated nodes do not. For instance, *SurfaceNode* is an abstract node while *ImageSurface* is intended to be instantiated.

Examples appear in `bold, fixed-space` font. In some examples prototypes are used to introduce new object types. Unless otherwise noted, prototypes are specified using the keyword PROTO, followed by a name and an opening bracket. The body of the prototype follows and is ended with a closing bracket.

Node type names are appropriately capitalized (e.g., "The Billboard node is a grouping node..."). However, the concept of the node is often referred to in lower case in order to refer to the semantics of the node, not the node itself (e.g., "To rotate the billboard...").

The form "0xhh" expresses a byte as a hexadecimal number representing the bit configuration for that byte.

•Overview

Basic concepts

Blendo is an architecture for describing 2D and 3D multimedia applications. It contains both declarative elements (nodes and field connections) and procedural elements (executable code).The basic structure of Blendo is the *scene graph*, which describes the visible and behavioral elements and their relationship to one another. Central to Blendo is the runtime environment, which represents the current state of the scene graph, renders it as needed, and performs changes to it in response to instructions from the behavioral system.

Typically, the author of Blendo content begins by writing a Blendo file or stream containing the initial state of the application along with the declarative and procedural statements which describe its behavior over time. A Blendo file can be purely declarative, with behaviors described in terms of nodes and connections between their fields. Or it can be purely procedural, with the visual and behavioral elements built dynamically as part of the application execution. But often it is a combination of both.

The Blendo file or stream, heretofor referred to simply as a *file* must be viewed as a mere snapshot of the application. While the file describes a particular structure at a particular time (typically when the application starts), this structure can change rapidly as the application proceeds. A file is a complete representation of the runtime environment at any given time. In other words, anything that can be represented by the runtime can be written to a file. While not required, a Blendo implementation that has the ability to write a Blendo file can do so at any time to save an accurate and complete representation of the runtime environment at that instant.

The runtime system makes available a set of zero or more *built-inobjects*. An object contains some set of functionality useful in the Blendo environment. It may represent a data structure, such as a *Vec3f*, a rendered primitive, such as a *Cylinder*, or some behavioral function, such as a *TouchSensor*. Each object contains zero or more *properties*, which define storage for data values or functions for operating on that data. For instance, a property might contain the height or radius of the Cylinder, or whether or not the TouchSensor is enabled.

Objects must be instantiated to be used. This is done automatically by declaring them in the file or at runtime, using procedural code. The author can also create new object types using the prototyping mechanism. These become part of the runtime system and behave exactly like built-in objects. These can be created declaratively by including a prototype in a file, or by including an object written in a supported native language, such as Java or C++.

• Architecture

Blendo comprises a complete architecture rather than simply a language. This includes a file format, with binary, utf8 and XML variants. But it also specifies the environment into which those files are injected, and mechanisms used to display, interact, modify and extend the scene. In fact, Blendo is more than a single scene. It is a system comprising potentially multiple scenes along with various pieces of script logic and native code used to manipulate and control them. Order of evaluation of each scene element and execution order of every script is well defined and is controlled by the Blendo runtime engine.

Blendo has components to control the creation and management of scenes, rendering and behavior, and media asset management. There are also components to control the loading and incorporation of authored extensions, which can be written in Blendo, or a supported external language such as C++, Java or ECMAScript.

The basic Blendo architecture is shown below:

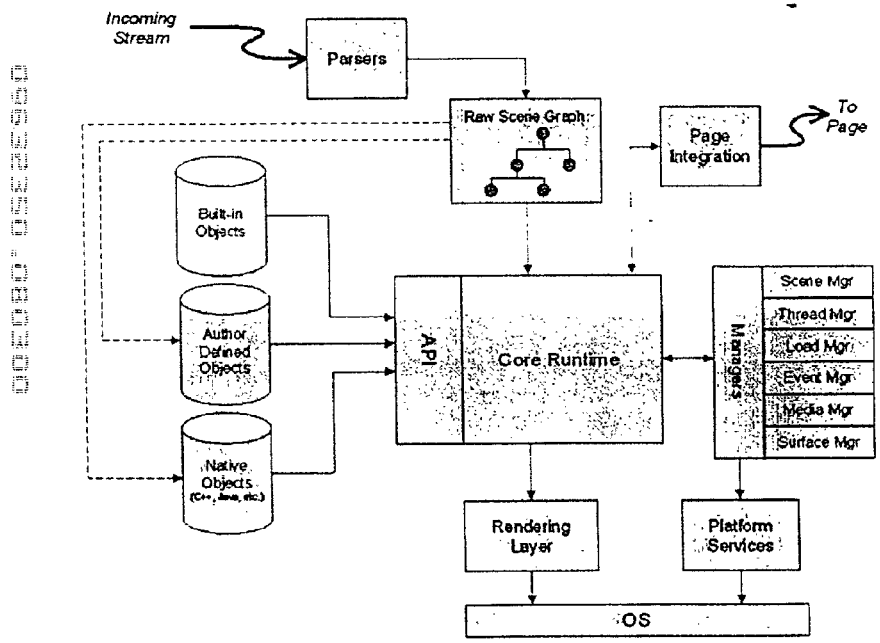

Figure 1 - Blendo Architecture

At the core of the Blendo architecture is a *Core Runtime* which presents various API elements and the object model to a set of objects present in the system. During normal operation, a file is parsed into a *Raw Scene Graph* and passed on to the core, where its objects are instantiated and the runtime scene graph is built. Objects can be one of three types: *Built-in*, *Author-defined*, or *Native*. Objects use the set of available *Managers* to obtain platform services such as event handling, loading of assets and playing of media. Objects use the *Rendering Layer* to compose intermediate or final images for display. A *Page integration* component is used to interface Blendo to an external environment, such as a HTML or XML page.

Object model

The Blendo system contains an object hierarchy. Every object derives some of its functionality from it parent objects, and then extends or modifies it. At the base of the hierarchy is *Object*. The two main classes of object derived from this are *Node* and *Field*. Nodes contain, among other things, a *render* method which gets called as part of the render traversal. The data properties of nodes are called *fields*, to match familiar VRML nomenclature. All function properties are of type *Function*, which is derived directly from Object. Objects derived from Field do not have a render method. They are typically used to hold data values for node fields.

Properties are typed by describing which objects they are allowed to contain as data. For instance, the *translation* field of a Transform node is of type Vec3f. Only objects of this type or derived from this type may appear as data values of this property. The radius property of a Cylinder node, on the other hand, is of type *Float*. Float is one of the basic numeric types. It is derived from Field, but it does not contain any properties other than its implicit value. There are several other basic types, which are described below.

At the lowest level, the core contains only very primitive objects including:

- Object - The root system object from all others are derived.
- String - The representation of a UTF8 character string.
- Atom - A string-based object. Two atoms referencing the same string contain a common identifier.
- Float, Double - Floating point numbers.
- Int32, Uint32, Int16, Uint16, Int8, Uint8 - Integral numbers.
- Bool - Boolean (true, false) value.
- Field - A named, typed property of an object containing a value of the given type.
- Proto - A prototype for an object.
- Function - A function written in the built-in scripting language or in a native extension language.

All other objects in the system are derived from the above core set.

In this set, the *Proto* object defines the implementation of each object in the system. It contains information about the name and type of each property of the object. For some objects it also contains a list of prototypes and routes defined in its scope. An object instance is always created through a function call to its Proto object.

*Note: In the current design the core runtime profile contains a level 1 which contains a small set of geometric nodes and corresponding API. This level does not support the notion of an extensible object model. Therefore, the description here refers to the level 2 and above core runtime.*

There are three reasons for the existance of the Field object. First, it provides a storage unit for data values of any type derived from Field. Second, it allows implementors to optimize storage of these types, especially in node fields. Third, it allows a syntactic differentiation in the various file formats. For instance, in the VRML 97 textual format, fields are initialized by listing the values of the field in order. This is contrasted with the initialization of nodes, which require the node name to be given, followed by field names and initialization values, enclosed in braces. This distinction in initialization style makes the VRML textual format simple to understand and author. The separation of Nodes and Fields into separate hierarchies allows this syntactic variation to be encoded in these root objects.

This allows familiar VRML syntactic constructs to be created, such as:

```
MyNode { myField 1 2 3 }
``` where MyNode is a normal object (not derived from Field). MyNode contains a property called myField which is of type Vec3f, derived from Field. Furthermore, Vec3f contains 3 properties, x, y, and z, each of type Float. Without the special semantics of Field, the above would have to be written as:

```
MyNode {
    myField Vec3f { x 1 y 2 z 3 }
}
```

It is important to note that the Blendo semantic rules for file parsing (and the raw scene graph) allow both forms for field types. But the first form allows a more compact representation when it is expected that a value for each property will be needed. Note also that, although a familiar VRML 97-like syntax is shown, the same semantic rules apply to the binary and XML formats.

Prototype creation

Objects come from three sources. *Built-in objects* are objects that are available to the author with any additional description. Different profiles have a different set of built-in objects. *Author defined objects* are objects that the author creates using a PROTO or EXTERNPROTO statement in one of the Blendo file formats. *Native objects* are objects added to the system using the EXTERNPROTO statement, written in a supported extension language, such as C++ or Java. Some profiles do not support this capability.

Raw Scene Graph

Every Blendo presentation begins with a file or stream of Blendo content. In reality, Blendo could be linked with a custom application which generated an entire scene programmatically. But this is a special case and is a subset of the general flow Appendix A - Page 22 through the Blendo engine. A description of the flow of content through the system is given below. This is a conceptual description. A compliant blendo engine must behave as though it were operating as shown, although the actual implementation may be quite different.

Content typically flows into an appropriate parser. At different profiles and levels source could be a native VRML-like textual format, a native binary format, or an XML based format. But regardless of the incoming format, all streams are converted into a *Raw Scene Graph*. This structure represents all the nodes, fields and other objects in the content, as well as field initialization values. It also contains a description of all object prototypes, external prototype references in the stream, and route statements.

At the top-level of the raw scene graph are all the nodes, top-level fields and functions, prototypes and routes contained in the file. It is important to note that, unlike VRML, Blendo allows fields and functions at the top-level in addition to the traditional elements. These are used to provide an interface to an external environment, such as a HTML page. They also provide the object interface when a file or stream is used as the contents of an external prototype.

Each *Raw Node* contains a list of the fields initialized within its context. Each field is a *Raw Field* entry containing the name, type (if given) and data value(s) for that field. Each data value contains either a number, a string, a raw node or a raw field (to represent an explicitly typed field value).

The prototypes are extracted from the top level of the raw scene graph and used to populate the database of object prototypes accessible by this scene. The raw scene graph is then sent through a build traversal. During this traversal, each object is built, using the database of object prototypes. Objects built from authored prototypes are able to execute code (either BlendoScript or an external language) to aid in the creation of the object. But no other object is accessible at this time and no events may be sent from fields of the instance. During the creation of a node, its publically accessible DEF name is added to the root DEF dictionary, if appropriate.

Next all routes in the file or stream are established. Since the scene is traversed and the DEF dictionary is built in a previous pass, the *from* and *to* node names of the route can be forward references. This has the advantage of greater authorability, but it also adds the restriction that DEF names in a stream may not be duplicated. For backward compatibility, VRML files with duplicate names are preprocessed to make the names unique. For completeness, a USE of a node may come before its DEF.

Next, each field in the scene is initialized. Initial events are sent to all non-default fields of all objects. Since the scene graph structure is achieved through the use of node fields, this step constructs the scene hierarchy as well. Events are fired using inorder traversal. The first node encountered enumerates its fields. If a field is a node, that node is first traversed which initialized all nodes in that branch of the tree. Then an event is sent to that node field with its initial value.

After a given node has had all its fields initialized, the initialize( ) method of that node is called. This allows authors to add initialization logic to prototyped objects and be assured that the node is fully initialized when called. The initialize( ) method of converted VRML 97 Script nodes would be called at this time as well.

The result of the above steps produces a root scene which is delivered to a *Scene Manager* created for this file. The scene manager is then used to render and perform behavioral processing, either implicitly or under author control.

Event routing

Events can be injected into the Blendo environment from several sources. Typically, nodes register interest in specific event types, such as timing, keyboard or pointing device events. When the given event occurs, the node receives notification and can potentially change the value of one or more of its fields. Blendo has a mechanism called *routing*, which allows an author to declaratively connect fields together. When the value of a source routed field changes, the corresponding destination routed field receives notification and can process a response to that change. This processing can change the state of the node, generate additional events, or change the structure of the scene graph.

Events conceptually follow an *event listener* model of processing. When a route is established, the source field is assigned a listener, which is the node and field where the route is destined. When a field value changes, it notifies each listener in the order in which it was assigned. This implies a *depth-first* order of event distribution. The routes along a single event chain execute in sequence, followed by the next chain and so on. This sequence is controlled by the *Event Manager* and can be changed by installing authored *event handlers* into the Event Manager.

Nodes created through the Blendo prototyping mechanism give authors an opportunity to create custom processing of incoming events. Events coming into a prototyped node through an interface field can be routed to internal nodes for processing, or routed to other interface fields for propagation outside the node. An author can also add programmatic processing logic to an interface field using the internal scripting language. For more information on event processing, see section ???.

Managers

Blendo contains a System object with references to a set of managers. Each manager provides a set of APIs to control some aspect of the system. The *Event Manager* provides access to incoming system events, originated by user input or environmental events. The *Load Manager* facilitates the loading of Blendo files and native node implementations. The *Media Manager* provides the ability to load, control and play audio, image and video media assets. The *Render Manager* allows the creation and management of objects used to render scenes. The *Scene Manager* controls the scene graph. The *Surface Manager* allows the creation and management of surfaces onto which scene elements and other assets may be composited. The *Thread Manager* gives authors the ability to spawn and control threads and to communicate between them.

Page Integration

Blendo includes a *Page Integration* profile, which allows the Blendo runtime environment to interact with page oriented environments such as HTML browsers. This mechanism is used by including an element, <X3DScene> in the document which introduces a Blendo file to the page environment. After introduction, the top level fields in the Blendo file are made available to the page through the <X3DParam> (for communication from the page to the scene) and <X3DObserver> (for communication from the scene to the page) elements. Using the DOM API to access these elements, runtime control of the scene can be provided by procedural elements on the page.

● Profiles and Levels

Blendo provides a component architecture, which segregates functionality into independent units. Components are grouped into sets providing complementary functions called *profiles*. Each profile can provide varying degrees of capability, known as *levels*. A complete Blendo runtime engine consists of a set of these profiles and levels. This allows implementations to be tuned to a particular application space, providing a solution that is both capable and compact.

Blendo files must announce the profiles and levels supported in the upcoming file. This may be intrinsic in the file format (such as a DTD in an XML file) or can be a specific syntactic element. For instance, in the Blendo textual format, the keyword PROFILE is used. For instance:

```
#X3D V1.0 utf8

PROFILE audio(2) core(3)
PROFILE proto(1)

...
```

This example indicates that the following file supports level 2 of the audio profile, level 3 of the core profile and level 1 of the proto profile. A specific profile and level refer to the set of objects and syntactic elements. Including a given profile and level in a file does not necessarily indicate that any objects or syntactic elements from that set are included in the file. But including an object or syntactic element without introducing its profile and level produces undefined results. Behavior can include rejection of the entire file, an error message with the rest of the file elements intact, or silent completion of the parsing operation with the offending constructs ignored.

One required behavior has to do with prototyped nodes. Take an implementation that supports a profile and level which includes a node named, for instance, Foo. If an author requests that profile and level using the PROFILE statement, then creates a prototyped node named Foo, undefined behavior results. But if the author did not request that profile and level, an implementation must accept the prototype without error and use it in place of the built-in Foo. For simplicity, an implementation may choose to always override built-in node names with prototyped names. But an author should not rely on this behavior, since other implementations may reject such files.

Validating vs. non-validating parsers

To balance the need for fast and efficient parsers with the need for testable compliance, Blendo supports the notion of *validating* as well as *non-validating* parsers. A validating parser for a given format is required to generate user visible errors for all syntactic and semantic errors which can occur in that format. If producing a raw scene graph for input to the engine (as opposed to an offline file validator) the scene produced must omit any nodes or constructs which were in error. This may sometimes mean that an empty scene is produced.

A non-validating parser must accept all syntactically and semantically correct files (as indicated by a validating parser) and produce compliant behavior. But incorrect files may be processed with a wide latitude of acceptable results. The only requirement is that the resulting scene may not cause the runtime to enter an unrecoverable failure state (crashing or hanging). It is expected that most production runtime engines will contain non-validating parsers for efficiency, and that validating parsers will be used in authoring tools and offline file validators.

Scene graph structure

The basic unit of the Blendo runtime environment is the *scene graph*. This structure contains all the objects in the system and their relationships. Relationships are contained along several axes of the scene graph. The *transformation hierarchy* describes the spatial relationship of rendering objects. The *top-level interface* describes the external interface of a scene fragment with a given file scope. The *behavior graph* describes the connections between fields and the flow of events through the system. The *media graph* describes the relationships between the various timed media elements in the scene. Other relationships, such as the surface node hierarchy and texture hierarchy are described in the node reference.

Transformation hierarchy

The transformation hierarchy includes all of the top-level nodes and their descendants that are considered to have one or more particular locations in the scene. Blendo includes the notion of *local coordinate systems*, defined in terms of transformations from ancestor coordinate systems. The coordinate system in which the top-level nodes are displayed is called the *world coordinate system*.

Some nodes, such as Switch, contain a list of children, of which at most one is traversed during rendering. But for the purposes of computing scene position all children of these nodes are considered to be part of the transformation hierarchy, whether they are traversed during rendering or not. For instance, a Viewpoint node which is a child of a Switch whose whichChoice field is set to -1 (indicating that none of its children should be traversed during rendering) still uses the local coordinate space of the Switch to determine its position in the scene.

The transformation hierarchy shall be a directed acyclic graph; results are undefined if a node in the transformation hierarchy is its own ancestor.

Top-level interface

Typically, a Blendo file contains one of more top-level nodes. These nodes establish the root of the scene, if the given file is the root file, or the top-level nodes of a prototype instance, if the given file is the target of an EXTERNPROTO. These nodes are traversed during rendering, picking and other scene operations. But they have no visibility outside the scope of the file.

A Blendo file may also contain top-level field and function declarations. These properties constitute the external interface of the file. Agents outside the scope of the file have access to these fields and functions. If the given file is the target of an EXTERNPROTO, these fields and functions are the interface of nodes instantiated from the prototype. If the given file is the root file, these fields and functions are accessible outside the Blendo runtime engine. For instance, in a page integration profile, they become the interface to the page. If it is desirable to make one or more top-level nodes of the file externally accessible, a field may be declared and initialized with the node value(s).

Behavior Graph

The event model of Blendo allows the declaration of connections between fields and a model for the propagation of events along those connections. The behavior graph is the collection of these field connections. It can be changed dynamically by rerouting, adding or breaking connections. Events are injected into the system and propagate through the behavior graph in a well defined order.

Fields must be routed to other fields with the same type or derived from the same type. One extension of this rule is that array objects may be routed from non-array objects of the same or derived type. This is because an array object is considered to be derived from its corresponding non-array object. For instance, if a node with a DEF name of *A* has a field *b* of type Vec3f and a node with a DEF name of *C* has a field *d* of type MF Vec3f, then the following is legal:

ROUTE A.b TO C.d

When an event is sent the destination field results in a single value which matches the source value.

Media graph

Blendo formalizes the relationship among the various media nodes. This includes AmbientSound, AudioStream, MovieSurface and TimeBase. The AmbientSound Appendix A - Page 27 node has a *source* field which is given a node of type AudioSourceNode.
AudioStream is derived from AudioSourceNode and can therefore be placed in the
source field. When the AudioStream plays its sound clip, it is sent to the
AmbientSound node using the interfaces in AudioSourceNode where it is mixed with
other sounds in the system. This generalization allows MovieSurface, which is also
derived from AudioSourceNode, to be placed in the source field of AmbientSound as
well. It also provides a mechanism for extending the capability of the media system.
For instance, at higher levels of the audio profile there is an AudioMixer node. This is
derived from AudioSourceNode and also has a source field which takes one or more
instances of AudioSourceNode. This allows complex media graphs to be constructed:

```
AmbientSound {
    source AudioMixer {
        source [
            AudioMixer {
                source [
                    AudioStream {
                        url "sound1.wav"
                    }
                    AudioStream {
                        url "sound2.wav"
                    }
                ]
                intensity [ 0.5, 0.7 ]
            }
            AudioStream {
                url "sound3.wav"
            }
        ]
        intensity [ 0.8, 0.9 ]
    }
}
```

The above graph mixes the first two sounds with the given intensities, then mixes the
result with a third sound and again adjusts the intensities. With the above structure
it is possible to add filter nodes to add effects such as echo and bandpass filtering.

Even though the syntactic structure of the media graph is identical to that of the
transformation hierarchy, the semantics are quite different. In the case of audio, clips
flow up the graph to the parents which performs some sort of processing and then
pass the result up the graph again until a "rendering" node, such as AmbientSound,
is encountered. The media graph can be thought of as a temporal graph where the
transformation hierarchy is a spatial graph.

The surface related nodes have similar structure and when applied to movie surfaces
have a similar temporal component. But the processing occurs on a sequence of
image data rather than audio clips. For instance:

```
Shape {
    appearance Appearance {
        texture Texture {
            surface MatteSurface {
                surface1 MovieSurface {
                    url "movie.mpg"
                }
                surface2 ImageSurface {
                    url "gradient.png"
                }
```

Appendix A - Page 28

```
                operator "REPLACE_ALPHA"
            }
        }
    }
    geometry IndexedFaceSet { ... }
}
```

All surface producing nodes are derived from SurfaceNode and can therefore be placed in any of the given surface fields. In the above example, the MovieSurface is combined with the static alpha gradient, and the result is texture mapped, frame by frame to the given IndexedFaceSet. Again, new surface producing nodes can be created and added to the system to produce new image processing effects.

● System Concepts

Standard units and coordinate system

Blendo defines the unit of measure of the world coordinate system to be metres. All other coordinate systems are built from transformations based from the world coordinate system. Table 4.2 lists standard units.

Table 4.2 -- Standard units

| Category | Unit |
|---|---|
| Linear distance | Metres |
| Angles | Radians |
| Time | Seconds |
| Colour space | RGB ([0.,1.], [0.,1.], [0., 1.]) |

Blendo uses a Cartesian, right-handed, three-dimensional coordinate system. By default, the viewer is on the Z-axis looking down the -Z-axis toward the origin with +X to the right and +Y straight up. A modelling transformation (see Transform) or viewing transformation (see Viewpoint) can be used to alter this default projection.

Run-time name scope

Each Blendo file defines a run-time name scope that contains all of the root nodes of the file and all of the descendent nodes of the root nodes, with the exception of nodes hidden inside another name scope. Prototypes establish a name scope and therefore nodes inside prototype instances are hidden from the parent name scope. However top-level fields in the prototype instance are exposed to the parent scope. So when it is desired to expose a node to the parent scope it simply needs to be placed in a field of the corresponding node type, or parent type.

Nodes created dynamically (using the built-in scripting language or through an extension language) are not part of any name scope until they are added to the scene graph, at which point they become part of the same name scope as their parent node(s). A node may be part of more than one run-time name scope. A node shall be removed from a name scope when it is removed from the scene graph.

● Blendo and the World Wide Web

URLs and URNs

A *URL* (Uniform Resource Locator), described in 2.[URL], specifies a file located on a particular server and accessed through a specified protocol (e.g., http). In Blendo, the upper-case term URL refers to a Uniform Resource Locator, while the italicized lower-case version *url* refers to a field which may contain URLs or in-line encoded data.

All web addresses used in Blendo are actually *URNs* (Uniform Resource Name), which is a superset of the URL concept. A URN allows an abstract resolution mechanism to be invoked to locate a resource. This allows a resource to located on the local machine or a platform dependent resource to be located using the URN along with platform specific identifiers. FOr instance, the following URNs can be used:

```
urn:vrml:vrml.org:textures/wood/mahogany
urn:vrml:mycompany.com:nodes/CustomNodeSet#ExplosionEffect
```

The first URN would use the vrml resolver, which locates a resource using the vrml.org resolution base. The user may have previously downloaded a set of standard image assets from the VRML.ORG site, which were placed in a location on the local machine indexed by vrml.org base. The resolver would attempt to find the resource in the local file system, starting at this base. If found, an acceptable image suffix would be appended to the mahogany keyword and an attempt would be made to load the given texture. If no acceptable image formats were available, the resolver might go to the VRML.ORG site to download an acceptable asset.

The second URN would use the same resolver, but would locate resources based at the possibly proprietary mycompany.com resolution base. This base might contain resources custom to a particular browser. This URN refers to custom node implementations for this browser. So the path is searched for an executable file appropriate for the current platform. If found, the executable is loaded and added to the browser node resources and an attempt is made to find the ExplosionEffect node. If found, an instance of such a node could be created. Otherwise, the resolver might go to the MYCOMPANY.COM site to load an apporpriate implementation (after the appropriate security precautions have been taken). Or a platform independent implementation (perhaps written in Java) might be loaded.

All *url* fields are of type MF URL. The URL field type contains a string which can be either an absolute web address or relative to the owner of the field. Rules for resolving relative URLs are given in the reference section for the URL object. The url field takes multiple URL strings to indicate multiple locations to search for data in Appendix A - Page 30 decreasing order of preference. If the browser cannot locate or interpret the data specified by the first location, it shall try the second and subsequent locations in order until a URL containing interpretable data is encountered. If no interpretable URL's are located, the node type defines the resultant default behaviour. This typically includes the sending of some sort of failure event to allow for handling of this exceptional condition.

●Object semantics

Blendo has a single object hierarchy. Objects representing lightweight concepts such as data storage and operations on data of that type are called *fields* and are derived from the Field object. Objects representing more complete spatial or temporal processing concepts are called *nodes* and are derived from the Node object. Nodes contain typed properties which are also referred to as fields, for compatibility with VRML nomenclature. But a field inside a node can contain an object of any type, not just those derived from Field. This means that a node can contain a field which has a type of Node or some type derived from Node. In this way, the hierarchical structure of the scene graph is created.

A node field can contain either a single value of the given type or an array of such types. Throughout this document, a field containing a single value is said to be of the given type (e.g., field *a* is of type Vec3f), while a field containing an array has its type prefixed by the keyword MF (e.g., field *b* is of type MF Vec3f). The Blendo textual file format follows this naming in its syntax.

Each object has the following common characteristics:

a. A type name. Examples include Vec3f, Color, Group, Float, AmbientSound, or SpotLight.
   b. Zero or more properties that define how each object differs from other objects of the same type. A property has a name and an object type.
   c. An implementation. The implementation of each object defines how it reacts to changes in its property values, what other property values it alters as a result of these changes, and how it effects the state of the runtime environment.

An object derived from Node has the following additional characteristics:

a. A set of events that it can receive and send. Each node may receive events to its fields which will result in some change to the node's state. Each node may also generate events from its fields to report changes in the node's state. Events generated from one node can be connected to fields of other nodes to propagate these changes. This is done using the ROUTE statement in the file or through an API call.
   b. A name. Nodes can be named using either the DEF statement in the file or through an API call. This is used by other statements to reference a specific instantiation of a node. It is also be used to locate a specific named node within Appendix A - Page 31 the scene hierarchy.

DEF/USE semantics

A node given a name using the DEF statement may be referenced by name with USE or ROUTE statements. The USE statement does not create a copy of the node. Instead, the same node is inserted into the scene graph a second time, resulting in the node having multiple parents. Using an instance of a node multiple times is called *multiple instantiation*.

Node names are limited in scope to a single Blendo file or prototype definition. A node name defined in a file, outside any PROTO definition, can be referenced only by USE or ROUTE statements within that same file and also outside any PROTO definitions. A node name defined within a given PROTO can be referenced only by USE or ROUTE statements within that same PROTO.

There is no required order for node name definitions and references in a file. For example, a node name may appear in a USE statement before it appears in a DEF statement. Therefore duplicate node names within a given scope (in a file or within a PROTO) are not allowed. Undefined behavior will result if duplicate names are used.

Shapes and geometry

The Shape node associates a geometry node with nodes that define that geometry's appearance. Shape nodes shall be part of the transformation hierarchy to have any visible result, and the transformation hierarchy shall contain Shape nodes for any geometry to be visible. A Shape node contains exactly one geometry node in its *geometry* field, which is of type GeometryNode.

Appearance nodes

Shape nodes may specify an appearance node in its *appearance* field, which is of type AppearanceNode. This node describes the appearance properties (material and texture) to be applied to the Shape's geometry. The core profile contains an Appearance node which is derived from AppearanceNode and contains fields for the material and texture properties. The *material* field, which is of type MaterialNode, contains color and transparency information. The *texture* field, which is of type Texture, contains information about the texture image and how it is to be applied to the geometry.

The interaction between the appearance properties and properties specific to geometry nodes is described in Lighting Model.

Common geometry fields

Certain geometry nodes have several fields that provide information about the rendering of the geometry. Such nodes are derived from FaceSetNodeThese fields specify the vertex ordering, if the shape is solid, if the shape contains convex faces, and at what angle a crease appears between faces, and are named *ccw*, *solid*, *convex* and *creaseAngle*, respectively.

The *ccw* field defines the ordering of the vertex coordinates of the geometry with respect to user-given or automatically generated normal vectors used in the lighting model equations. If *ccw* is TRUE, the normals shall follow the right hand rule; the orientation of each normal with respect to the vertices (taken in order) shall be such that the vertices appear to be oriented in a counterclockwise order when the vertices are viewed (in the local coordinate system of the Shape) from the opposite direction as the normal. If *ccw* is FALSE, the normals shall be oriented in the opposite direction. If normals are not generated but are supplied using a Normal node, and the orientation of the normals does not match the setting of the *ccw* field, results are undefined.

The *solid* field determines whether one or both sides of each polygon shall be displayed. If *solid* is FALSE, each polygon shall be visible regardless of the viewing direction (i.e., no backface culling shall be done, and two-sided lighting shall be performed to illuminate both sides of lit surfaces). If *solid* is TRUE, the visibility of each polygon shall be determined as follows: Let $V$ be the position of the viewer in the local coordinate system of the geometry. Let $N$ be the geometric normal vector of the polygon, and let $P$ be any point (besides the local origin) in the plane defined by the polygon's vertices. Then if $(V \text{ dot } N) - (N \text{ dot } P)$ is greater than zero, the polygon shall be visible; if it is less than or equal to zero, the polygon shall be invisible (backface culled).

The *convex* field indicates whether all polygons in the shape are convex (TRUE). A polygon is convex if it is planar, does not intersect itself, and all of the interior angles at its vertices are less than 180 degrees. Non-planar and self-intersecting polygons may produce undefined results even if the *convex* field is FALSE.

The *creaseAngle* field affects how default normals are generated. If the angle between the geometric normals of two adjacent faces is less than the crease angle, normals shall be calculated so that the faces are smooth-shaded across the edge; otherwise, normals shall be calculated so that a lighting discontinuity across the edge is produced. For example, a crease angle of 0.5 radians means that an edge between two adjacent polygonal faces will be smooth shaded if the geometric normals of the two faces form an angle that is less than 0.5 radians. Otherwise, the faces will appear faceted. Crease angles shall be greater than or equal to 0.0.

Bounding boxes

All nodes that may be part of the transformation hierarchy are derived from ChildNode. This object type not only validates nodes that may be rendered, but also establishes a *bounding box* for such nodes. The bounding box is used as a rendering optimization and to give authors information for custom processing. For instance, the bounding box can be used to do simple collision detection between objects.

A bounding box is a rectangular parallelepiped surrounding each geometric shape or Appendix A - Page 33 group of shapes contained within the ChildNode. When queried it is returned as a size and position either in the local coordinate system or in the accumulated world coordinate system.

Grouping and children nodes

Any node which can contain a list of nodes participating in the transformation hierarchy is derived from GroupingNode, which is, in turn, derived from ChildNode. This means that all grouping nodes contain a bounding box, which is the aggregate bounding box of all its children.

Light sources

Shape nodes are illuminated by the sum of all of the lights in the world that affect them. This includes the contribution of both the direct and ambient illumination from light sources. Ambient illumination results from the scattering and reflection of light originally emitted directly by light sources. The amount of ambient_light is associated with the individual lights in the scene. This is a gross approximation to how ambient reflection actually occurs in nature.

Any node used as a source of illumination is derived from LightNode. All light sources contain an *intensity*, a *color*, and an *ambientIntensity* field. The *intensity* field specifies the brightness of the direct emission from the light, and the *ambientIntensity* specifies the intensity of the ambient emission from the light. Light intensity may range from 0.0 (no light emission) to 1.0 (full intensity). The *color* field specifies the spectral colour properties of both the direct and ambient light emission as an RGB value.

Sensor nodes

Sensors are nodes which emit events based on some event which occurs in the environment. This event could be the passage of time, the activation of some user input device, or the alteration of other elements of the runtime environment, such as the user's viewpoint. Sensors are derived from SensorNode, which is, in turn, derived from ChildNode. Therefore, sensors appear in the transformation hierarchy. Some sensors, such as those generating time or keyboard events, operate independent of their position in the hierarchy. Others, such as those sensing the picking of objects in the scene, are sensitive only to interaction with their peer nodes. Still others, such as those detecting the movement of the camera through the scene, are dependent on their parent transformation for placement.

Interpolator nodes

Interpolator nodes are designed for keyframed animation. The simplest type of interpolator defines a piecewise-linear function, *f(t)*, on the interval *(-infinity, +infinity)*. The piecewise-linear function is defined by $n$ values of $t$, called *key*, and the $n$ corresponding values of *f(t)*, called *keyValue*. The keys shall be monotonically Appendix A - Page 34 non-decreasing, otherwise the results are undefined. The keys are not restricted to any interval.

An interpolator node evaluates $f(t)$ given any value of $t$ (via the *set_fraction* eventIn) as follows: Let the $n$ keys $t_0, t_1, t_2, ..., t_{n-1}$ partition the domain (*-infinity, +infinity*) into the $n+1$ subintervals given by (*-infinity,* $t_0$), [$t_0, t_1$), [$t_1, t_2$), ... , [$t_{n-1}$, *+infinity*). Also, let the $n$ values $v_0, v_1, v_2, ..., v_{n-1}$ be the values of $f(t)$ at the associated key values. The piecewise-linear interpolating function, $f(t)$, is defined to be $$f(t) = v_0, \text{ if } t <= t_0,$$
$$= v_{n-1}, \text{ if } t >= t_{n-1},$$
$$= linterp(t, v_i, v_{i+1}), \text{ if } t_i <= t <= t_{i+1}$$

where $linterp(t,x,y)$ is the linear interpolant, $i$ belongs to $\{0,1,..., n-2\}$.

The third conditional value of $f(t)$ allows the defining of multiple values for a single key, (i.e., limits from both the left and right at a discontinuity in $f(t)$). The first specified value is used as the limit of $f(t)$ from the left, and the last specified value is used as the limit of $f(t)$ from the right. The value of $f(t)$ at a multiply defined key is indeterminate, but should be one of the associated limit values.

More complex curve fitting algorithms are possible when creating an interpolator, but piecewise linear interpolators are provided in level ? of the core profile.

All piecewise linear interpolator nodes are subclassed from InterpolatorNode and share a common set of fields: *fraction, key, keyValue,* and *value*.

> *Note: these 4 fields are conceptually common to all interpolators. But in this specification only the* fraction *and key fields are supplied by InterpolatorNode. The* keyValue *and value fields are typed according to the interpolator functionality and are therefore defined in each specific derived interpolator object.*

The *fraction* field receives an event of type Float and causes the interpolator function to evaluate, resulting in the *value* field changing its value.

SOme interpolators send multiple-value results to *value*. In this case, the *keyValue* field is an $n \times m$ array of values, where $n$ is the number of values in the key field and $m$ is the number of values at each keyframe. Each $m$ values in the *keyValue* field correspond, in order, to a parameter value in the *key* field. Each *value* event shall contain $m$ interpolated values. Results are undefined if the number of values in the *keyValue* field divided by the number of values in the *key* field is not a positive integer.

If an interpolator node's *value* eventOut is read before it receives any inputs, *keyValue*[0] is returned if *keyValue* is not empty. If *keyValue* is empty (i.e., [ ]), the initial value for the eventOut type is returned (e.g., (0, 0, 0) for SFVec3f).

InterpolatorNode is derived from ChildNode, allowing it to appear anywhere in the transformation hierarchy. But the location of an interpolator node in the hierarchy has no effect on its operation. For example, if a parent of an interpolator node is a Switch node with *whichChoice* set to -1 (i.e., do not traverse any of its children), the interpolator continues to operate as specified.

Time-dependent nodes

Blendo has a complete timing model. Any node that performs temporal processing is derived from TimedNode, which defines a *timeBase* field containing a node derived from TimeBaseNode. The TimeBaseNode supplies the TimedNode with a *mediaTime* field, which is of type Time. While running, this field typically generates values from 0 to the duration of the TimeBaseNode, which is determined by a number of media dependent factors. This value typically advances at a rate of one second for each second of wall clock time. For instance, an IntervalSensor, which generates a fraction value from 0 to 1 over the course of its interval, generates a fraction value whenever it receives a new mediaTime value. A MovieSurface node generates a new video frame whenever it receives a mediaTime value. The frame generated corresponds to the offset in the movie corresponding to the mediaTime value.

The mediaTime value can advance at rates other than one second per second of wall clock time and can even run backwards. This allows a MovieSurface to vary its playback rate and direction, and an IntervalSensor to generate fraction values from 1 to 0. For audio based media, it may also mean that the audio samples are rate adjusted and reversed. But this capability is not supported in all levels of the audio profile.

The most common concrete object derived from TimeBaseNode is TImeBase. This object contains *startTime*, *playTime* and *stopTime* fields to control the starting, resuming and stopping of mediaTime. These values are in units of wall clock time. It also contains *mediaStartTime* and *mediaStopTime* fields to allow a sub-interval of a media asset to be played. When startTime is reached, mediaTime begins at the value of mediaStartTime and runs until it reaches mediaStopTime or until stopTime is reached. The *loop* field can be used to control what happens when mediaTime reaches the end of its travel. If true, mediaTime returns to the the beginning and continues running. If false, mediaTime stops advancing. When the next startTime is reached, mediaTime starts over from the beginning.

The rate field controls the direction and speed at which mediaTime advances. The default rate of 1.0 causes mediaTime to advance in a positive direction at one second per second of wall clock time. Positive values greater than 1.0 advance mediaTime faster than this and positive values less than 1.0 advance mediaTime more slowly. Negative values advance mediaTime in a negative direction, starting at mediaStopTime and ending at mediaStartTime. A rate value of 0 causes mediaTime to stop advancing. It is important to note that rate controls the instantaneous rate of mediaTime. If rate is changed while mediaTime is advancing, subsequent values advance at the new rate. In fact, rate can be changed from 1.0 to -1.0 to cause mediaTime to slow, stop and then reverse.

Appendix A - Page 36

Score and Cue

Another set of timing related nodes are the Score node and nodes derived from CueNode. These provide a facility for firing a number of possibly unrelated events in sequence over the course of mediaTime. Score is derived from TimedNode and therefore has a *timeBase* field. It also has a *cue* field, which is of type MF CueNode. The CueNode contains an offset field, indicating the time from the start of mediaTime when it becomes activate. It also contains a delay field, which indicates the amount of time from the end of the last cue to delay before becoming active. These fields allow both absolute and relative offsets in the sequence of events generated. The specific action taken when a CueNode becomes active is dependent on the derived class. For example, the TimeCue node sends a *value* event at the instant it becomes activated. This value is the current wall clock time and can be used to fire an IntervalSensor, MovieSurface or other timing related node. The IntervalCue generates a *fraction* value from 0 to 1, starting when the node is activated and lasting the number of seconds in its *period* field. This is similar to the IntervalSensor, but allows the interval to run over the specified sub-period in a larger sequence of timed events.

The MediaCue is derived from both CueNode and TimeBaseNode. It is used to generate a mediaTime starting when it is activated and ending when its interval is finished. It can be USEd by other TimedNodes, such as MovieSurface and AudioStream, to allow them to run in the specified sub-interval.

Environment nodes

Several nodes provide information about how an entire scene is to be rendered. This includes the Viewpoint, Background and Fog. Some of these, especially the Viewpoint have significance in their placement in the scene. It is also often useful to have several of these nodes in a single scene and switch between them to alter the visual effects or to give the user control over the scene. Blendo has an Environment node which has *viewpoint* and *background* fields as well as fields for other environmental nodes. Each scene searches for an Environment node and uses the first one encountered. This allows multiple scenes to use the same scene graph, each with a different viewpoint, for instance:

```
Group {
    children [
        Environment {
            viewpoint USE V1
        }
        DEF MainScene Group {
            ... some nice scene ...
            DEF V1 Viewpoint { ... }
            DEF V2 Viewpoint { ... }
        }
        Shape {
            appearance Appearance {
                texture Texture {
                    surface SceneSurface {
                        children [
                            Environment {
                                viewpoint USE V2
                            }
                            USE MainScene
```

```
                    ]
                }
            }
        }
        geometry IndexedFaceSet {
            coord Coordinate {
                point [ -2 -2 0, -1 -2 0, -1 -1 0, -2 -1 0 ]
            }
            coordIndex [ 0 1 2 3 -1 ]
        }
    }
  ]
}
```

In the above example, the main scene is rendered from the perspective of viewpoint V1. It is also rendered as a texture onto a small square in the lower left corner using viewpoint V2.

Surfaces, Images and Textures

A *surface* is a 2D image that contains an array of colour values called *pixels*. Surface are often used as the source image of a texturing operation. The pixel values are interpreted differently depending on the number of components in the surface. In general, texture maps are described using one of the following forms:

a. *Intensity textures* (one-component)
b. *Intensity plus alpha opacity textures* (two-component)
c. *Full RGB textures* (three-component)
d. *Full RGB plus alpha opacity textures* (four-component)

Note that when the source for a surface is image data, most image formats specify an alpha opacity, not transparency (where alpha = 1 - transparency). Therefore all surfaces types containing transparency information are considered to contain alpha opacity values.

Image formats

A source image using the PNG (see 2.[PNG]) image format shall interpret the PNG pixel formats in the following way:

a. Greyscale pixels without alpha or simple transparency are treated as intensity textures.
b. Greyscale pixels with alpha or simple transparency are treated as intensity plus alpha textures.
c. RGB pixels without alpha channel or simple transparency are treated as full RGB textures.
d. RGB pixels with alpha channel or simple transparency are treated as full RGB plus alpha textures.

If the image specifies colours as indexed-colour (i.e., palettes or colourmaps), the following semantics should be used (note that `greyscale' refers to a palette entry with equal red, green, and blue values):

Appendix A - Page 38 e. If all the colours in the palette are greyscale and there is no transparency chunk, it is treated as an intensity texture.
f. If all the colours in the palette are greyscale and there is a transparency chunk, it is treated as an intensity plus opacity texture.
g. If any colour in the palette is not grey and there is no transparency chunk, it is treated as a full RGB texture.
h. If any colour in the palette is not grey and there is a transparency chunk, it is treated as a full RGB plus alpha texture.

A source image using the JPEG (see 2.[JPEG]) image format shall interpret JPEG files as follows:

i. Greyscale files (number of components equals 1) are treated as intensity textures.
j. YCbCr files are treated as full RGB textures.
k. No other JPEG file types are required. It is recommended that other JPEG files are treated as a full RGB textures.

A surface containing a single frame of a MPEG file (see 2.[MPEG]) at a given moment of time shall treat MPEG files as full RGB images.

Prototype semantics

Blendo contains a prototyping mechanim tied closely to the object model. All objects (except the base objects such as Object and Float) can be expressed as prototypes. Each prototype constructs an object of its own, of type Proto. Prototypes can be constructed in one of 3 ways:

- Directly by including declarative Blendo statements within a PROTO statement.
- Indirectly by including a Blendo file in an EXTERNPROTO statement.
- By including a reference to a resource containing a native node extension using the EXTERNPROTO statement.

Regardless of the method for construction, the resultant Proto appears the same to the runtime environment. An instance of the proto may be created, the fields of the resultant node may be read and written and functions of the node can be called.

For example:

```
PROTO MyNode [
    field Float fractionIn
    {
        if (fractionIn >= 0 && fractionIn <= 1)
            fractionOut = 1-fractionIn;
    }
    field Float fractionOut 0
]
```

This describes a prototype for MyNode, which takes a *fractionIn* event and generates an inverse event at *fractionOut*, as long as the value is between zero and one. This node could be instantiated and routed between an IntervalSensor and an interpolator to reverse the direction of the interpolation. The contents of the proto (everything between the brackets) could also be placed in a separate Blendo file, along with the required header line, and the result would be a legal file. If this file were named "MyNode.blo" it could be used in a proto:

EXTERNPROTO MyNode "MyNode.blo"

This expression would create a Proto identical to the previous example in every way. Likewise, if the same example were coded in an extension language, such as C++ or Java, it could be included as follows:

EXTERNPROTO MyNode "MyNode.class"

Assuming the native implementation of the node created the fields, installed them into the Proto and performed the proper operation when an event was received, this expression would produce an identical Proto as well.

This symmetry allows for simplicity in the handling of prototypes and Blendo files. For instance, an implementation could choose to create the root scene by first instantiating an external prototype, giving it the name of the root Blendo file, and instantiating a node of that type.

Scoping rules

Prototypes have file scope and their names must therefore be unique within a given file. A prototype can appear in a file after an instantiation of that prototype. One prototype can appear inside another, but its scope is limited to the outermost prototype. However a prototype can instantiate nodes contained within the scope of an enclosing prototype or at the top-level file scope. For instance:

```
#X3D...
    PROTO Proto1 [ ... ]
    PROTO Proto2 [
        PROTO Proto3 [
            Proto2 { }      # legal, proto is in enclosing scope
            Proto1 { }      # legal, proto is at top-level scope
        ]
        Proto3 { }          # legal, proto is at same scope level
    ]
    PROTO Proto4 [
        Proto3 { }          # illegal, proto is hidden in Proto2's scope
        Proto2 { }          # legal, proto is at same scope level
    ]
```

In the above example, only the instantiation of Proto3 in Proto4 is illegal, because Proto3 is not accessible outside the scope of Proto2.

A prototype can be exposed outside the scope of the enclosing prototype using a top-level field. For instance:

PROTO Proto2 [

```
        field Proto proto3 PROTO Proto3 [ ... ]
]
```

Proto3 is now exposed through the field *proto3*. This prototype can now be instantiated declaratively using the dereferencing syntax:

```
DEF P Proto2 { }

P.proto3 { }
```

This allows entire libraries of prototypes to be included in a Blendo file:

```
EXTERNPROTO WidgetLibrary "WidgetLibrary.blo"
DEF WL WidgetLibrary { }

WL.Button { label "go" }
WL.Slider { min 0 max 10 color 0.8 0.2 0 }
```

PROTO interface declaration semantics

The prototype interface defines the fields and functions for the new node type. When defining a prototype using one of the Blendo file formats, an interface declaration for a field includes the type, name, initial value and function for the field. An interface declaration for a function includes the name, return type, a list of parameter names and types, and the body of the function. Here is an example using the Blendo textual format:

```
PROTO MyNode [
    field Vec3f a 0 0 0
    field Float b ;
    field MyFieldType c { a = new Vec3f(0,c,0); }
    field Bool d true { b = new Float(d); } function e(num) {
        v = new MF(Vec2f);
        v.length = num;
        for (i = 0; i < num; ++i)
            v[i] = new Vec2f(i,i+1);
        return v;
    }
]
```

In this example the prototype has 4 fields. The first is initialized, but has no associated function. The second has neither a function nor an initialization value. The semicolon is required in this case as a separator between fields. The third field has a function but no initializer and the fourth has both an initializer and a function. A field without a function performs no operation, other than storage, when the field is changed. A field without an initialization value contains the default value for that field type at startup. Fields with initialization values send an initial event with that value when a node instance is created. Any routes from that field inside or outside the prototype propagate this initial event. Fields with both an initialization value and a function execute the function when the initial event is sent. Field functions are executed before any routes are propagated. Routes to fields inside the prototype propagate before routes to fields outside.

A prototype defined in one of the supported extension languages has the same attributes for fields and functions, but they are typically defined programmatically rather than declaratively.

Derivation and inheritance

Every prototype is derived from one or more *parent* prototypes. If not specified, the prototype is derived from ChildNode. A parent prototype is declared in the body of the prototype using the EXPORT statement. For example:

```
PROTO MyNode [
    DEF M Material { }
    EXPORT M

IntervalSensor {
        timeBase TimeBase { loop true }
        fraction TO CI.fraction
    }
    DEF CI ColorInterpolator {
        key [ 0 0.5 1 ]
        keyValue [ 1 0 0, 0 0 1, 1 0 0 ]
        value TO M.diffuseColor
    }
]
```

This defines a prototype for a node that can be used in place of a Material which animates *diffuseColor* between red and blue. Without the EXPORT statement, it would be an error to place an instance of this prototype in, say, the material field of an Appearance node.

Nodes can be derived from multiple parents by using multiple EXPORT statements. EXPORT makes all fields and functions of all parents appear as fields and functions of the derived node. Exported fields and functions are conceptually added to the derived prototype in the order in which the EXPORT statements appear. Duplicate field or function names, called *overriding*, take the implementation of the last addition. A field or function must be overridden with an entity of the exact same type. A field or function can be overridden in the derived prototype as well. For instance, if an implementation has a TouchSensor node and a PlaneSensor node, each with a boolean *enable* field, deriving a prototype from both would encounter a potential problem. The resulting enable field would control only one of the parents. To solve this, the derived prototype can override the field and perform a custom function:

```
PROTO TouchPlaneSensor [
    DEF TS TouchSensor { }
    DEF PS PlaneSensor { }
    EXPORT TS
    EXPORT PS
    field Bool enable true {
        TS.enable = enable;
        PS.enable = enable;
    }
]
```

Now, when enable is changed, both the TouchSensor and PlaneSensor are correctly updated.

Sometimes, it may be necessary to export a parent type rather than the instantiated type. The EXPORT statement supports this with the AS modifier. For instance, a
prototype might instantiate a TimeBase node to provide start and stop control for
some function, but only export it as a TimeBaseNode so only the mediaTime field is
exported. This would be done as follows:

```
PROTO MediaController {
    field Bool run false {
        if (run)
            TB.startTime = Time.now();
        else TB.stopTime = Time.now();
    }
    DEF TB TimeBase { }
    EXPORT TB AS TimeBaseNode
]
```

Since the TimeBase node is exported as a TimeBaseNode, only the fields of that object
(i.e., mediaTime), are exported. The resultant prototype contains two fields:
*mediaTime* and *run*.

Private fields and functions

Normally, all top-level fields and functions in a prototype are exported. But each field
and function can be marked private to prevent this. This is often useful for
maintaining state that is global to instance, but not visible outside, or for utility
functions. In the Blendo text format, this is done using the *private* keyword. For
instance:

```
PROTO MyNode [
    field Bool run false                       # this field is exported
    private field Bool currentState false      # this field is private to the instan
    function Bool checkState() { ... }         # this function is exported
    private function change() { ... }          # this function is private to the ins
]
```

Prototype initialization

The sequence of events which occur when a request is made to instantiate a
prototype is as follows:

1. An empty prototype instance node is created.
2. Its implementation nodes are instantiated and added to the instance.
3. The fields and functions from each parent node are created, with any necessary
   overriding.
4. The fields and functions from the prototype are created, with any necessary
   overriding.
5. The prototype's build( ) function, if any, is called.
6. Any routes internal to the prototype are connected.
7. Each field with initialization values has the value set, which may generate
   events internal to the instance.
8. If an initialization value is a node, it is instantiated according to these rules
   before setting the value.
9. If an initialization value is a node, its initialize( ) function, if any, is called after
   setting the value.

Appendix A - Page 43

After this sequence, the node is typically added to the scene. Since the loading of a scene is identical to prototype instantiation, adding a prototyped node to the parent scene occurs at step 2 above. In fact, the loading of a scene is simply a recursive execution of the above sequence until all nodes are loaded and instantiated.

Anonymous prototypes

Normally, prototypes include a name to be used for later instantiation. But Blendo also supports the concept of an *anonymous prototype*. This allows a prototype without a name to be defined and immediately instantiated. It is mainly an authoring convenience but also serves to prevent pollution of the namespace with trivial prototypes. For instance:

```
DEF Invert PROTO [
    field Float fractionIn { fractionOut = 1 - fractionIn; }
    field Float fractionOut ;
] { fractionOut TO PI }
IntervalSensor {
    timeBase TimeBase { loop true }
    fraction TO Invert.fractionIn
}
DEF PI PositionInterpolator { ... }
```

This example is similar to a previous one. It shows a trivial prototype that reverses the direction of a fraction. Anonymous prototypes allow Blendo to have a construct as efficient as the VRML Script node without a separate mechanism.

Anonymous prototypes can be used with the EXTERNPROTO statement as well:

```
EXTERNPROTO "lightcontroller.class" {
    light1 TO Light1.on
    light2 TO Light2.on
    light3 TO Light3.on
}
DEF Light1 DirectionalLight { ... }
DEF Light2 DirectionalLight { ... }
DEF Light3 DirectionalLight { ... }
```

In this example, a node which exerts some control over some lights in the scene is written in Java. Since only one instance of the node will be used, an anonymous prototype provides a convenient construct to use.

● Event processing

All fields in Blendo can be made the recipient of *events*. Incoming events are data messages sent by other nodes to change some state within the receiving node. Some nodes change the contents of one or more of their fields through some internal processing, perhaps stimulated by the receipt of an event on another field of the same node. These changes can be used to effect change in fields of other nodes.

When a node is first instantiated one or more of its fields could have an initial value, set through a declarative syntax. Such a field is set to this value at a specific time Appendix A - Page 44 during the initialization of the node (see *Prototype initialization*). The setting of this value will effect change in the fields of other nodes the same as any other source of change.

Route semantics

The connection between the node generating the event and the node receiving the event is called a *route*. Routes are not nodes. The ROUTE statement is a construct for establishing event paths between specified fields of nodes. ROUTE statements may either appear at the top level of a VRML file or inside a node wherever fields may appear. The position of a ROUTE statement in a file is insignificant. It can appear before or after its source or destination node and placing a ROUTE statement within a node does not associate it with that node in any way. A ROUTE statement does follow the scoping rules as described in *Scoping rules*.

The Blendo text format has a compact route syntax which allows a field to be followed by the keyword TO and a destination node and field, or the keyword FROM and a source node and field. These are a syntactic convenience, which allows the source or destination node name to be omitted, but they are semantically identical to the full ROUTE statement.

The type of the destination field shall be the same as or derived from the source type. For the purposes of this rule, an array type is considered to be derived from the corresponding single value type. Therefore a value of type Vec3f can be routed to a value of type MF Vec3f. But the converse is not true; A MF Vec3f cannot be routed to a Vec3f.

Execution model

Once an *initial event* is generated, usually from a node responding to some environmental stimulus, the event is propagated from the field producing it along anyroutes to fields in other nodes. These other nodes may respond by generating additional events, continuing until all routes have been honoured. This process is called an *event cascade*.

Events are processing in *depth-first* order. Some nodes generate multiple events from a single stimulus. Similarly, it is possible that multiple initial events could arrive at the same time. In this case the simultaneous events have a well-defined order, usually described in the reference for each node. During processing, an event generated from a given node is sent to its destination, which performs its own processing and generates its own events before additional events from the original node are sent. The same is true for fields with multiple outgoing routes. Each route is fired in the order it was added and processing along one route is completed fully before the next route is fired.

During Processing, *deferred events* may be generated. They are typically actions which are required to complete processing but must, for some reason, be not be executed until the event cascade is complete. One example of this is the eventsProcessed( ) function. Any node may have this function. It is typically added by authors of prototyped nodes to perform some processing on a group of incoming events that may all arrive simultaneously. The eventsProcessed( ) function executes at the end of the cascade and can therefore be used to perform this group processing.

A deferred event is added to a list when it is discovered that it is needed. For eventsProcessed, this occurs when the first event is received on a node that has an eventsProcessed function. Events from many nodes can be added to this list, but only one event of a given node is ever added from a given node. Once the event cascade is finished, these events are executed in the order they were added. Each execution can potentially send additional events and is therefore considered a new event cascade. Because of this, the execution of deferred events could add additional events to the list. These are added after the last event added from the previous cascade, ensuring execution of all deferred events from one cascade before any events from subsequent cascades.

Below is the list of deferred events that can be added by the core runtime. Authors can add additional deferred events through an API to the Event Manager.

- Call shutdown( ) function for nodes being removed from the scene.
- Send final events from nodes being removed from the scene.
- Call eventsProcessed( ) function for nodes that have received events.

Fan-in and fan-out

*Fan-in* occurs when two or more routes write to the same field. Events coming into a field along different routes in the same event cascade shall be processed and the order is defined by the depth-first order rule described in *Execution model*.

*Fan-out* occurs when one field is the source for more than one route. This results in sending any event generated by the field along all routes in the order the routes were added.

• Built-in Scripting

Blendo supports a built-in scripting capability in the creation of prototypes. Each top-level field of the prototype may have an associated function which is executed when an event is sent to that field. This function may set other top-level fields or directly access (read and write) the fields of named nodes in the prototype. This field function takes no arguments and returns no values and has access to any top-level field or function in the prototype and any named node or prototype contained therein.

A prototype may also contain top-level named functions. These functions have an explicit return type, a name, and a list of arguments, each with its own name and type. These functions are available to other functions within the same prototype and may be accessed from outside an instance of the prototype unless marked with the *private* attribute.

The language is a subset of ECMAScript, and more specifically is based on VRMLScript. The main difference between the built-in scripting language and ECMAScript has to do with the lack of support for generic object and array creation and the *with* statement. Another difference has to do with handling of newly introduced local variables. In ECMAScript, these are added to the global scope unless prefixed with the *var* keyword in which case they are placed in the scope of the function. In the built-in scripting language, as in VRMLScript, new variables are placed in the function scope whether they are prefixed or not. The changes allow the built-in scripting language to be simpler, smaller and faster to execute. For more complex tasks, Blendo supports the creation of node prototypes in external languages, such as Java and C++.

*Build( ), initialize( ) and shutdown( )*

The scripting language allows several functions to be defined in a prototype with special meaning, build( ), initialize( ) and shutdown( ). The *build( )* function shall be invoked after a prototype instance is created and its implementation nodes and top-level fields and functions are created. It allows the author to perform additional node setup before any events are sent.

The *initialize( )* function shall be invoked after the node initialization is complete, the node is added to the scene, routes are established and fields have their initial values. This allows initialization tasks to be performed prior to the user interacting with the world.

The *shutdown()* function shall be invoked when the node is deleted from the scene. This function may be used as a clean-up operation, such as informing external mechanisms to remove temporary files. No other functions may be invoked after the *shutdown()* method has completed, though the *shutdown()* method may invoke methods or send events while shutting down.

See *Execution model* for additional rules governing the calling of these functions.

*EventsProcessed()*

The scripting language allows an eventsProcessed( ) function to be defined in a prototype with special meaning. It is called after an event cascade completes and the given node has received any events. See *Execution model* for additional rules governing the calling of this function. This method allows nodes that do not rely on the order of events received to generate fewer events than an equivalent node that generates events whenever events are received.

Direct outputs

The functions of a prototyped node have access to any named node in that prototype, any node whose value is contained in a top-level field, and any node passed as an argument. The fields of any node accessible to a function are also accessible from Appendix A - Page 47 that function. This includes sending events to that field by assigning to it. This is called *direct output* because a field is being set using a path other than a route. Values changed in this way behave as if an event had just arrived through the normal routing mechanism. That is, the event is delivered, any processing on the destination node is performed, and any routes from the destination field are fired in sequence. It is legal to send multiple events to the same field during the same event cascade using this technique.

System API

To access system level interfaces, the built-in scripting language has access to a System object. This object contains properties which allow access to the various system managers. For instance, the *sceneManger* property gives access to the rendering, picking and other scene graph manipulation interfaces. The *surfaceManager* property allows the creation and control of surfaces upon which images may be rendered. The loadManager property allows the loading of Blendo files and node extensions, as well as converting strings of Blendo statements into scene graph elements. Other managers are described in the *Object Reference* section.

Lighting model

The Blendo lighting model provides detailed equations which define the colours to apply to each geometric object. For each object, the values of the material, color and texture currently being applied are combined with the lights illuminating it and any other environmental nodes affecting it. These equations are designed to simulate the physical properties of light striking the surface of the object.

Lighting 'off'

A Shape node is unlit if either of the following is true:

- The shape's *appearance* field is NULL (default).
- The *material* field in the Appearance node is NULL (default).

If the shape is unlit, the colour ($I_{rgb}$) and alpha (A, 1-transparency) of the shape at each point on the shape's geometry is given in Table 4.5.

Table 4.5 -- Unlit colour and alpha mapping

| Texture type | Colour per-vertex or per-face | Colour NULL |
|---|---|---|
| No texture | $I_{rgb} = I_{Crgb}$<br>$A = 1$ | $I_{rgb} = (1, 1, 1)$<br>$A = 1$ |
| Intensity<br>(one-component) | $I_{rgb} = I_T \times I_{Crgb}$<br>$A = 1$ | $I_{rgb} = (I_T, I_T, I_T)$<br>$A = 1$ |
| Intensity+Alpha<br>(two-component) | $I_{rgb} = I_T \times I_{Crgb}$<br>$A = A_T$ | $I_{rgb} = (I_T, I_T, I_T)$<br>$A = A_T$ |
| RGB<br>(three-component)<br>modulateColor==false | $I_{rgb} = I_{Trgb}$<br>$A = 1$ | $I_{rgb} = I_{Trgb}$<br>$A = 1$ |
| RGB<br>(three-component)<br>modulateColor== true | $I_{rgb} = I_{Trgb} \times I_{Crgb}$<br>$A = 1$ | $I_{rgb} = I_{Trgb}$<br>$A = 1$ |
| RGBA<br>(four-component)<br>modulateColor==false | $I_{rgb} = I_{Trgb}$<br>$A = A_T$ | $I_{rgb} = I_{Trgb}$<br>$A = A_T$ |
| RGBA<br>(four-component)<br>modulateColor==true | $I_{rgb} = I_{Trgb} \times I_{Crgb}$<br>$A = A_T$ | $I_{rgb} = I_{Trgb}$<br>$A = A_T$ | where:

$A_T$ = normalized [0, 1] alpha value from 2 or 4 component texture image $I_{Crgb}$ = interpolated per-vertex colour, or per-face colour, from Color node $I_T$ = normalized [0, 1] intensity from 1 or 2 component texture image $I_{Trgb}$ = colour from 3-4 component texture image modulateColor = The *modulateColor* field from the Texture node.

Lighting 'on'

If the shape is lit (i.e., a Material and an Appearance node are specified for the Shape), the Color and Texture nodes determine the diffuse colour for the lighting equation as specified in Table 4.6.

Table 4.6 -- Lit colour and alpha mapping

| Texture type | Colour per-vertex or per-face | Color node NULL |
|---|---|---|
| No texture | $O_{Drgb} = I_{Crgb}$<br>$A = 1-T_M$ | $O_{Drgb} = I_{Drgb}$<br>$A = 1-T_M$ |
| Intensity texture<br>(one-component) | $O_{Drgb} = I_T \times I_{Crgb}$<br>$A = 1-T_M$ | $O_{Drgb} = I_T \times I_{Drgb}$<br>$A = 1-T_M$ |
| Intensity+Alpha texture<br>(two-component)<br>modulateTransparency==false | $O_{Drgb} = I_T \times I_{Crgb}$<br>$A = A_T$ | $O_{Drgb} = I_T \times I_{Drgb}$<br>$A = A_T$ |
| Intensity+Alpha texture<br>(two-component)<br>modulateTransparency==true | $O_{Drgb} = I_T \times I_{Crgb}$<br>$A = A_T \times 1-T_M$ | $O_{Drgb} = I_T \times I_{Drgb}$<br>$A = A_T \times 1-T_M$ |
| RGB texture<br>(three-component)<br>modulateColor==false | $O_{Drgb} = I_{Trgb}$<br>$A = 1-T_M$ | $O_{Drgb} = I_{Trgb}$<br>$A = 1-T_M$ |
| RGB texture<br>(three-component)<br>modulateColor==true | $O_{Drgb} = I_{Trgb} \times I_{Crgb}$<br>$A = 1-T_M$ | $O_{Drgb} = I_{Trgb} \times I_{Drgb}$<br>$A = 1-T_M$ |
| RGBA texture<br>(four-component)<br>modulateColor==false<br>modulateTransparency==false | $O_{Drgb} = I_{Trgb}$<br>$A = A_T$ | $O_{Drgb} = I_{Trgb}$<br>$A = A_T$ |
| RGBA texture<br>(four-component)<br>modulateColor==true<br>modulateTransparency==false | $O_{Drgb} = I_{Trgb} \times I_{Crgb}$<br>$A = A_T$ | $O_{Drgb} = I_{Trgb} \times I_{Drgb}$<br>$A = A_T$ |
| RGBA texture<br>(four-component)<br>modulateColor==false<br>modulateTransparency==true | $O_{Drgb} = I_{Trgb}$<br>$A = A_T \times 1-T_M$ | $O_{Drgb} = I_{Trgb}$<br>$A = A_T \times 1-T_M$ |
| RGBA texture<br>(four-component)<br>modulateColor==true<br>modulateTransparency==true | $O_{Drgb} = I_{Trgb} \times I_{Crgb}$<br>$A = A_T \times 1-T_M$ | $O_{Drgb} = I_{Trgb} \times I_{Drgb}$<br>$A = A_T \times 1-T_M$ | where:

$I_{Drgb}$ = material *diffuseColor*

$O_{Drgb}$ = diffuse factor, used in lighting equations below $T_M$ = material *transparency* modulateColor = The *modulateColor* field from the Texture node.

modulateTransparency = The *modulateTransparency* field from the Texture node.

All other terms are as defined in Lighting 'off'.

Appendix A - Page 50

Lighting equations

An ideal VRML implementation will evaluate the following lighting equation at each point on a lit surface. RGB intensities at each point on a geometry ($I_{rgb}$) are given by:

$$I_{rgb} = I_{Frgb} \times (1 - f_0) + f_0 \times (O_{Ergb} + \text{SUM}( \text{on}_i \times \text{attenuation}_i \times \text{spot}_i \times I_{Lrgb} \\ \times (\text{ambient}_i + \text{diffuse}_i + \text{specular}_i)))$$

where:

$\text{attenuation}_i = 1 / \max(c_1 + c_2 \times d_L + c_3 \times d_L^2, 1)$ $\text{ambient}_i = I_{ia} \times O_{Drgb} \times O_a$ $\text{diffuse}_i = I_i \times O_{Drgb} \times (N \cdot L)$ $\text{specular}_i = I_i \times O_{Srgb} \times (N \cdot ((L + v) / |L + v|))^{\text{shininess} \times 128}$ and:

$\cdot$ = modified vector dot product: if dot product < 0, then 0.0, otherwise, dot product
$c_1, c_2, c_3$ = light i *attenuation*
$d_v$ = distance from point on geometry to viewer's position, in coordinate system of current fog node
$d_L$ = distance from light to point on geometry, in light's coordinate system
$f_0$ = Fog interpolant, see Table 4.8 for calculation
$I_{Frgb}$ = currently bound fog's *color*
$I_{Lrgb}$ = light i *color*
$I_i$ = light i *intensity*
$I_{ia}$ = light i *ambientIntensity*
L = (Point/SpotLight) normalized vector from point on geometry to light source i position
L = (DirectionalLight) -direction of light source i
N = normalized normal vector at this point on geometry (interpolated from vertex normals specified in Normal node or calculated by browser)
$O_a$ = Material *ambientIntensity*
$O_{Drgb}$ = diffuse colour, from Material node, Color node, and/or texture node
$O_{Ergb}$ = Material *emissiveColor*
$O_{Srgb}$ = Material *specularColor*
$\text{on}_i$ = 1, if light source i affects this point on the geometry,
    0, if light source i does not affect this geometry (if farther away than *radius* for PointLight or SpotLight, outside of enclosing Group/Transform for DirectionalLights, or *on* field is FALSE)

shininess = Material *shininess*
spotAngle = acos( -L · spotDir$_i$)
spot$_{BW}$ = SpotLight i beamWidth
spot$_{CO}$ = SpotLight i *cutOffAngle*
spot$_i$ = spotlight factor, see Table 4.7 for calculation
spotDir$_i$ = normalized SpotLight i *direction*
SUM: sum over all light sources i
v = normalized vector from point on geometry to viewer's position Table 4.7 -- Calculation of the spotlight factor

| Condition (in order) | spot$_i$ = |
|---|---|
| light$_i$ is PointLight or DirectionalLight | 1 |
| spotAngle >= spot$_{CO}$ | 0 |
| spotAngle <= spot$_{BW}$ | 1 |
| spot$_{BW}$ < spotAngle < spot$_{CO}$ | (spotAngle - spot$_{CO}$) / (spot$_{BW}$-spot$_{CO}$) |

Table 4.8 -- Calculation of the fog interpolant

| Condition | f$_0$ = |
|---|---|
| no fog | 1 |
| fogType "LINEAR", d$_v$ < fogVisibility | (fogVisibility-d$_v$) / fogVisibility |
| fogType "LINEAR", d$_v$ ≥ fogVisibility | 0 |
| fogType "EXPONENTIAL", d$_v$ < fogVisibility | exp(-d$_v$ / (fogVisibility-d$_v$) ) |
| fogType "EXPONENTIAL", d$_v$ ≥ fogVisibility | 0 |

Appendix A - Page 52

APPENDIX

B

Blendo

An Extensible Media Modeling Architecture

Object Reference

This section provides a detailed description of each object in Blendo as well as the object hierarchy.

In this section, each object is presented using a pseudolanguage syntax. This language presents the name of the object, followed by a colon, the list of parent objects of this object and an open brace. This is followed by the exported fields and functions, followed by a close brace. The format of each field entry is as follows:

'field' <type> <name> [<initial value>]

where <type> is the name of an object indicating the type of data this field holds, <name> is the identifier of this field. The <initial value> entry is optional and, if present, gives the data values this field will have upon creation. The format for each function entry is as follows:

'function' <type> <name> '(' [<type> <name>] { ',' <type> <name>}* ')'

In other words a function has a return <type> followed by an identifying name, followed by a list of 0 or more arguments enclosed in parentheses. Each argument is an argument <type> followed by the <name> identifying the argument. The return type of a function may be the special name 'void', which indicates that this function returns no value.

After the object declaration is a list of each field and function name and a description of their function.

Objects are grouped by function and are listed from simple (abstract) to more complex (concrete) within each group. All base objects are listed first, followed by objects in each functional group.

●Object Hierarchy

```
Object-+----------------------------------------------------------Field-+-Bool
       |                                                                |
```

```
+-Node-+-AudioSourceNode---+--------+            +-Int8
|      |                                         |
|      +-SurfaceNode-+-MovieSurface  \           +-Int16
|      |             |              \            |
|      |             +-ImageSurface   \          +-Int32
|      |             |                 \         |
|      |             +-MatteSurface      \       +-UInt8
|      |             |                    |      |
|      |             +-PixelSurface      /       +-UInt16
|      |             |                  /        |
|      |             +-SceneSurface    /         +-UInt32
|      |                              /          |
|      |                             /           +-Float
|      |                            /            |
|      |                           /             +-Double
|      |                          /              |
|      +-ChildNode-+-TimedNode-+-StreamNode---AudioStream
|      |          |            |                 |
|      |          |            +-IntervalSensor  +-Time
|      |          |            |                 |
|      |          |            +-Score           +-Vec2f
|      |          |                              |
|      |          +-BackgroundNode-+-BackgroundColor
|      |          |                              +-Vec3f
|      |          +-LightNode-+-DirectionalLight |
|      |          |           |                  +-Color
|      |          |           +-PointLight       |
|      |          |                           -  +-Rotation
|      |          +-BoundedNode-+-GroupingNode-+-Group
|      |          |             |              |  +-String
|      |          |             +-Shape        +-Switch
|      |          |             |              |  +-Image
|      |          |             |              +-Transform
|      |          |                               +-Atom
|      |          +-InterpolatorNode-+-ColorInterpolator
|      |          |                  |            +-NodeField
|      |          |                  +-CoordinateInterpolator
|      |          |                  |            +-Matrix
|      |          |                  +-NormalInterpolator
|      |          |                  |            +-Box
|      |          |                  +-OrientationInterpolator
|      |          |                  |
|      |          |                  +-PositionInterpolator
|      |          |                  |
|      |          |                  +-ScalarInterpolator
|      |          |
|      |          +-SoundNode---AmbientSound
|      |          |
|      |          +-ListenPoint
|      |          |
|      |          +-NavigationInfo
|      |          |
|      |          +-SensorNode---ButtonSensor
|      |          |
|      |          +-Viewpoint
|      |          |
|      |          +-Environment
|      |          |
|      |          +-AtmosphereNode---Fog
|      |
|      +-Appearance
|      |
|      +-TimeBaseNode-+-TimeBase
|      |              \
|      +-CueNode-+----MediaCue
|                |
|                +-IntervalCue
|                |
|                +-FieldCue
|                |
```

```
|              +-TimeCue
|       +-GeometryNode---FaceSetNode---IndexedFaceSet
|       |
|       +-MaterialNode---Material
|       |
|       +-VertexColor
|       |
|       +-Coordinate
|       |
|       +-Normal
|       |
|       +-Texture
|       |
|       +-TextureCoordinate
|       |
|       +-TextureTransform
|       |
|       +-VertexColorNode-+-VertexColor
|                         |
|                         +-VertexColor4
+-Manager------+-EventManager
|              |
+-Proto        +-LoadManager
|              |
+-Function     +-MediaManager
|              |
+-System       +-RenderManager
|              |
+-Path         +-SceneManager
|              |
+-PathList     +-SurfaceManager
               |
               +-ThreadManager
```

●Base Objects

Object

```
Object {
    function Bool isOfType(Proto type)
    function Bool isExactType(Proto type)
}
```

Description

Object is the root of all other objects in the system...

isOfType

This function returns true if this object is of the passed type or is derived from the passed type.

isExactType

This function returns true if this object is of the passed type.

Proto

```
Proto : Object {
    function Proto    Proto(MF String url)
    function Node     createNode()
}
```

Description

Proto contains all the information

Proto

This is the constructor of the Proto. The passed strings are used as in the EXTERNPROTO statement.

createNode

This function creates an instance of this prototype. Upon return, the node has been built but not initialized. The node's initialize( ) is called when added to the scene. It can also be called explicitly.

Function

```
Function : Object {
    function Function  Function(MF String args, String body)
    function Field     call(MF Field args)
}
```

Description

This object defines a function in the built-in scripting language.

Function

This is the constructor. It creates a Function object with the passed formal argument names and the passed body. The body must begin with an open brace and end with a close brace and must contain a valid script.

call

This function calls the script with the passed values as the actual arguments. Each actual argument is matched to a formal argument name. If fewer actual arguments than formal arguments are passed, remaining arguments contain the value NULL. If more actual arguments than formal arguments are passed, the excess arguments are ignored.

Field

```
Field : Object {
    function void    setValue(Int32 index, Field value)
    function Bool    isMF()
    function Int32   getNum()
    function void    setNum(Int32 num)
    function String  toString()
}
```

Description

This is the base object from which all field objects are derived.

setValue

This function sets the field to the passed value. An index is passed to allow a single value of a multiple value field to be set. If this is a single value field, index must be 0, otherwise it can be any value and the field will grow to accommodate. If this is a single value field, the passed value must be of the same type or a derived type. If this is a multiple value field, the passed value may be either a single value or multiple value field of the same type or a derived type. If it is a single value field, the index is used to indicate which element to set. If it is a multiple value field, the index must be 0 and the entire field is replaced.

isMF

This function returns true if this field is a multiple value field.

getNum

This function returns the number of elements in the field. If this is a single value field, this function returns 1.

setNum

This function sets the number of elements in the field to the passed value. If this is a single value field, this value must be 1. If the value is less than the current size, elements past the value are discarded. If the value is greater than the current size, new elements are added with the default value for this field type.

Node

```
Node : Object {
    function void    setName(String name)
    function String  getName()
    function void    setField(Int32 index, Field value)
    function Field   getField(Int32 index)
    function Int32   getFieldIndex(String name)
    function Proto   getFieldType(Int32 index)
    function void    render(System system)
    function Bool    search(Proto type, PathList path, Bool findAll)
```

Appendix B - Page 6

```
    function Bool    search(String name, PathList path, Bool findAll)
    function Bool    search(Node node, PathList path, Bool findAll)
    function void    notify(System system, Field field)
    function void    addRoute(Field fromField, Node toNode, Field toField)
    function void    removeRoute(Field fromField, Node toNode, Field toField)
}
```

Description

This is the parent of all nodes in the system.

setName

This function sets the DEF name of the node.

getName

This function gets the DEF name of the node.

setField

This function sets the field at the given index to the passed value. If the index is out of range, no value is set.

getField

This function returns the field at the given index. If the index is out of range, a value of NULL is returned.

getFieldIndex

This function gets the index of the field with the passed name. If no such name exists, a -1 is returned.

getFieldType

This function returns the type of the field at the given index. If the index is out of range, a value of NULL is returned.

render

This function renders this node as part of the scene hierarchy.

search

This function searches this node for a match with the passed criteria. If a match is found, this node is added to the path in the passed PathList object. There are 3 criteria that can be searched. The first form of the call searches for a node of the passed type or derived from the passed type. The second form searches for a node with the passed DEF name. The third form of the call searches for the exact passed node. If findAll is false, the call adds this node to the path if a match is found and returns. Otherwise any children of this node are exhaustively searched for a match and additionaly paths are added to the PathList as needed. If a match is found, the calls return true.

notify

This function is called when the passed field has its value changed from an external source. It is used to perform some internal processing.

addRoute

This function adds a route from the passed field of the node to the passed destination node and field.

removeRoute

This function removes a previously added route. If no such route exists, this function takes no action.

●System Objects

System

```
System : Object {
    field EventManager    eventManager    NULL
    field LoadManager     loadManager     NULL
    field MediaManager    mediaManager    NULL
    field RenderManager   renderManager   NULL
    field SceneManager    sceneManager    NULL
    field SurfaceManager  surfaceManager  NULL
    field ThreadManager   threadManager   NULL
}
```

Description

This object contains all managers for the system.

eventManager

This field contains a reference to the current event manager for the system.

loadManager

This field contains a reference to the current load manager for the system.

mediaManager

This field contains a reference to the current media manager for the system.

renderManager

This field contains a reference to the current render manager for the system.

sceneManager

This field contains a reference to the current scene manager for the system.

surfaceManager

This field contains a reference to the current surface manager for the system.

threadManager

This field contains a reference to the current thread manager for the system.

Path

```
Path : Object {
    field MF Node path
    function Matrix getMatrix()
}
```

Description

This object holds a path through the scene graph and allows matrix associated with that path to be computed.

path

This field holds the nodes in the path from higher in the scene graph to lower.

getMatrix

This function computes the accumulated transformation matrix from the first node in the path to the last.

Path

```
PathList : Object {
    field MF Path pathList
}
```

Description

This object holds a path through the scene graph and allows matrix associated with that path to be computed.

pathList

This field holds a list of paths. When a search is performed on the scene graph to find all occurances of a node, PathList wil contain potentially several paths to that node (due to multiple instancing). Otherwise, PathList will contain only a single path.

Manager

```
Manager : object {
    functions TBD
}
```

Description

This object is the parent of all manager objects.

EventManager

```
EventManager : Manager {
    functions TBD
}
```

Description

This object provides system access to incoming events from the user and the environment.

LoadManager

```
LoadManager : Manager {
    functions TBD
}
```

Description

This object provides system access to the loading of Blendo files and streams, and extension node implementations.

MediaManager

```
MediaManager : Manager {
    functions TBD
}
```

Appendix B - Page 10

Description

This object provides system access to the loading and rendering of media assets.

RenderManager

```
RenderManager : Manager {
     functions TBD
}
```

Description

This object provides system access to the rendering system.

SceneManager

```
SceneManager : Manager {
     functions TBD
}
```

Description

This object provides system access to the current scene graph.

SurfaceManager

```
SurfaceManager : Manager {
     functions TBD
}
```

Description

This object provides system access to create, control and destroy surfaces.

ThreadManager

```
ThreadManager : Manager {
     functions TBD
}
```

Description

This object provides system access to the control of threads and the communication between threads.

●Field Objects

Number

```
Number : Field {
}
```

Description

This object is the parent of all field types containing a single numeric value. It allows all numeric types to be freely copied. General rules for converting from one number type to another are as follows:

- If the value is a Bool set it to 1 for true or 0 for false
- Convert the value to a Double.
- If the value is not out of range for the target type, convert it to the target type.
- If the value is out of range, convert as follows:
    - If the target type is unsigned, set it to its maximum value.
    - If the target type is signed and an integral type, set it to its minimum value if the value if negative or to its maximum value if the value is positive.
    - If the target type is Float, set it to negative infinity if the value is negative, or to positive infinity if the value is positive.

The numeric types do not have accessor functions. Some languages, such as the built-in scripting language, have implicit mechanisms for setting and getting values. Other languages shall supply a mechanism for setting and getting the values.

Bool

```
Bool : Number {
}
```

Description

This object describes a boolean value of true or false

Int8

```
Int8 : Number {
}
```

Description

This object describes a signed integer in the range of -128 to 127

Int16

```
Int16 : Number {
}
```

Description

This object describes a signed integer in the range of -32768 to 32767

Int32

```
Int32 : Number {
}
```

Description

This object describes a signed integer in the range of -2,147,483,648 to 2,147,483,647

UInt8

```
UInt8 : Number {
}
```

Description

This object describes an unsigned integer in the range of 0 to 255

UInt16

```
UInt16 : Number {
}
```

Description

This object describes an unsigned integer in the range of 0 to 65535

UInt32

```
UInt32 : Number {
}
```

Description

This object describes an unsigned integer in the range of 0 to 4,294,967,295

Float

```
Float : Number {
}
```

Description

This object describes a signed, single precision IEEE floating point number.

Double

```
Double : Number {
}
```

Description

This object describes a signed, double precision IEEE floating point number.

Time

```
Time : Number {
    function Time now()
}
```

Description

This object describes a time value, in seconds. This can either be in units of wall clock time or relative time. If the units are wall clock time, then the value is considered to be seconds since Midnight, January 1, 1970 GMT.

now

This function returns the current wall clock time.

Vec2f

```
Vec2f : Field {
    field Float x 0
    field Float y 0 functions TBD
}
```

Description

This object contains a 2 dimensional vector.

x, y

These fields hold the 2 components of the vector.

Vec3f

```
Vec3f : Field {
    field Float x 0
    field Float y 0
    field Float z 0 functions TBD
}
```

Description

This object contains a 3 dimensional vector.

x, y, z

These fields hold the 3 components of the vector.

Color

```
Color : Field {
    field Float r 0
    field Float g 0
    field Float b 0 functions TBD
}
```

Description

This object contains a color triplet in RGB color space.

r, g, b

These fields hold the 3 components of the color. Each value must be in the range [0..1]

Color4

```
Color4 : Field {
    field Float r 0
    field Float g 0
    field Float b 0
    field Float a 0 functions TBD
}
```

Description

This object contains a color triplet in RGB color space, plus a transparency value.

r, g, b

These fields hold the 3 components of the color. Each value must be in the range [0..1]

a

This field holds an opacity value, where 0 is completely transparent and 1 is completely opaque. The value must be in the range [0..1]

Rotation

```
Rotation : Field {
    field Vec3f axis 0 1 0
    field Float angle 0 functions TBD
}
```

Description

This object contains a rotational angle and the axis along which to rotate. A right hand rotational coordinate system is used.

axis

The three dimensional vector along which the angle rotates. The vector must be normalized (length == 1) or results are undefined.

angle

The angle of rotation, using a right handed coordinate system.

String

```
String : Field {
    functions TBD
}
```

Description

This object contains a string of UTF8 characters.

Image

```
Image : Field {
    field UInt32 width
    field UInt32 height
```

```
       field UInt32 numComponents
    function Color4 getPixel(UInt32 x, UInt32 y)
    function void   setPixel(UInt32 x, UInt32 y, Color4 value)
}
```

Description

This object describes a 2 dimensional image, with each pixel containing from one to four components. For interpretation of components see Texture maps in the Concepts section.

width, height

These fields define the size of the image.

numComponents

This field defines the number of components in the image. Value must be in the range [1..4]

getPixel

This function returns the pixel at the given coordinates.

setPixel

This function sets the pixel at the given coordinates to the passed value.

Atom

```
Atom : Field {
    function void   setString(String string)
    function String getString()
    function Int32  getIdentifier()
}
```

Description

This object contains a UTF8 string. Atoms with the same string have the same identifier.

setString

This function sets the atom string to the passed value. This may assign a new identifier to the atom.

getString

This function returns the current string of the atom.

getIdentifier

This function returns the identifier for this atom. Two atoms can be quickly compared for equality by getting their identifiers and performing a numeric comparison.

---

NodeField

```
NodeField : Field {
}
```

Description

This object is an artifact of the field storage mechanism of the system. It is never used by authors in practice. But each field with a node type is derived from NodeField as well as the node type itself. This allows nodes stored in field to use the multiple value field storage mechanism and provides a place for node reference counting to take place.

---

Matrix

```
Matrix : Field {
    field MF Float matrix
    functions TBD
}
```

Description

This object holds a 4x4 transformation matrix.

matrix

This field holds the 16 values of the matrix, in row major order.

---

Box

```
Box : Field {
    field Vec3f center  0 0 0
    field Vec3f size    -1 -1 -1
    functions TBD
}
```

Description center

This field holds the center of the box.

size

This field holds the size of the box.

---

●Audio Objects

AudioSourceNode

```
AudioSourceNode : Node {
    function void play(MF UInt8 buffer, Double startSample)
}
```

Description

This object provides a source of audio samples to be played through the audio subsystem.

play

This function injects the passed audio buffer into the audio subsystem to be played at the given start point. the *startSample* argument is in units of audio samples from a common reference point of time. A wall clock time value can be converted into sample units using the getSampleFromTime( ) function of the MediaManager.

---

StreamNode

```
StreamNode : TimedNode {
    field URL url
    field Time duration functions TBD
}
```

Description

This object provides a source of streaming data for timed media assets such as audio and video.

url

This field contains a list of URL strings used to access the media. Supported protocols are TBD.

duration

This field generates an event when the length of the stream, in seconds, is known. If the media has no predefined length (e.g., it is a live video feed), then duration generated a value of -1.

AudioStream

```
AudioStream : StreamNode AudioSourceNode {
}
```

Description

An AudioStream node specifies audio data that can be rendered by the audio subsystem. It starts playing its stream when its updateStartTime( ) function is called and stops playing when its updateStopTime( ) function is called. The updateMediaTime( ) function is called whenever mediaTime changes and can be used by implementations needing to refresh audio data periodically. The *rate* argument is used to determine the direction and rate of audio. At some levels this argument is ignored and audio only plays when rate is 1. But other levels use this to resample the audio to match the rate.

SoundNode

```
SoundNode : ChildNode {
    field Float            intensity  1
    field Float            priority   0
    field AudioSourceNode  source     NULL
}
```

Description

SoundNode is the parent for all sound rendering nodes. It describes the attributes of the sound but not the manner in which it is rendered.

intensity

The *intensity* field adjusts the loudness (decibels) of the sound emitted (note: this is different from the traditional definition of intensity with respect to sound; see E.[SNDA]). The *intensity* field has a value in the range [0.0..1.0] and specifies a factor which shall be used to scale the normalized sample data of the sound source during playback. A SoundNode with an intensity of 1.0 shall emit audio at its maximum loudness (before attenuation), and a SoundNode with an intensity of 0.0 shall emit no audio. Between these values, the loudness should increase linearly from a -20 dB change approaching an *intensity* of 0.0 to a 0 dB change at an *intensity* of 1.0.

priority

The *priority* field provides a hint for the browser to choose which sounds to play when there are more active sounds than can be played at once due to either limited system resources or system load. The *priority* field has a value in the range [0.0..1.0], with 1.0 being the highest priority and 0.0 the lowest priority.

source

The *source* field specifies the sound source for SoundNode. If it is not specified, no audio will be emitted from this node.

AmbientSound

```
AmbientSound : SoundNode {
    field Float pan 0
}
```

Description

This object plays its sound source at the specified intensity. Its position in the scene does not affect the sound played in any way.

pan

This field selects where in the stereo field this sound shall appear. Its value is in the range of [-1..1]. A value of 0 (the default) locates the sound at the center of the field. A value of -1 locates the sound at the extreme left side and 1 locates it at the extreme right side. Other valid values move the sound linearly across the sound field.

ListenPoint

```
ListenPoint : ChildNode {
    field Float intensity 1
}
```

Description

This object establishes a point at which audio is heard by the user. It has a local coordinate position of (0,0,0), which can be moved using the transformation hierarchy.

Every scene graph has associated with it an active ListenPoint node that is used to specify where the audio for the scene is heard. If the scene graph contains one or more Environment nodes, the *listenPoint* field of the first Environment node found in that scene graph is used to specify the active ListenPoint node. If that *listenPoint* field is NULL, there is no active ListenPoint node, and the default listening position (0,0,0)

is used. If the scene graph contains no Environment node, but the scene graph contains one or more ListenPoint nodes, the first one encountered is used as the active ListenPoint node. If the scene graph contains no Environment or ListenPoint nodes, there is no active ListenPoint node, and the default listening position (0,0,0) is used.

If the sameListenPoint node is multiply instanced once as a child node somewhere in the transformation hierarchy (call this instance L) and in one or more Environment nodes, the local listening position of (0,0,0) is transformed by the transformation being applied to the L. If the ListenPoint node is only instanced in one or more Environment nodes, the local listening position (0,0,0) is not transformed (i.e. the position of the Environment node in the transformation hierarchy is irrelevant).

If the same ListenPoint node is multiply instanced in more than one location in the transformation hierarchy not contained inside an Environment node, the effects of the transformation hierarchy on the listening position are undefined.

intensity

This field establishes the final intensity of all active sounds in the scene. Active sounds are mixed as weighted by the value of the *intensity* field of SoundNode. the result is then adjusted according to this intensity field.

Timing Objects

TimedNode

```
TimedNode : ChildNode {
    field TimeBaseNode timeBase NULL function Time getDuration()
    function void updateStartTime(Time now, Time mediaTime, Float rate)
    function void updateStopTime(Time now, Time mediaTime, Float rate)
    function void updateMediaTime(Time now, Time mediaTime, Float rate)
}
```

Description

This object is the parent of all nodes controlled by a TimeBaseNode.

timeBase

This field contains the controlling TimeBaseNode, which makes the appropriate function calls below when the time base starts stops or advances.

getDuration

This function returns the duration of the TimedNode. If unavailable, a value of -1 is returned. This function is typically overridden by derived objects.

updateStartTime

When called this function shall start advancing its events or controlled media, with a starting offset as given in the *mediaTime* argument. This function is typically overridden by derived objects.

updateStopTime

When called, this function stops advancing its events or controlled media. This function is typically overridden by derived objects.

updateMediaTime

This function is called whenever mediaTime is updated by the TimeBaseNode. It can be used by derived objects to exert further control over their media or send additional events.

IntervalSensor

```
IntervalSensor : TimedNode {
    field Time   cycleInterval 1
    field Float  fraction      0
    field Float  time          0
}
```

Description

The IntervalSensor nodes generate events as time passes. It can be used for many purposes including:

- driving continuous simulations and animations;
- controlling periodic activities (*e.g.*, one per minute);
- initiating single occurrence events such as an alarm clock.

This node sends initial *fraction* and *time* events when its updateStartTime( ) function is called. It also sends a fraction and time event every time updateMediaTime( ) is called. Finally, final fraction and time events are sent when the updateStopTime( ) function is called. For more specific information, see the description for each field.

cycleInterval

This field is set by the author to determine the length of time, in seconds, it takes for fraction to go from 0 to 1. This value is returned when the getDuration( ) function is called.

fraction

Appendix B - Page 23

This field generates events whenever the TimeBaseNode is running. In general, the equation evaluated is:

```
fraction = max(min(mediaTime / cycleInterval, 1), 0)
``` time

This field generates events whenever the TimeBaseNode is running. Its value is the current wall clock time.

Score

```
Score : TimedNode {
    field MF CueNode cue [ ]
}
```

Description

This object calls each entry in the cue field for every updateStartTime( ), updateMediaTime( ) and updateStopTime( ) call received. Calls to each cue entry returns the currently accumulated relative time. This value is passed to subsequent cue entries to allow relative offsets between cue entries to be computed.

cue

This field holds the list of CueNode entries to be called with the passage of mediaTime.

TimeBaseNode

```
TimeBaseNode : Node {
    field Time mediaTime 0 function void      evaluate(Time time)
    function void      addClient(TimedNode node)
    function void      removeClient(TimedNode node)
    function Int32     getNumClients()
    function TimedNode getClient(Int32 index)
}
```

Description

This object is the parent of all nodes generating mediaTime. It contains a list of all mediaTime

This field generates an event whenever mediaTime advances. It is typically controlled by derived objects.

evaluate

This function is called by the scene manager whenever time advances if this TimeBaseNode has registered interest in receiving time events.

addClient

This function is called by each TimedNode with this TimeBaseNode set in their *timeBase* field. Whenever mediaTime starts, advances or stops, each client in the list is called. If the passed node is already a client, this function performs no operations.

removeClient

This function is called by each TimedNode when this TimeBaseNode is no longer set in their *timeBase* field. If the passed node is not in the client list, this function performs no operations.

getNumClients

This function returns the number of clients currently in the client list.

getClient

This function returns the client at the passed index. If the index is out of range, NULL is returned.

TimeBase

```
TimeBase : TimeBaseNode {
    field Bool   loop              false
    field Time   startTime         0
    field Time   playTime          0
    field Time   stopTime          0
    field Time   mediaStartTime    0
    field Time   mediaStopTime     0
    field Float  rate              1
    field Time   duration          0
    field Bool   enabled           true
    field Bool   isActive          false
}
```

Description

This object controls the advancement of mediaTime. It can start, stop and resume this value, as well as making it loop continuously. It allows mediaTime to be played over a subset of its range. See each field description for details.

loop

This field controls whether or not mediaTime repeats its advancement when it reaches the end of its travel.

startTime

This field controls when mediaTime starts advancing. When startTime, which is in units of wall clock time, is reached the TimeBase begins running. This is true as long as stopTime is less than startTime. When this occurs mediaTime is set to the value of mediaStartTime if rate is greater than or equal to 0. If mediaStartTime is out of range (see mediaStartTime for a description of its valid range), mediaTime is set to 0. If rate is less than zero, mediaTime is set to mediaStopTime. If mediaStopTime is out of range, mediaTime is set to duration. The TimeBase continues to run until stopTime is reached or mediaStopTime is reached (mediaStartTime if rate is less than zero). If startTime is reached while the TimeBase is running, it is ignored.

playTime

This field behaves identically to startTime except that mediaTime is not reset upon activation. It allows mediaTime to continue advancing after the TimeBase is stopped with stopTime. If both playTime and startTime have the same value, startTime takes precedence. If playTime is reached while the TimeBase is running, it is ignored.

stopTime

This field controls when the TimeBase stops.

mediaStartTime

This field sets the start of the subrange of the media duration over which mediaTime shall run. Its range is [0..duration]. If this value is out of range, 0 is used in its place.

mediaStopTime

This field sets the end of the subrange of the media duration over which mediaTime shall run. Its range is (0..duration]. If the value is out of range, duration is used in its place.

rate

This field allows mediaTime to run at a rate other than one second per second of wall clock time. It is used as an instantaneous rate. When evaluate is called, the elaspsed time since the last call is multiplied by rate and the result is added to the current mediaTime.

duration

This field generates an event when the duration of all clients of this TimeBase have determined their duration. Its value is the same as the client with the longest duration.

enabled

This field enables the TimeBase. When enabled goes false, isActive goes false if it was true and mediaTime stops advancing. While false, startTime and playTime are ignored. When it goes true, startTime and playTime are evaluated to determine if the TimeBase should begin running. If so, the behavior as described in startTime or playTime is performed.

isActive

This field generates a true event when the TimeBase becomes active and a false event when the timeBase becomes inactive.

CueNode

```
CueNode : Node {
    field Float offset      -1
    field Float delay        0
    field Bool  enabled   true
    field Int32 direction 0 function void updateStartTime(Time now, Time mediaTime, Float rate)
    function void updateStopTime(Time now, Time mediaTime, Float rate)
    function Time evaluate(Time accumulated, Time now, Time mediaTime, Float rate)
    function Time getAccumulatedTime(Time accumulated)
    function void fire(Time now, Time mediaTime)
}
```

Description

This object is the parent for all objects in the Score's cue list.

offset

This field establishes a zero relative offset from the beginning of the sequence. For instance, a value of 5 will fire the CueNode when the incoming mediaTime reaches a value of 5.

delay

This field establishes a relative delay before the CueNode fires. If offset is a value other than -1 (the default), this delay is measured from offset. Otherwise it is measured from the end of the previous CueNode or from 0 if this is the first CueNode. For instance, if offset has a value of 5 and delay has a value of 2, this node will fire when mediaTime reaches 7. If offset has a value of -1 and delay has a value of 2, this node will fire 2 seconds after the previous CueNode ends.

enabled

If this field is true, this CueNode is disabled. It behaves as though offset and delay were their default values and it does not fire events.

direction

This field controls how this node fires relative to the direction of travel of mediaTime. If this field is 0, this node fires when its offset and/or delay are reached, whether mediaTime is increasing (rate greater than zero) or decreasing (rate less than zero). If it is less than zero, it fires only if its offset and/or delay are reached when mediaTime is decreasing. If it is greater than zero, it fires only if its offset and/or delay are reached when mediaTime is increasing.

updateStartTime

This function is called when the parent Score receives an updateStartTime( ) function call. Each CueNode is called in sequence.

updateStopTime

This function is called when the parent Score receives an updateStopTime( ) function call. Each CueNode is called in sequence.

evaluate

This function is called when the parent Score receives an updateMediaTime( ) function call. Each CueNode is called in sequence and must return its accumulated time. For instance, if offset is 5 and delay is 2, the CueNode would return a value of 7. If offset is -1 and delay is 2, the CueNode would return a value of the incoming accumulated time plus 2. This is the default behavior. Some CueNodes (such as IntervalCue) has a well defined duration as well as a firing time. See the corresponding derived node for details.

getAccumulatedTime

This function returns the accumulated time using the same calculation as in the evaluate( ) function.

fire

This function is called from the default evaluate( ) function when the CueNode reaches its firing time. It is intended to be overridden by the specific derived objects to perform the appropriate action.

---

MediaCue

```
MediaCue : CueNode TimeBaseNode {
    field Time  mediaStartTime  0
    field Time  mediaStopTime   0
    field Time  duration        0
    field Bool  isActive        false
}
```

Description

This object controls the advancement of mediaTime when this CueNode is active. It allows mediaTime to be played over a subset of its range. It is active from the time determined by the offset and/or delay field for a length of time determined by mediaStopTime minus mediaStartTime. The value it returns from getAccumulatedTime( ) is the value computed by the default function plus mediaStopTime minus mediaStartTime. This node generates mediaTime while active, which is computed using using the incoming mediaTime and subtracting the firing time plus mediaStartTime from it. It therefore advances mediaTime at the same rate as the incoming mediaTime.

mediaStartTime

This field sets the start of the subrange of the media duration over which mediaTime shall run. Its range is [0..duration]. If this value is out of range, 0 is used in its place.

mediaStopTime

This field sets the end of the subrange of the media duration over which mediaTime shall run. Its range is (0..duration]. If the value is out of range, duration is used in its place.

duration

This field generates an event when the duration of all clients of this TimeBaseNode have determined their duration. Its value is the same as the client with the longest duration.

isActive

This field generates a true event when this node becomes active and a false event when this node becomes inactive.

---

IntervalCue

```
IntervalCue : CueNode {
    field Float period    1
    field Bool  rampUp    true
    field Float fraction  0
    field Bool  isActive  false
}
```

Description

This object sends fraction events from 0 to 1 (or 1 to 0 if rampUp is false) as time advances.

period

This field determines the time, in seconds, over which the fraction ramp advances.

rampUp

If this field is true (the default) fraction goes from 0 to 1 over the duration of the IntervalCue. If false, fraction goes from 1 to 0. If mediaTime is running backwards (rate is less than zero), this sense is reversed.

fraction

This field sends an event with each call to evaluate( ) while this node is active. If mediaTime is moving forward, fraction starts to output when this node fires and stops when this nodes reaches its firing time plus *period*. The value of fraction is:

```
fraction = (mediaTime - firing time) * period
``` isActive

This field sends a true event when the node becomes active and false when the node becomes inactive. If mediaTime is moving forward, the node becomes active when mediaTime becomes greater than or equal to firing time and inactive when mediaTime becomes greater than or equal to firing time plus period. If mediaTime is moving backward, the node becomes active when mediaTime becomes less than or equal to firing time plus period and inactive when mediaTime becomes less than or equal to firing time.

---

FieldCue

```
FieldCue : CueNode {
    field Field cueValue NULL
    field Field cueOut   NULL
}
```

Description

This object sends cueValue as an event to cueOut when it fires. It allows any field type to be set and emitted. The cueOut value can be routed to a field of any type. Undefined results occur if the current type of cueValue is not compatible with the type of the destination field.

cueValue

This field is the authored value that will be emitted when this node fires.

cueOut

This field sends an event with the value of cueValue when this node fires.

TimeCue

```
TimeCue : CueNode {
    field Time cueTime   0
}
```

Description

This object sends the current wall clock time as an event to cueTime when it fires.

cueTime

This field sends and event with the current wall clock time when this node fires.

Grouping Objects

ChildNode

```
ChildNode : Node {
```

Description

ChildNode is the base class of all nodes that can be placed at the top-level of a scene graph or as children of GroupingNodes.

BoundedNode

```
BoundedNode : ChildNode {
    function Box getBoundingBox()
}
```

Description

BoundedNode is the base class of all nodes that have a bounding box.

getBoundingBox

This function returns the bounds, in local coordinate space, of this node. If this node has rendered children, the box returned is the aggregate of all the children. If this is a Transform node, the bounding box returned does not have the transformation applied. To obtain a bounding box in world coordinates, first perform a search for this node, then perform a getMatrix( ) function on the returned Path. Multiplying the bounding box by this matrix will produce the bounds in world coordinates.

GroupingNode

```
GroupingNode : BoundedNode {
}
```

Description

GroupingNode is the base class of all nodes that contain one or more child nodes. The rules for how these children are traversed when rendering depend upon the specific subclass.

Group

```
Group : GroupingNode {
    field MF ChildNode    children    []
```

Description

A Group node contains children nodes without introducing a new transformation. It is equivalent to a Transform node containing an identity transform.

children

The *children* field enumerates a set of nodes that are traversed when rendering. All nodes contained in the *children* field must be derived from the ChildNode base class.

Switch

```
Switch : GroupingNode {
    field MF ChildNode    choice         []
    field Int32           whichChoice    -1
}
```

Description

The Switch grouping node traverses exactly zero or one of the nodes specified in the *choice* field, depending on the value of the *whichChoice* field.

Appendix B - Page 32

All nodes under a Switch continue to receive and send events regardless of the value of *whichChoice*. For example, any active TimeBase nodes contained inside the Switch send events regardless of the value of *whichChoice*.

choice

The *choice* field enumerates a set of nodes that may be traversed when rendering. All nodes contained in the *choice* field must be derived from the ChildNode base class.

whichChoice

The *whichChoice* field specifies the index of the child to traverse, with the first child having index 0. If *whichChoice* is less than zero or greater than the number of nodes in the *choice* field, nothing is chosen.

Transform

```
Transform : GroupingNode {
    field MF ChildNode    children            []
    field Vec3f           translation         0 0 0
    field Vec3f           rotation            0 0 1 0
    field Vec3f           scale               1 1 1
    field Vec3f           scaleOrientation    0 0 1 0
    field Vec3f           center              0 0 0
}
```

Description

The Transform node is a grouping node that defines a coordinate system for its children that is relative to the coordinate systems of its ancestors. See Transformation hierarchy, and    Standard units and coordinate system, for a description of coordinate systems and transformations.

children

The *children* field enumerates a set of nodes that are traversed when rendering. All nodes contained in the *children* field must be derived from the ChildNode base class.

translation, rotation, scale, scaleOrientation, center

The *translation, rotation, scale, scaleOrientation* and *center* fields define a geometric 3D transformation consisting of (in order):

a. a (possibly) non-uniform scale about an arbitrary point;
   b. a rotation about an arbitrary point and axis;
   c. a translation.

The *center* field specifies a translation offset from the origin of the local coordinate system (0,0,0). The *rotation* field specifies a rotation of the coordinate system. The *scale* field specifies a non-uniform scale of the coordinate system. *scale* values shall be greater than zero. The *scaleOrientation* specifies a rotation of the coordinate system before the scale (to specify scales in arbitrary orientations). The *scaleOrientation* applies only to the scale operation. The *translation* field specifies a translation to the coordinate system.

Given a 3-dimensional point P and Transform node, P is transformed into point P' in its parent's coordinate system by a series of intermediate transformations. In matrix transformation notation, where C (*center*), SR (*scaleOrientation*), T (*translation*), R (*rotation*), and S (*scale*) are the equivalent transformation matrices, $$P' = T \times C \times R \times SR \times S \times -SR \times -C \times P$$

The following Transform node:

```
Transform {
    center              C
    rotation            R
    scale               S
    scaleOrientation    SR
    translation         T
    children            [...]
}
``` is equivalent to the nested sequence of:

```
Transform {
 translation T
 children Transform {
    translation C
    children Transform {
      rotation R
      children Transform {
        rotation SR
        children Transform {
          scale S
          children Transform {
            rotation -SR
            children Transform {
              translation -C
              children [...]
}}}}}}}
```

●Surface Objects

SurfaceNode

```
SurfaceNode : Node {
}
```

Description

A SurfaceNode is the base class for all objects that describe an 2D image as an array of colour and opacity (alpha) values. SurfaceNodes are used primarily to provide an image to be used as a texture map. See    Surfaces, Images and Textures for more information about surfaces and their relationship to textures.

MovieSurface

```
MovieSurface : SurfaceNode TimedNode AudioSourceNode {
    field MF String      url         []
    field TimeBaseNode   timeBase    NULL
    field Time           duration    0
    field Time           loadTime    0
    field String         loadStatus  "NONE"
}
```

Description

A MovieSurface node provides access to the sequence of images defining a movie. Which frame is rendered onto the surface at any time is determined by the MovieSurface's TimedNode parent class. Movies can also be used as sources of audio.

url

The *url* field provides a list of potential locations of the movie data for the surface. The list is ordered such that element 0 describes the most preferred source of the data. If for any reason element 0 is unavailable, or in an unsupported format, the next element may be used, etc.

timeBase

The *timeBase* field, if specified, specifies the node that is to provide the timing information for the movie. In particular, the timeBase will provide the movie with the information needed to determine which frame of the movie to be display on the surface at any given instant. If no timeBase is specified, the surface will always display the first frame of the movie.

duration

The *duration* field is set by the MovieSurface node to the length of the movie in seconds once the movie data has been fetched.

loadTime, loadStatus

The *loadTime* and *loadStatus* fields provide information from the MovieSurface node concerning the availability of the movie data.

*loadStatus* has five possible values, "NONE", "REQUESTED", "FAILED", "ABORTED", and "LOADED".

"NONE" is the initial state. A "NONE" event is also sent if you clear the node's url by eithering setting the number of values to 0 or setting the first url string to the empty string. When this occurs, the pixels of the surface are set to black and opaque (i.e. color is 0,0,0 and transparency is 0).

A "REQUESTED" event is sent whenever a non-empty url value is set. The pixels of the surface remaing unchanged after a "REQUESTED" event.

"FAILED" is sent after a "REQUESTED" event if the movie loading did not succeed. This can happen, for example, if the url refers to a non-existent file or if the file does not contain valid data. The pixels of the surface remain unchanged after a "FAILED" event.

An "ABORTED" event is sent if the current state is "REQUESTED" and then the url changes again. If the url is changed to a non-empty value, "ABORTED" will be followed by a "REQUESTED" event. If the url is changed to an empty value, "ABORTED" will be followed by a "NONE" value. The pixels of the surface remain unchanged after an "ABORTED" event.

A "LOADED" event is sent when the movie is ready to be displayed. It is always followed by a loadTime event whose value matches the current time. The frame of the movie indicated by the timeBase field is rendered onto the surface. If timeBase is NULL, the first frame of the movie is rendered onto the surface.

ImageSurface

```
ImageSurface : SurfaceNode {
    field MF String    url          []
    field Time         loadTime     0
    field String       loadStatus   "NONE"
}
```

Description

An ImageSurface node renders an image file onto a surface.

url

The *url* field provides a list of potential locations of the image data for the surface. The list is ordered such that element 0 describes the most preferred source of the data. If for any reason element 0 is unavailable, or in an unsupported format, the next element may be used, etc.

loadTime, loadStatus

The *loadTime* and *loadStatus* fields provide information from the MovieSurface node concerning the availability of the image data.

*loadStatus* has five possible values, "NONE", "REQUESTED", "FAILED", "ABORTED", and "LOADED".

"NONE" is the initial state. A "NONE" event is also sent if you clear the node's url by eithering setting the number of values to 0 or setting the first url string to the empty string. When this occurs, the pixels of the surface are set to black and opaque (i.e. color is 0,0,0 and transparency is 0).

A "REQUESTED" event is sent whenever a non-empty url value is set. The pixels of the surface remaing unchanged after a "REQUESTED" event.

"FAILED" is sent after a "REQUESTED" event if the image loading did not succeed. This can happen, for example, if the url refers to a non-existent file or if the file does not contain valid data. The pixels of the surface remain unchanged after a "FAILED" event.

An "ABORTED" event is sent if the current state is "REQUESTED" and then the url changes again. If the url is changed to a non-empty value, "ABORTED" will be followed by a "REQUESTED" event. If the url is changed to an empty value, "ABORTED" will be followed by a "NONE" value. The pixels of the surface remain unchanged after an "ABORTED" event.

A "LOADED" event is sent when the image has been rendered onto the surface. It is always followed by a *loadTime* event whose value matches the current time.

MatteSurface

```
MatteSurface : SurfaceNode {
    field SurfaceNode    surface1            NULL
    field SurfaceNode    surface2            NULL
    field String         operation           ""
    field MF Float       parameter           0
    field Bool           overwriteSurface2   FALSE
}
```

Description

The MatteSurface node uses image compositing operations to combine the image data from two surfaces onto a third surface. The result of the compositing operation is computed at the resolution of surface2. If the size of surface1 differs from that of surface2, the image data on surface1 is zoomed up or down before performing the operation.

The compositing operations that are defined are capable of being hardware accelerated using low-cost, widely available graphics accelerators. A complete set of operations is TBD.

surface1, surface2

The *surface1* and *surface2* fields specify the two surfaces that provide the input image data for the compositing operation.

operation

The *operation* field specifies what compositing function to perform on the two input surfaces.

A few of the possible operations include:

"REPLACE_ALPHA" overwrites the alpha channel of *surface2* with data from *surface1*. If *surface1* has 1 component (grayscale intensity only), that component is used as the alpha values. If *surface1* has 2 or 4 components (grayscale intensity+alpha or RGBA), the alpha channel is used to provide the alpha values. If *surface1* has 3 components (RGBA), the operation is undefined. This operation can be used to provide static or dynamic alpha masks for static or dynamic imagery. For example, a SceneSurface could render an animating James Bond character against a transparent background. The alpha from this image could then be used as a mask shape for a video clip.

"MULTIPLY_ALPHA" behaves just like REPLACE_ALPHA, except the alpha values from *surface1* are multiplied with the alpha values from *surface2*.

"CROSS_FADE" fades between two surfaces using a parameter value to control the percentage of each surface that is visible. This operation can dynamically fade between two static or dynamic images. By animating the parameter value from 0 to 1, the imagery on *surface1* fades into that of *surface2*.

"BLEND" combines the image data from *surface1* and *surface2* using the alpha channel from *surface2* to control the blending percentage. This operation allows the alpha channel of *surface2* to control the blending of the two images. By animating the alpha channel of *surface2* by rendering a SceneSurface or playing a MovieSurface, you can produce a complex travelling matte effect. If R1, G1, B1, and A1 represent the red, green, blue, and alpha values of a pixel of *surface1* and R2, G2, B2, and A2 represent the red, green, blue, and alpha values of the corresponding pixel of *surface2*, then the resulting values of the red, green, blue, and alpha components of that pixel are:

```
red   = R1 * (1 - A2) + R2 * A2
green = G1 * (1 - A2) + G2 * A2
blue  = B1 * (1 - A2) + B2 * A2
alpha = 1
```

"ADD", and "SUBTRACT" add or subtract the color channels of *surface1* and *surface2*. The alpha of the result equals the alpha of *surface2*.

parameter

The *parameter* field provides one or more floating point parameters that can alter the effect of the compositing function. The specific interpretation of the parameter values depends upon which operation is specified.

overwriteSurface2

The *overwriteSurface2* field indicates whether the MatteSurface node should allocate a new surface for storing the result of the compositing operation (*overwriteSurface2* = FALSE) or whether the data stored on surface2 should be overwritten by the compositing operation (*overwriteSurface2* = TRUE).

PixelSurface

```
PixelSurface : SurfaceNode {
    field Image         image           0 0 0
}
```

Description

A PixelSurface node renders an array of user-specified pixels onto a surface.

image

The *image* field describes the pixel data that is rendered onto the surface. The format of this data is described in the description of the Image object.

SceneSurface

```
SceneSurface : SurfaceNode {
    field MF ChildNode  children        []
    field UInt32        width           1
    field UInt32        height          1
}
```

Description

A SceneSurface node renders the specified children on a surface of the specified size. The SceneSurface will automatically re-render itself to reflect the current state of it's children.

children

The *children* field describe the ChildNodes to be rendered. Conceptually, the children field describes an entire scene graph that is rendered independently of the scene graph that contain's the SceneSurface node.

width, height

The *width* and *height* fields specify the size of the surface in pixels. For example, if *width* were 256 and *height* were 512, the surface would contain a 256 x 512 array of pixel values.

Appendix B - Page 39

•Interpolator Objects

IntepolatorNode

```
InterpolatorNode : ChildNode {
    field Float         fraction    0
    field MF Float      key         []
}
```

Description

The InterpolatorNode class serves as the base class for all interpolators. contains a detailed discussion of interpolators.

fraction

The *fraction* field specifies a 0 to 1 value indicating the value at which the interpolation should be computed.

key

The *key* field specifies keys for a set of keyframes for the interpolator. The *key* values must lie in the range [0,1].

ColorInterpolator

```
ColorInterpolator : InterpolatorNode {
    field MF Color      keyValue    []
    field Color         value       0 0 0
}
```

Description

The ColorInterpolator node interpolates among a list of RGB key values to produce a single RGB value. ??? 4.6.8, Interpolator nodes ???, contains a detailed discussion of interpolators.

keyValue

The *keyValue* field specifies a set of keyframes for the interpolator. The number of colours in the *keyValue* field shall be equal to the number of values in the *key* field. The values of the *keyValue* field are defined in RGB colour space. A linear interpolation using the value of *fraction* as input is performed in HSV space (see E.[FOLE] for description of RGB and HSV colour spaces). The results are undefined when interpolating between two consecutive keys with complementary hues.

Appendix B - Page 40 value

The value field contains the result of the interpolation.

---

CoordinateInterpolator

```
CoordinateInterpolator : InterpolatorNode {
    field MF Vec3f        keyValue        []
    field MF Vec3f        value           []
}
```

Description

The CoordinateInterpolator node interpolates among a list of vertex coordinate values to produce a set of vertex coordinate values.
contains a detailed discussion of interpolators.

keyValue

The *keyValue* field specifies a set of keyframes for the interpolator. The number of coordinates in the *keyValue* field shall be an integer multiple of the number of values in the *key* field. That integer multiple defines how many coordinates will be computed during the interpolation.

value

The value field contains the result of the interpolation.

---

NormalInterpolator

```
NormalInterpolator : InterpolatorNode {
    field MF Vec3f        keyValue        []
    field MF Vec3f        value           []
}
```

Description

The NormalInterpolator node interpolates among a list of normalized direction vectors to produce a set of normalized direction vectors.
contains a detailed discussion of interpolators.

keyValue

The *keyValue* field specifies a set of keyframes for the interpolator. Values in the *keyValue* field shall be of unit length. The number of coordinates in the *keyValue* field shall be an integer multiple of the number of values in the *key* field. That integer multiple defines how many coordinates will be computed during the interpolation.

Normal interpolation shall be performed on the surface of the unit sphere. That is, the output values for a linear interpolation from a point P on the unit sphere to a point Q also on the unit sphere shall lie along the shortest arc (on the unit sphere) connecting points P and Q. Also, equally spaced input fractions shall result in arcs of equal length. The results are undefined if P and Q are diagonally opposite.

value

The value field contains the result of the interpolation.

OrientationInterpolator

```
OrientationInterpolator : InterpolatorNode {
    field MF Rotation      keyValue    []
    field Rotation         value       0 0 1 0
}
```

Description

The OrientationInterpolator node interpolates among a list of rotation values to produce a single rotation values.                       , contains a detailed discussion of interpolators.

keyValue

The *keyValue* field specifies a set of keyframes for the interpolator. The number of coordinates in the *keyValue* field shall be equal to the number of values in the *key* field.

An orientation represents the final position of an object after a rotation has been applied. An OrientationInterpolator interpolates between two orientations by computing the shortest path on the unit sphere between the two orientations. The interpolation is linear in arc length along this path. The results are undefined if the two orientations are diagonally opposite.

If two consecutive *keyValue* values exist such that the arc length between them is greater than $\pi$, the interpolation will take place on the arc complement. For example, the interpolation between the orientations (0, 1, 0, 0) and (0, 1, 0, 5.0) is equivalent to the rotation between the orientations (0, 1, 0, $2\pi$) and (0, 1, 0, 5.0).

value

The value field contains the result of the interpolation.

PositionInterpolator

```
PositionInterpolator : InterpolatorNode {
    field MF Vec3f      keyValue        []
    field Vec3f         value           0 0 0
}
```

Description

The PositionInterpolator node interpolates among a list of 3D vectors to produce a single 3D vector.                                    contains a detailed discussion of interpolators.

keyValue

The *keyValue* fields specify a set of keyframes for the interpolator. The number of coordinates in the *keyValue* field shall be equal to the number of values in the *key* field.

value

The value field contains the result of the interpolation.

ScalarInterpolator

```
ScalarInterpolator : InterpolatorNode {
    field MF Float      keyValue        []
    field Float         value           0
}
```

Description

The Scalar Interpolator node interpolates among a list of floating point scalar values to produce a single floating point scalar value.
contains a detailed discussion of interpolators.

keyValue

The *keyValue* field specifies a set of keyframes for the interpolator. The number of coordinates in the *keyValue* field shall be equal to the number of values in the *key* field.

value

The value field contains the result of the interpolation.

Appendix B - Page 43

⬥Environment Objects

Environment

```
Environment : ChildNode {
    field Viewpoint        viewpoint         NULL
    field ListenPoint      listenPoint       NULL
    field NavigationInfo   navigationInfo    NULL
    field BackgroundNode   background        NULL
    field AtmosphereNode   atmosphere        NULL
}
```

Description

The Environment node allows access to a set of nodes that provide information about how a scene graph is to be rendered. If multiple Environment nodes are found in a scene graph, the first one encountered during a depth-first traversal of the scene graph is used. If there is no Environment node, the first occurrence of any of the specific nodes is used as the source of rendering information. For example, if there is no Environment node, but there is a Viewpoint node elsewhere in the scene graph, the first Viewpoint node encountered during a depth-first traversal of the scene graph is used.

Changing the values of one of the fields of an Environment node causes the new value to be used as the source of rendering information. For example, in the following scene, if the *viewpoint* field is changed from V1 to V2, then the scene will be rendered from the transformed location of the V2 viewpoint node.

```
Group {
    children [
        Environment {
            viewpoint USE V1
        }
        DEF V1 Viewpoint { ... }
        Transform {
            children [
                DEF V2 Viewpoint { ... }
                ...
            ]
        }
    ]
}
```

The positioning of the Environment node in the transformation hierarchy is irrelevant. The node's ancestor transformations are not used to modify any of the rendering properties described by the Environment's property nodes.

viewpoint

The *viewpoint* field, if specified, specifies the Viewpoint node that is to be used to position the virtual camera from which the scene will be rendered. If *viewpoint* is NULL, the default viewing position is used.

listenPoint

The *listenPoint* field, if specified, specifies the position from which audio is to be perceived. If *listenPoint* if NULL, the default listening position is used.

navigationInfo

The *navigationInfo* field, if specified, specifies properties of the viewer to be used to render the scene. If *navigationInfo* is NULL, the default viewing properties are used.

background

The *background* field, if specified, specifies how regions of the surface not covered by opaque Shapes are to be filled. If *background* is NULL, the default background (solid black opaque color) is used.

atmosphere

The *atmosphere* field, if specified, specifies an atmospheric rendering effect to apply to the scene. If *atmosphere* is NULL, no atmospheric effects are applied.

BackgroundNode

```
BackgroundNode : ChildNode {
```

Description

BackgroundNode serves as the base class for all nodes that provide a background for the scene. A background defines what is rendered in those regions of a surface that are not covered by an one or more opaque Shapes.

If the scene graph contains one or more Environment nodes, the *background* field of the first Environment node found in that scene graph is used to specify the background rendering information. If that *background* field is NULL, a solid, black, opaque color is used to fill the background regions. If the scene graph contains no Environment node, but the scene graph contains one or more nodes of type BackgroundNode, the first one encountered is used to specify the background rendering information. If the scene graph contains no Environment or BackgroundNode nodes, a solid, black, opaque color is used to fill the background region.

BackgroundColor

```
BackgroundColor : BackgroundNode {
```

Appendix B - Page 45

```
    field Color        color          0 0 0
    field Float        transparency   0
}
```

Description

The BackgroundColor node describes a solid color and transparency value used to fill in any regions of a surface not covered by one or more opaque Shapes.

color

The *color* field describes the RGB color used to fill the Background regions.

transparency

The *transparency* field describes the amount of transparency in the Background region. The ability to specify a background transparency is primarily important when rendering the contents of a SceneSurface node. Using a non-zero transparency value allows the SceneSurface texture to have non-opaque regions.

Viewpoint

```
Viewpoint : ChildNode {
    field Vec3f        position       0 0 10
    field Rotation     orientation    0 0 1 0
    field Float        fieldOfView    0.785398
    field String       description    ""
}
```

Description

The Viewpoint node defines a specific location in the local coordinate system from which the user may view the scene. The Viewpoint is transformed by the transformation hierarchy in which it is found.

Every scene graph has associated with it an active Viewpoint node that is used to position the camera. If the scene graph contains one or more Environment nodes, the *viewpoint* field of the first Environment node found in that scene graph is used to specify the active Viewpoint node. If that *viewpoint* field is NULL, there is no active Viewpoint node, and the default camera position (0,0,10) and orientation (0,0,1,0) are used. If the scene graph contains no Environment node, but the scene graph contains one or more Viewpoint nodes, the first one encountered is used as the active Viewpoint node. If the scene graph contains no Environment or Viewpoint nodes, there is no active viewpoint node, and the default camera position (0,0,10) and orientation (0,0,1,0) are used.

An author can automatically move the user's view through the world by animating either the active viewpoint's position, orientation, and fieldOfView, or the transformations above it. Browsers shall allow the user view to be navigated relative to the coordinate system defined by the Viewpoint node (and the transformations above it) even if the Viewpoint node or its ancestors' transformations are being animated.

If the same Viewpoint node is multiply instanced once as a child node somewhere in the transformation hierarchy (call this instance V) and in one or more Environment nodes, the viewpoint's position and orientation are transformed by V's transformation hierarchy. If the Viewpoint node is only instanced in one or more Environment nodes, the viewpoint's position and orientation are untransformed (i.e. the position of the Environment node in the transformation hierarchy is irrelevant).

If the same Viewpoint node is multiply instanced in more than one location in the transformation hierarchy not contained inside an Environment node, the results are undefined.

position, orientation

The *position* and *orientation* fields of the Viewpoint node specify relative locations in the local coordinate system. *Position* is relative to the coordinate system's origin (0,0,0), while *orientation* specifies a rotation relative to the default orientation. In the default position and orientation, the viewer is on the Z-axis looking down the -Z-axis toward the origin with +X to the right and +Y straight up. Viewpoint nodes are affected by the transformation hierarchy.

Navigation types (see 6.29, NavigationInfo) that require a definition of a down vector (e.g., terrain following) shall use the negative Y-axis of the coordinate system of the currently bound Viewpoint node. Likewise, navigation types that require a definition of an up vector shall use the positive Y-axis of the coordinate system of the currently bound Viewpoint node. The *orientation* field of the Viewpoint node does not affect the definition of the down or up vectors. This allows the author to separate the viewing direction from the gravity direction.

fieldOfView

The *fieldOfView* field specifies a preferred minimum viewing angle from this viewpoint in radians. A small field of view roughly corresponds to a telephoto lens; a large field of view roughly corresponds to a wide-angle lens. The field of view shall be greater than zero and smaller than π. The value of *fieldOfView* represents the minimum viewing angle in any direction axis perpendicular to the view. For example, a browser with a rectangular viewing projection shall have the following relationship:

$$\frac{\text{display width}}{\text{display height}} = \frac{\tan(\text{FOV}_{horizontal}/2)}{\tan(\text{FOV}_{vertical}/2)}$$

where the smaller of display width or display height determines which angle equals the *fieldOfView* (the larger angle is computed using the relationship described above). The larger angle shall not exceed π and may force the smaller angle to be less than *fieldOfView* in order to sustain the aspect ratio.

description

The *description* field specifies a textual description of the Viewpoint node. This may be used by browser-specific user interfaces. If a Viewpoint's *description* field is empty it is recommended that the browser not present this Viewpoint in its browser-specific user interface.

NavigationInfo

```
NavigationInfo : ChildNode {
     field MF Float      avatarSize        0.25 1.6 0.75
     field Float         speed             1
     field Float         visibilityLimit   0
     field Bool          headlight         TRUE
     field MF String     type              ["WALK", "ANY"]
}
```

Description

The NavigationInfo node contains information describing the physical characteristics of the viewer's avatar and viewing model.

Every scene graph has associated with it an active NavigationInfo node that is used to specify viewing properties for the scene. If the scene graph contains one or more Environment nodes, the navigationInfo field of the first Environment node found in that scene graph is used to specify the active NavigationInfo node. If that navigationInfo field is NULL, there is no active NavigationInfo node, and the default viewing properties are used. If the scene graph contains no Environment node, but the scene graph contains one or more NavigationInfo nodes, the first one encountered is used as the active NavigationInfo node. If the scene graph contains no Environment or NavigationInfo nodes, there is no active NavigationInfo node, and the default viewing properties are used.

If the same NavigationInfo node is multiply instanced once as a child node somewhere in the transformation hierarchy (call this instance N) and in one or more Environment nodes, the *speed*, *avatarSize* and *visibilityLimit* values are all scaled by the transformation being applied to N. The results are undefined if the scale applied to the NavigationInfo node is non-uniform. If the NavigationInfo node is only instanced in one or more Environment nodes, the *speed*, *avatarSize* and *visibilityLimit* values are unscaled (i.e. the position of the Environment node in the transformation hierarchy is irrelevant).

If the same NavigationInfo node is multiply instanced in more than one location in the transformation hierarchy not contained inside an Environment node, the effects on the *speed*, *avatarSize* and *visibilityLimit* values are undefined.

avatarSize

The *avatarSize* field specifies the user's physical dimensions in the world for the purpose of collision detection and terrain following. It is a multi-value field allowing several dimensions to be specified. The first value shall be the allowable distance between the user's position and any collision geometry before a collision is detected. The second shall be the height above the terrain at which the browser shall maintain the viewer. The third shall be the height of the tallest object over which the viewer can move. This allows staircases to be built with dimensions that can be ascended by viewers in all browsers. The transformation hierarchy of the NavigationInfo node scales the *avatarSize*. Translations and rotations have no effect on *avatarSize*.

For purposes of terrain following, the browser maintains a notion of the *down* direction (down vector), since gravity is applied in the direction of the down vector. This down vector shall be along the negative Y-axis in the local coordinate system of the currently bound Viewpoint node (i.e., the accumulation of the Viewpoint node's ancestors' transformations, not including the Viewpoint node's *orientation* field).

It is recommended that the near clipping plane be set to one-half of the collision radius as specified in the *avatarSize* field (setting the near plane to this value prevents excessive clipping of objects just above the collision volume, and also provides a region inside the collision volume for content authors to include geometry intended to remain fixed relative to the viewer). Such geometry shall not be occluded by geometry outside of the collision volume.

speed

The *speed* field specifies the rate at which the viewer travels through a scene in metres per second. Since browsers may provide mechanisms to travel faster or slower, this field specifies the default, average speed of the viewer. If the NavigationInfo *type* is EXAMINE, *speed* shall not affect the viewer's rotational speed. Scaling in the transformation hierarchy of the active NavigationInfo node (see above) scales the *speed*; parent translation and rotation transformations have no effect on *speed*. Speed shall be non-negative. Zero speed indicates that the avatar's position is stationary, but its orientation and field of view may still change. If the navigation *type* is "NONE", the *speed* field has no effect.

visibilityLimit

The visibilityLimit specifies a distance beyond which geometry may not be rendered. A value of 0.0 indicates an infinite visibility limit. The *visibilityLimit* field is restricted to be greater than or equal to zero.

headlight

The *headlight* field specifies whether a browser shall turn on a headlight. A headlight is a directional light that always points in the direction the user is looking. Setting this field to TRUE allows the browser to provide a headlight, possibly with user interface controls to turn it on and off. Scenes that enlist precomputed lighting (e.g., radiosity solutions) can turn the headlight off. The headlight shall have *intensity* = 1, *color* = (1 1 1), *ambientIntensity* = 0.0, and *direction* = (0 0 -1).

type

The *type* field specifies an ordered list of navigation paradigms that specify a combination of navigation types and the initial navigation type. The navigation type of the active NavigationInfo node determines the user interface capabilities of the browser. For example, if the active NavigationInfo node's *type* is "WALK", the browser shall present a WALK navigation user interface paradigm (see below for description of WALK). The specific navigation interfaces required to be supported is TBD.

If "ANY" does not appear in the *type* field list of the currently bound NavigationInfo, the browser's navigation user interface shall be restricted to the recognized navigation types specified in the list. In this case, browsers shall not present a user interface that allows the navigation type to be changed to a type not specified in the list. However, if any one of the values in the *type* field are "ANY", the browser may provide any type of navigation interface, and allow the user to change the navigation type dynamically. Furthermore, the first recognized type in the list shall be the initial navigation type presented by the browser's user interface.

WALK navigation is used for exploring a virtual world on foot or in a vehicle that rests on or hovers above the ground. It is strongly recommended that WALK navigation define the up vector in the +Y direction and provide some form of terrain following and gravity in order to produce a walking or driving experience. If the bound NavigationInfo's *type* is "WALK", the browser shall strictly support collision detection (see 6.8, Collision).

FLY navigation is similar to WALK except that terrain following and gravity may be disabled or ignored. There shall still be some notion of "up" however. If the bound NavigationInfo's *type* is "FLY", the browser shall strictly support collision detection (see 6.8, Collision).

EXAMINE navigation is used for viewing individual objects and often includes (but does not require) the ability to spin around the object and move the viewer closer or further away.

NONE navigation disables and removes all browser-specific navigation user interface forcing the user to navigate using only mechanisms provided in the scene, such as Anchor nodes or scripts that include loadURL().

Browsers may create browser-specific navigation type extensions. It is recommended that extended *type* names include a unique suffix (e.g., HELICOPTER_mydomain.com) to prevent conflicts.

If none of the types are recognized by the browser, the default "ANY" is used. These strings values are case sensitive ("any" is not equal to "ANY").

AtmosphereNode

```
AtmosphereNode : ChildNode {
}
```

Description

The AtmosphereNode provides the base class from which all atmospheric rendering nodes are derived.

If the scene graph contains one or more Environment nodes, the *atmosphere* field of the first Environment node found in that scene graph is used to specify the atmospheric rendering properties. If that *atmosphere* field is NULL, no atmospheric rendering properties are used. If the scene graph contains no Environment node, but the scene graph contains one or more nodes of type AtmosphereNode, the first one encountered is used to specify the atmospheric rendering properties. If the scene graph contains no Environment or AtmosphereNode nodes, no atmospheric rendering properties are used.

Fog

```
Fog : AtmosphereNode {
    TBD
}
```

Description

The Fog node provides a way to simulate atmospheric effects by blending objects with a specified RGB color based on the distances of the various objects from the viewer.

There may be one or more variants of this node specified that will match up well with currently available rendering hardware. More details are TBD.

●Sensor Objects

SensorNode

```
SensorNode : ChildNode {
    functions TBD
}
```

Description

This object is the parent for all sensory objects in the system.

ButtonSensor

```
ButtonSensor : SensorNode {
```

```
    field String buttonOfInterest ""
    field Bool   enabled          true
    field Time   pressTime        0
    field Time   releaseTime      0
}
```

Description

This object detects button presses on the keyboard.

buttonOfInterest

This field defines the single keyboard button that will cause this sensor to fire. Buttons are expressed as UTF8 strings identifying a single keyboard character. Special characters are TBD.

enabled

This field determines if the sensor fires (true) or does not fire (false) when the buttonOfInterest is pressed or released.

pressTime, releaseTime

These fields send an event with the current wall clock time when the buttonOfInterest is pressed or released, respectively.

●Geometry Objects

Shape

```
Shape : ChildNode {
    field AppearanceNode  appearance  NULL
    field GeometryNode    geometry    NULL
}
```

Description

The Shape node describes the appearance and geometry of an object to be rendered. The specified geometry is rendered using the specified appearance. contains details of the VRML lighting model and the interaction between Appearance nodes and geometry nodes.

appearance

The *appearance* field contains an                . node that specifies the visual attributes (e.g., material and texture) to be applied to the geometry.

geometry

The *geometry* field contains an instance of a GeometryNode. See for more information.

If the *geometry* field is NULL, the object is not drawn.

GeometryNode

```
GeometryNode : Node {
}
```

Description

GeometryNode serves as the base class for all nodes that specify renderable geometry.

FaceSetNode

```
FaceSetNode : GeometryNode {
    field Bool  ccw          TRUE
    field Bool  convex       TRUE
    field Bool  solid        TRUE
    field Float creaseAngle  0
}
```

Description

FaceSetNode serves as the base class for all nodes that are a collection of polygons.

ccw, solid, convex, creaseAngle

The *ccw*, *solid*, *convex*, and *creaseAngle* fields are described in geometry

IndexedFaceSet

```
IndexedFaceSet : FaceSetNode {
    field VertexColorNode    color            NULL
    field Coordinate         coord            NULL
    field Normal             normal           NULL
    field TextureCoordinate  texCoord         NULL
    field MF Int32           colorIndex       []
    field Bool               colorPerVertex   TRUE
    field MF Int32           coordIndex       []
    field MF Int32           normalIndex      []
    field Bool               normalPerVertex  TRUE
    field MF Int32           texCoordIndex    []
}
```

Description

Appendix B - Page 53

The IndexedFaceSet node represents a 3D shape formed by constructing faces (polygons) from vertices listed in the *coord* field. Each face of the IndexedFaceSet shall have:

a. at least three non-coincident vertices;
b. vertices that define a planar polygon;
c. vertices that define a non-self-intersecting polygon.

Otherwise, The results are undefined.

The IndexedFaceSet node is specified in the local coordinate system and is affected by the transformations of its ancestors.

Details on lighting equations and the interaction between *color* field, *normal* field, textures, materials, and geometries are provided in.

coord, coordIndex

The *coord* field contains a Coordinate node that defines the 3D vertices referenced by the *coordIndex* field. IndexedFaceSet uses the indices in its *coordIndex* field to specify the polygonal faces by indexing into the coordinates in the Coordinate node. An index of "-1" indicates that the current face has ended and the next one begins. The last face may be (but does not have to be) followed by a "-1" index. If the greatest index in the *coordIndex* field is N, the Coordinate node shall contain N+1 coordinates (indexed as 0 to N).

color, colorPerVertex, colorIndex

If the *color* field is not NULL, it shall contain a Color node whose colours are applied to the vertices or faces of the IndexedFaceSet as follows:

a. If *colorPerVertex* is FALSE, colours are applied to each face, as follows:
  1. If the *colorIndex* field is not empty, then one colour is used for each face of the IndexedFaceSet. There shall be at least as many indices in the *colorIndex* field as there are faces in the IndexedFaceSet. If the greatest index in the *colorIndex* field is N, then there shall be N+1 colours in the Color node. The *colorIndex* field shall not contain any negative entries.
  2. If the *colorIndex* field is empty, then the colours in the Color node are applied to each face of the IndexedFaceSet in order. There shall be at least as many colours in the Color node as there are faces.
b. If *colorPerVertex* is TRUE, colours are applied to each vertex, as follows:
  1. If the *colorIndex* field is not empty, then colours are applied to each vertex of the IndexedFaceSet in exactly the same manner that the *coordIndex* field is used to choose coordinates for each vertex from the Coordinate node. The *colorIndex* field shall contain at least as many indices as the *coordIndex* field, and shall contain end-of-face markers (-1) in exactly the same places as the *coordIndex* field. If the greatest index in the *colorIndex* field is N, then there shall be N+1 colours in the Color node.
2. If the *colorIndex* field is empty, then the *coordIndex* field is used to choose colours from the Color node. If the greatest index in the *coordIndex* field is N, then there shall be N+1 colours in the Color node.

If the *color* field is NULL, the geometry shall be rendered normally using the Material and texture defined in the Appearance node _____ for details).

normal, normalPerVertex, normalIndex

If the *normal* field is not NULL, it shall contain a Normal node whose normals are applied to the vertices or faces of the IndexedFaceSet in a manner exactly equivalent to that described above for applying colours to vertices/faces (where *normalPerVertex* corresponds to *colorPerVertex* and *normalIndex* corresponds to *colorIndex*). If the *normal* field is NULL, the browser shall automatically generate normals, using *creaseAngle* to determine if and how normals are smoothed across shared vertices.

texCoord, texCoordIndex

If the *texCoord* field is not NULL, it shall contain a TextureCoordinate node. The texture coordinates in that node are applied to the vertices of the IndexedFaceSet as follows:

a. If the *texCoordIndex* field is not empty, then it is used to choose texture coordinates for each vertex of the IndexedFaceSet in exactly the same manner that the *coordIndex* field is used to choose coordinates for each vertex from the Coordinate node. The *texCoordIndex* field shall contain at least as many indices as the *coordIndex* field, and shall contain end-of-face markers (-1) in exactly the same places as the *coordIndex* field. If the greatest index in the *texCoordIndex* field is N, then there shall be N+1 texture coordinates in the TextureCoordinate node.
b. If the *texCoordIndex* field is empty, then the *coordIndex* array is used to choose texture coordinates from the TextureCoordinate node. If the greatest index in the *coordIndex* field is N, then there shall be N+1 texture coordinates in the TextureCoordinate node.

If the *texCoord* field is NULL, a default texture coordinate mapping is calculated using the local coordinate system bounding box of the shape. The longest dimension of the bounding box defines the S coordinates, and the next longest defines the T coordinates. If two or all three dimensions of the bounding box are equal, ties shall be broken by choosing the X, Y, or Z dimension in that order of preference. The value of the S coordinate ranges from 0 to 1, from one end of the bounding box to the other. The T coordinate ranges between 0 and the ratio of the second greatest dimension of the bounding box to the greatest dimension.   Figure 6.10 illustrates the default texture coordinates for a simple box shaped IndexedFaceSet with an X dimension twice as large as the Z dimension and four times as large as the Y dimension.   Figure 6.11   illustrates the original texture image used on the IndexedFaceSet used in ???Figure 6.10???.
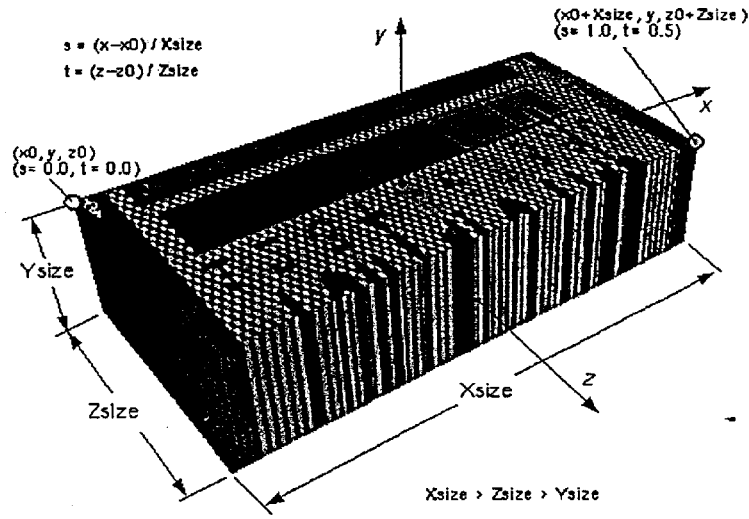
Figure 6.10  IndexedFaceSet texture default mapping
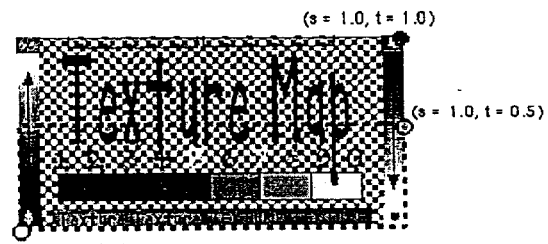
Figure 6.11  ImageTexture for IndexedFaceSet in Figure ??? 6.10 ???
VertexColorNode
```
VertexColorNode : Node {
}
```
Description
VertexColorNode is the parent from which all nodes supplying an array of vertex colors are derived.
VertexColor

```
vertexColor : VertexColorNode {
    field MF Color color  []
}
```

Description

The VertexColor node defines a set of RGB colours to be used as the vertex color of a FaceSetNode (e.g. IndexedFaceSet).

VertexColor nodes are only used to specify multiple colours for a single geometric shape, such as colours for the faces or vertices of an IndexedFaceSet. A Material node is used to specify the overall material parameters of lit geometry. If both a Material node and a VertexColor node are specified for a geometric shape, the colours shall replace the diffuse component of the material. Details on lighting equations can be found in color

The *color* field specifies a set of RGB colors. The number of values necessary and their relationship to the vertices of the FaceSetNode are determined by the definition of each specific subclass of FaceSetNode.

VertexColor4

```
VertexColor : VertexColorNode {
    field MF Color4 color  []
}
```

Description

The VertexColor4 node defines a set of RGBA colours to be used as the vertex color of a FaceSetNode (e.g. IndexedFaceSet).

VertexColor4 nodes are only used to specify multiple colours for a single geometric shape, such as colours for the faces or vertices of an IndexedFaceSet. A Material node is used to specify the overall material parameters of lit geometry. If both a Material node and a VertexColor4 node are specified for a geometric shape, the colours shall replace the diffuse component of the material.

color

The *color* field specifies a set of RGBA colors. The number of values necessary and their relationship to the vertices of the FaceSetNode are determined by the definition of each specific subclass of FaceSetNode.

Appendix B - Page 57

Coordinate

```
Coordinate : Node {
    field MF Vec3f point   []
}
```

Description

The Coordinate node defines a set of 3D coordinates to be used as the vertex values of a FaceSetNode (e.g. IndexedFaceSet).

point

The point field contains a set of 3D coordinates. The number of values specified and how they are combined into a network of polygons are determined by the definition of each specific subclass of FaceSetNode.

---

Normal

```
Normal : Node {
    field MF Vec3f vector   []
}
```

Description

The Normal node defines a set of 3D surface normal vectors to be used as the surface normals of a FaceSetNode (e.g., IndexedFaceSet).

vector

The *vector* field contains a set of 3D surface normals. The number of values necessary and their relationship to the vertices of the FaceSetNode are determined by the definition of each specific subclass of FaceSetNode. Each vector value specified shall be of unit length.

---

TextureCoordinate

```
TextureCoordinate : Node {
    field MF Vec2f point   []
}
```

Description

The TextureCoordinate node specifies a set of 2D texture coordinates used by FaceSetNode geometry nodes (e.g., IndexedFaceSet) to map textures to vertices. Textures are two dimensional colour functions that, given an *(s, t)* coordinate, return a colour value *colour(s, t)*. Texture map values range from [0.0, 1.0] along the S-axis and T-axis. However, TextureCoordinate values, specified by the *point* field, may be in the range (-∞,∞). Texture coordinates identify a location (and thus a colour value) in the texture map. The horizontal coordinate *s* is specified first, followed by the vertical coordinate *t*.

If the texture map is repeated in a given direction (S-axis or T-axis), a texture coordinate C (s or t) is mapped into a texture map that has N pixels in the given direction as follows:

```
Texture map location = (C - floor(C)) × N
```

If the texture map is not repeated, the texture coordinates are clamped to the 0.0 to 1.0 range as follows:

```
Texture map location = N,    if C   1.0,
                     = 0.0,  if C < 0.0,
                     = C × N, if 0.0 <= C <= 1.0.
```

Details on repeating textures are specific to texture map node types described in ??? x.x.x Texture ???..

point

The *point* field Contains a set of (s,t) texture coordinate values. The number of values necessary and their relationship to the vertices of the FaceSetNode are determined by the definition of each specific subclass of FaceSetNode.

Appearance

```
Appearance : Node {
    field MaterialNode material  NULL
    field Texture      texture   NULL
}
```

Description

The Appearance node specifies the visual properties of geometry. The value for each of the fields in this node may be NULL. However, if the field is non-NULL, it shall contain one node of the appropriate type.

material

The *material* field, if specified, shall contain a <u>MaterialNode</u> node. If the *material* field is NULL or unspecified, lighting is off (all lights are ignored during rendering of the object that references this Appearance) and the unlit object colour is (1, 1, 1). Details of the Blendo lighting model are in <u>4.14, Lighting model</u>.

texture

The *texture* field, if specified, shall contain a Texture node. If the texture node is NULL or the *texture* field is unspecified, the object that references this Appearance is not textured.

MaterialNode

```
MaterialNode : Node {
    function Bool isOfType(Proto type)
    function Bool isExactType(Proto type);
}
```

Description

MaterialNode serves as the base class for all nodes that describe material properties.

Material

```
Material : MaterialNode {
    field Float ambientIntensity   0.2
    field Color diffuseColor       0.8 0.8 0.8
    field Color emissiveColor      0 0 0
    field Float shininess          0.2
    field Color specularColor      0 0 0
    field Float transparency       0
}
```

Description

The Material node specifies surface material properties for associated geometry nodes and is used by the VRML lighting equations during rendering. The fields in the Material node determine how light reflects off an object to create colour. _____ contains a detailed description of the VRML lighting model equations.

All of the fields in the Material node range from 0.0 to 1.0.

ambientIntensity

The *ambientIntensity* field specifies how much ambient light from light sources this surface shall reflect. Ambient light is omnidirectional and depends only on the number of light sources, not their positions with respect to the surface. Ambient colour is calculated as *ambientIntensity* × *diffuseColor*.

diffuseColor

The *diffuseColor* field reflects all VRML light sources depending on the angle of the surface with respect to the light source. The more directly the surface faces the light, the more diffuse light reflects.

emissiveColor

The *emissiveColor* field models "glowing" objects. This can be useful for displaying pre-lit models (where the light energy of the room is computed explicitly), or for displaying scientific data.

specularColor, shininess

The *specularColor* and *shininess* fields determine the specular highlights (e.g., the shiny spots on an apple). When the angle from the light to the surface is close to the angle from the surface to the viewer, the *specularColor* is added to the diffuse and ambient colour calculations. Lower shininess values produce soft glows, while higher values result in sharper, smaller highlights.

transparency

The *transparency* field specifies how transparent an object is, with 1.0 being completely transparent, and 0.0 completely opaque.

Texture

```
Texture : Node {
    field SurfaceNode       surface                NULL
    field Bool              repeatS                true
    field Bool              repeatT                true
    field Bool              modulateColor          false
    field Bool              modulateTransparency   false
    field TextureTransform  textureTransform       NULL
}
```

Description

The Texture node defines a texture map by specifying a surface image and general parameters for mapping to geometry. Texture maps are defined in a 2D coordinate system (s, t) that ranges from [0.0, 1.0] in both directions. The bottom edge of the surface image corresponds to the S-axis of the texture map, and left edge of the surface image corresponds to the T-axis of the texture map. The lower-left pixel of the image corresponds to s=0, t=0, and the top-right pixel of the image corresponds to s=1, t=1. These relationships are depicted in Figure 6.9.

Figure 6.9 -- Texture map coordinate system

See 4.14, Lighting model, for a description of lighting equations and the interaction between textures, materials, and geometry appearance.

surface

This field contains a reference to a surface from which the texture image is derived.

repeatS

The *repeatS* field specifies how the texture wraps in the S direction. If *repeatS* is TRUE (the default), the texture map is repeated outside the [0.0, 1.0] texture coordinate range in the S direction so that it fills the shape. If *repeatS* is FALSE, the texture coordinates are clamped in the S direction to lie within the [0.0, 1.0] range.

repeatT

The *repeatT* field specifies how the texture wraps in the T direction. If *repeatT* is TRUE (the default), the texture map is repeated outside the [0.0, 1.0] texture coordinate range in the T direction so that it fills the shape. If *repeatT* is FALSE, the texture coordinates are clamped in the T direction to lie within the [0.0, 1.0] range.

modulateColor

This field controls whether or not texture color, if any, is multiplied by material diffuseColor or the Color node. Details of the Blendo lighting model are in 4.14, Lighting model.

modulateTransparency

This field controls whether or not texture transparency, if any, is multiplied by material transparency. Details of the Blendo lighting model are in 4.14, Lighting model.

textureTransform

The *textureTransform* field, if specified, shall contain a TextureTransform node. If the *textureTransform* is NULL or unspecified, the *textureTransform* field has no effect.

---

TextureTransform

```
TextureTransform : Node {
     field vec2f translation  0 0
     field Float rotation     0
     field vec2f scale        1 1
     field vec2f center       0 0
}
```

Description

The TextureTransform node defines a 2D transformation that is applied to texture coordinates    This node affects the way textures coordinates are applied to the geometric surface. The transformation consists of (in order):

a. a translation;
b. a rotation about the centre point;
c. a non-uniform scale about the centre point.

These parameters support changes to the size, orientation, and position of textures on shapes. Note that these operations appear reversed when viewed on the surface of geometry. For example, a *scale* value of (2 2) will scale the texture coordinates and have the net effect of shrinking the texture size by a factor of 2 (texture coordinates are twice as large and thus cause the texture to repeat). A translation of (0.5 0.0) translates the texture coordinates +.5 units along the S-axis and has the net effect of translating the texture -0.5 along the S-axis on the geometry's surface. A rotation of $\pi/2$ of the texture coordinates results in a $-\pi/2$ rotation of the texture on the geometry.

In matrix transformation notation, where *Tc* is the untransformed texture coordinate, *Tc'* is the transformed texture coordinate, *C* (*center*), *T* (*translation*), *R* (*rotation*), and *S* (*scale*) are the intermediate transformation matrices, $$Tc' = -C \times S \times R \times C \times T \times Tc$$

Note that this transformation order is the reverse of the Transform node transformation order since the texture coordinates, not the texture, are being transformed (i.e., the texture coordinate system).

translation

The *translation* field specifies a translation of the texture coordinates.

rotation

The *rotation* field specifies a rotation in radians of the texture coordinates about the *center* point after the scale has been applied. A positive rotation value makes the texture coordinates rotate counterclockwise about the centre, thereby rotating the appearance of the texture itself clockwise.

scale

The *scale* field specifies a scaling factor in S and T of the texture coordinates about the *center* point.

center

The *center* field specifies a translation offset in texture coordinate space about which the *rotation* and *scale* fields are applied.

---

Lighting Objects

LightNode

```
LightNode : ChildNode {
    field Float ambientIntensity 0
    field Color color             1 1 1
    field Float intensity         1
    field Bool  on                true
}
```

Description

This object is the parent for all light nodes. It supplies the basic characteristics of color, ambientIntensity, intensity and whether or not the light is on. Details of the Blendo lighting model are in 4.14, Lighting model and 4.6.6, Light sources.

ambientIntensity

The ambientIntensity field specifies the intensity of the ambient emission from the light.

color

The color field specifies the spectral colour properties of both the direct and ambient light emission as an RGB value.

intensity

The intensity field specifies the brightness of the direct emission from the light. Light intensity may range from 0.0 (no light emission) to 1.0 (full intensity).

on

This field determines if the light provides illumination (true) or not (false).

---

DirectionalLight

```
DirectionalLight : LightNode {
    field Vec3f direction 0 0 -1
}
```

Description

The DirectionalLight node defines a directional light source that illuminates along rays parallel to a given 3-dimensional vector. DirectionalLight nodes do not attenuate with distance. A precise description of VRML's lighting equations is contained in 4.14, Lighting model. A directional light source illuminates only the objects in its enclosing parent group. The light may illuminate everything within this coordinate system, including all children and descendants of its parent group. The accumulated transformations of the parent nodes affect the light.

direction

The *direction* field specifies the direction vector of the illumination emanating from the light source in the local coordinate system. Light is emitted along parallel rays from an infinite distance away.

---

PointLight

```
PointLight : LightNode {
    field Vec3f attenuation 1 0 0
    field Vec3f location    0 0 0
    field Float radius      100
}
```

Description

The PointLight node specifies a point light source at a 3D location in the local coordinate system. A point light source emits light equally in all directions; that is, it is omnidirectional. PointLight nodes are specified in the local coordinate system and are affected by ancestor transformations.

attenuation

PointLight node's illumination falls off with distance as specified by three *attenuation* coefficients. The attenuation factor is $1/max(attenuation[0] + attenuation[1] \times r +$

*attenuation[2]×r², 1)*, where *r* is the distance from the light to the surface being illuminated. The default is no attenuation. An *attenuation* value of (0, 0, 0) is identical to (1, 0, 0). Attenuation values shall be greater than or equal to zero. A detailed description of VRML's lighting equations is contained in 4.14, Lighting model.

location

This field describes the location of the center of the light, in local coordinate space.

radius

A PointLight node illuminates geometry within *radius* metres of its *location*. Both radius and location are affected by ancestors' transformations (scales affect *radius* and transformations affect *location*). The *radius* field shall be greater than or equal to zero.

We claim:

1. A computer system, comprising a computer and a computer program executed by the computer, wherein the computer program comprises computer instructions for:

declaratively composing a dynamic image using a first surface having a first image rendered on the first surface, and a second surface having a second image rendered on the second surface;

wherein the first image from the first surface and the second image from the second surface are combined to compose the dynamic image and wherein the dynamic image is produced through a declarative markup language and wherein the first image is a three dimensional representation of an object and the second surface is a protrusion having a three dimensional representation in a space and wherein the first image has a first opacity value, the second image has a second opacity value and the dynamic image has a third opacity value; and animating the opacity value of the second image when combining the first image with the second image thereby producing a traveling matte effect, wherein the first image and the second image are selected from a group consisting of a video image, a still image, an animation and a scene.

2. The computer system of claim 1, wherein the first image is rendered on a first two dimensional pixel array, and the second image is rendered on a second two dimensional pixel array.

3. The computer system of claim 1, wherein the dynamic image is composed according to declarative instructions.

4. The computer system of claim 3, wherein the dynamic image is composed in real time.

5. The computer system of claim 1, wherein the dynamic image is composed according to declarative instructions.

6. The computer system of claim 1, further comprising computer instructions for:

overwriting the second opacity value with the first opacity value when combining the first image and the second image to produce the dynamic image.

7. The computer system of claim 1, further comprising computer instructions for:

multiplying the first opacity value with the second opacity value to obtain the third opacity value.

8. A computer system, comprising a computer and a computer program executed by the computer, wherein the computer program comprises computer instructions for:

rendering a first image on a first surface;

rendering a second image on a second surface;

declaratively rendering a third image on a third surface; wherein the first image is used as a texture for the third scene, and the second image is blended with the texture to form the third scene and wherein the third surface is produced through a declarative markup language and wherein the first image is a protrusion having a three dimensional representation in a space and wherein the second image is a three dimensional representation of an object.

9. The computer system of claim 8, wherein the user provides declarative instructions to render the first image, the second image and the third scene.

10. The computer system of claim 8, wherein the second image changes over time.

11. The computer system of claim 8, further comprising computer instructions for:

declaratively rendering a fourth scene on a fourth surface, wherein the third scene is blended within the fourth scene to form a sub-scene within the fourth scene.

12. The computer system of claim 11, wherein the second image within the sub-scene changes to reflect the changes in the second image on the second surface.

13. The computer system of claim 8, wherein the first image and the second image can be chosen from a group consisting of a video image, a still image, an animation and a scene.

14. The method of claim 8, wherein rendering the first image, the second image, and the third image occurs recursively.

15. A method of composing a dynamic image using a computer, the method comprising:

rendering a first image on a first surface;

rendering a second image on a second surface;

combining the first image and the second image to declaratively compose the dynamic image, wherein the dynamic image is produced through a declarative markup language and wherein the first image is a three dimensional representation of an object and the second surface is a protrusion having a three dimensional representation in a space;

providing a first opacity value for the first image;

providing a second opacity value for the second image;

providing a third opacity value for the dynamic image; and animating the second opacity value when combining the first image with the second image thereby producing a matte effect.

16. The method of claim 15, wherein the first image and the second image are selected from a group consisting of a video image, a still image, an animation and a scene.

17. The method of claim 16, wherein the scene includes at least one image from a group consisting of a video image, a still image, an animation and a scene.

18. The method of claim 15, further comprising a rendering of the first image on a first two dimensional pixel array, and rendering the second image on a second two dimensional fixed array.

19. The method of claim 15, further comprising providing declarative instructions to compose the dynamic image.

20. The method of claim 15, wherein the dynamic image is composed in real time.

21. The method of claim 15, further comprising:

overwriting the second opacity value with the first opacity value.

22. The method of claim 15, further comprising:

multiplying the first opacity value with the second opacity value to obtain the third opacity value.

23. A method of composing a scene using a computer, the method comprising:

rendering a first image on a first surface;

rendering a second image on a second surface;

declaratively rendering a first scene on a third surface using the first image as a texture for the scene and blending the second image with the texture to form the first scene and wherein the third surface is produced through a declarative markup language and wherein the first image is a protrusion having a three dimensional representation in a space and wherein the second image is a three dimensional representation of an object.

24. The method of claim 23, further comprising:

providing declarative instructions to render the first image, the second image and the first scene.

25. The method of claim 23, wherein the second image changes over time.

26. The method of claim 23, wherein the first image and the second image are chosen from a group consisting of a video image, a still image, an animation and a scene.

27. The method of claim 23, wherein rendering the first image, the second image, and the first scene occurs recursively.

* * * * *